(12) United States Patent
Takahashi et al.

(10) Patent No.: US 9,316,030 B2
(45) Date of Patent: Apr. 19, 2016

(54) DOOR OPENING AND CLOSING APPARATUS

(71) Applicant: NABTESCO CORPORATION, Tokyo (JP)

(72) Inventors: Kazutama Takahashi, Kobe (JP); Atsuhito Yamaguchi, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/611,051

(22) Filed: Jan. 30, 2015

(65) Prior Publication Data

US 2015/0145264 A1   May 28, 2015

Related U.S. Application Data

(63) Continuation-in-part of application No. 14/004,091, filed as application No. PCT/JP2012/055747 on Mar. 7, 2012.

(30) Foreign Application Priority Data

Mar. 10, 2011   (JP) ................................ 2011-053106
Mar. 10, 2011   (JP) ................................ 2011-053107
Mar. 25, 2011   (JP) ................................ 2011-068584

(51) Int. Cl.
 *E05C 7/06*   (2006.01)
 *E05B 83/40*   (2014.01)
 (Continued)

(52) U.S. Cl.
 CPC .............. *E05B 83/40* (2013.01); *B61D 19/009* (2013.01); *E05B 65/0811* (2013.01); *E05B 83/363* (2013.01); *Y10T 292/1075* (2015.04)

(58) Field of Classification Search
 CPC ... E05B 83/40; B61D 19/009; E05D 65/0811; E05D 83/363
 USPC ............................................ 49/116, 118, 360
 See application file for complete search history.

(56) References Cited

U.S. PATENT DOCUMENTS 4,142,326 A   3/1979   Schmitz
4,152,870 A   5/1979   Knap
(Continued)

FOREIGN PATENT DOCUMENTS

CA   2249763 A1 *   2/2000
CN   1580476 A   2/2005
(Continued)

OTHER PUBLICATIONS

An Office Action; "Notice of Reasons for Rejection," issued by the Japanese Patent Office on May 12, 2015, which corresponds to Japanese Patent Application No. 2011-053107 and is related to U.S. Appl. No. 14/611,051.

(Continued)

*Primary Examiner* — Jerry Redman
(74) *Attorney, Agent, or Firm* — Studebaker & Brackett PC

(57) ABSTRACT

A door opening and closing apparatus includes a lock mechanism having an engaging member that engages with a lock member provided in a door when the door is in a fully closed state, and a link mechanism that has three link members, is configured to be able to undergo deformation into a linear state and a bent state, and restricts rotation of the engaging member by being brought into the linear state. A central link member among the three link members has a first face and a second face that are pressed by a projecting shaft. The link mechanism changes to the bent state when the first face is pressed, and changes to the linear state when the second face is pressed. The first face and the second face are provided so as to have a positional relationship in which the first face and the second face intersect each other.

4 Claims, 43 Drawing Sheets

(51) Int. Cl.
   B61D 19/00     (2006.01)
   E05B 65/08     (2006.01)
   E05B 83/36     (2014.01)

(56) References Cited

U.S. PATENT DOCUMENTS

| | | | |
|---|---|---|---|
| 4,543,746 A | | 10/1985 | Racca |
| 5,247,763 A | | 9/1993 | Hein |
| 5,483,769 A | | 1/1996 | Zweili |
| 6,164,417 A | * | 12/2000 | Oberleitner ............... 187/319 |
| 6,189,265 B1 | | 2/2001 | Fink |
| 6,446,389 B1 | | 9/2002 | Heffner et al. |
| 6,792,717 B2 | | 9/2004 | Carlsson et al. |
| 7,370,731 B2 | * | 5/2008 | Cocher ..................... 187/330 |
| 8,424,244 B2 | | 4/2013 | Tarrega Lloret |
| 8,448,751 B2 | | 5/2013 | Tonna et al. |
| 2002/0184823 A1 | | 12/2002 | Heffner et al. |
| 2002/0194784 A1 | | 12/2002 | Stojc et al. |
| 2014/0020299 A1 | * | 1/2014 | Takahashi et al. ............ 49/173 |

FOREIGN PATENT DOCUMENTS

| | | | | |
|---|---|---|---|---|
| CN | 101535584 A | | 9/2009 | |
| DE | 19830900 A1 | * | 1/2000 | ............. E05B 57/00 |
| EP | 1721802 A1 | | 11/2006 | |
| EP | 1767388 A2 | | 3/2007 | |
| EP | 1767427 A1 | | 3/2007 | |
| EP | 2079894 B1 | | 7/2009 | |
| EP | 1721802 B1 | | 3/2010 | |
| EP | 2348181 A1 | | 7/2011 | |
| GB | 2403265 A | | 12/2004 | |
| JP | 10-243626 A | | 9/1998 | |
| JP | H11-48783 A | | 2/1999 | |
| JP | 2006-316524 A | | 11/2006 | |
| JP | 2010-095939 A | | 4/2010 | |
| TW | 201026530 A | | 7/2010 | |
| WO | WO 2013035592 A1 | * | 3/2013 | |

OTHER PUBLICATIONS

The Partial Supplementary European Search Report dated Apr. 14, 2015, which corresponds to EP Application No. 12755419.4 and is related to U.S. Appl. No. 14/611,051.

International Search Report; PCT/JP2012/055747; May 29, 2012.

An Office Action; "Notice of the Opinion on Examination," issued by the Taiwan Intellectual Property Office on Feb. 10, 2014, which corresponds to Taiwanese Patent Application No. 101108045 and is related to U.S. Appl. No. 14/004,091; with English language translation.

An Office Action issued by the Taiwan Intellectual Property Office on Nov. 18, 2014, which corresponds to Taiwanese Patent Application No. 101108045 and is related to U.S. Appl. No. 14/004,091.

The first Office Action issued by the State Intellectual Property Office of China on Dec. 1, 2014, which corresponds to Chinese Patent Application No. 201280012687.X and is related to U.S. Appl. No. 14/004,091.

* cited by examiner

DOOR OPENING AND CLOSING APPARATUS

CROSS-REFERENCE TO RELATED APPLICATION

The present application is a continuation-in-part application of U.S. patent application Ser. No. 14/004,091 filed on Mar. 7, 2012.

BACKGROUND OF THE INVENTION

1. Field of the Invention

The present invention relates to a door opening and closing apparatus that opens and closes a sliding door of a vehicle such as a railway vehicle.

2. Description of Related Art

Conventionally, a door opening and closing apparatus is known that can perform both opening/closing and locking a door with a single motor, using a planetary gear (e.g., JP2008-121242 A). This door opening and closing apparatus includes a lock mechanism that mechanically restricts movement of the door in an opening direction such that the door in a fully closed state is not brought into an opened state by error. The door can thereby be prevented from moving in the opening direction even if a motor enters a free state due to a malfunction or the like, when the door is in the fully closed state.

In the lock mechanism illustrated in FIG. 11 in JP2008-121242 A, as disclosed in paragraph 0073 of JP2008-121242 A, a connecting pin (projecting shaft) fixed to a bottom face portion of a lock slider moves together with the lock slider in a locking direction and an unlocking direction. This projecting shaft is in a state where portions thereof on the locking direction side and the unlocking direction side are sandwiched by a pair of projecting portions formed at a center link in a link mechanism. In this state, the center link rotates as a result of the projecting shaft moving in the locking direction and the unlocking direction, and therefore the lock mechanism is switched between a locked state and an unlocked state.

SUMMARY OF THE INVENTION

Incidentally, in the lock mechanism disclosed in JP2008-121242 A, since the projecting shaft is in a state of being sandwiched by the pair of projecting portions, it is required that the projecting shaft and the pair of projecting portions have relatively high position accuracy and assembly accuracy when the lock mechanism is assembled.

The present invention is for solving the above-described problem, and an object of the present invention is to provide a door opening and closing apparatus including a lock mechanism whose required position accuracy and assembly accuracy are not as high as those in the conventional technique.

(1) To solve the above-described problem, a door opening and closing apparatus according to an aspect of the present invention is a door opening and closing apparatus for opening and closing a door, including: an actuator that moves the door in an opening direction and a closing direction; and a lock mechanism that holds the door in a fully closed state, and has an engaging member which engages with a lock member provided in the door when in the fully closed state, and a link mechanism which has three link members, is configured to be able to undergo deformation into a linear state and a bent state, and restricts rotation of the engaging member by being brought into the linear state, wherein the link mechanism has a first face that is formed in a central link member of the three link members and is pressed by a projecting shaft moved by the actuator in order that the link mechanism changes from the linear state to the bent state, and a second face that is formed in the central link member and is pressed by the projecting shaft in order that the link mechanism changes from the bent state to the linear state, and the first face and the second face are provided so as to have a positional relationship in which the first face and the second face intersect each other.

With this configuration, when the door is in the fully closed state, rotation of the engaging member that engages with the lock member provided in the door is restricted by the link mechanism in the linear state. Thus, the door is held in the fully closed state. In this state, as a result of the first face of the link mechanism being pressed by the projecting shaft, the link mechanism changes from the linear state to the bent state, and the lock mechanism is brought into the unlocked state. Furthermore, in this state (state where the link mechanism is in the bent state), as a result of the second face of the link mechanism being pressed by the projecting shaft, the link mechanism changes from the bent state to the linear state, and the lock mechanism is brought into the locked state.

Furthermore, the space between the first face and the second face can be widened by providing, as in this configuration, the first face and the second face that are pressed by the projecting shaft, so as to have a positional relationship in which the first face and the second face intersect each other. Thus, when the lock mechanism is assembled, the projecting shaft can be disposed between the first face and the second face with relative ease.

Accordingly, with this configuration, it is possible to provide a door opening and closing apparatus including a lock mechanism whose required assembly accuracy and position accuracy are not as high as those in the conventional technique.

(2) Preferably, the second face is a face that is aligned with a moving direction of the projecting shaft when the link mechanism is in the linear state.

With this configuration, since the projecting shaft moves along the second face of the link mechanism in the linear state, the link mechanism can be reliably changed from the bent state to the linear state even if the moving amount of the projecting shaft varies. For this reason, the required assembly accuracy and position accuracy are not as high as those in the conventional technique, and therefore the workability in assembly can be further improved.

(3) More preferably, the engaging member has an engaging portion provided as an opening portion, an end portion of the link mechanism being inserted into the opening portion when the engaging member is rotated in a predetermined direction by the lock member moving in the closing direction, the link members include a first link member having an end portion that serves as the end portion of the link mechanism and is inserted into the opening portion, and a second link member as the central link member that is connected to the first link member and is provided rotatably, and a rotation restricting member that restricts rotation of the second link member is further provided.

With this configuration, since the position of the second link member is reliably fixed by the projecting shaft and the rotation restricting member, the linear state or the bent state of the link mechanism can be maintained even if the connection between the first link member and the second link member is more or less loose. Thus, the required assembly accuracy and position accuracy of the link mechanism are not as high as those in the conventional technique, and therefore the workability in assembly can be still further improved.

(4) Preferably, the lock mechanism includes: a plurality of the engaging members each being rotated in a predetermined direction by the lock member moving in the closing direction; and a plurality of biasing portions that are provided in association with the engaging members in one-to-one correspondence and bias the respective engaging members in a direction opposite to the predetermined direction.

For example, in the case where only one biasing portion is provided in the lock mechanism, if this biasing portion is broken or withdraws, the engaging member cannot be appropriately rotated in a direction (i.e., in an unlocking direction) opposite to the predetermined direction. In contrast, with the above-described configuration, even if some of the plurality of biasing portions are broken or withdraw, the engaging member can be appropriately rotated in the unlocking direction by the other biasing portions. That is to say, with this configuration, the lock mechanism can be operated more appropriately.

DESCRIPTION OF EMBODIMENTS

Hereinafter, modes for carrying out the present invention will be described with reference to the drawings. The present invention is applicable to a door opening and closing apparatus to be installed at an entrance of a vehicle for performing a door opening/closing operation.

First Embodiment

Figure 1:
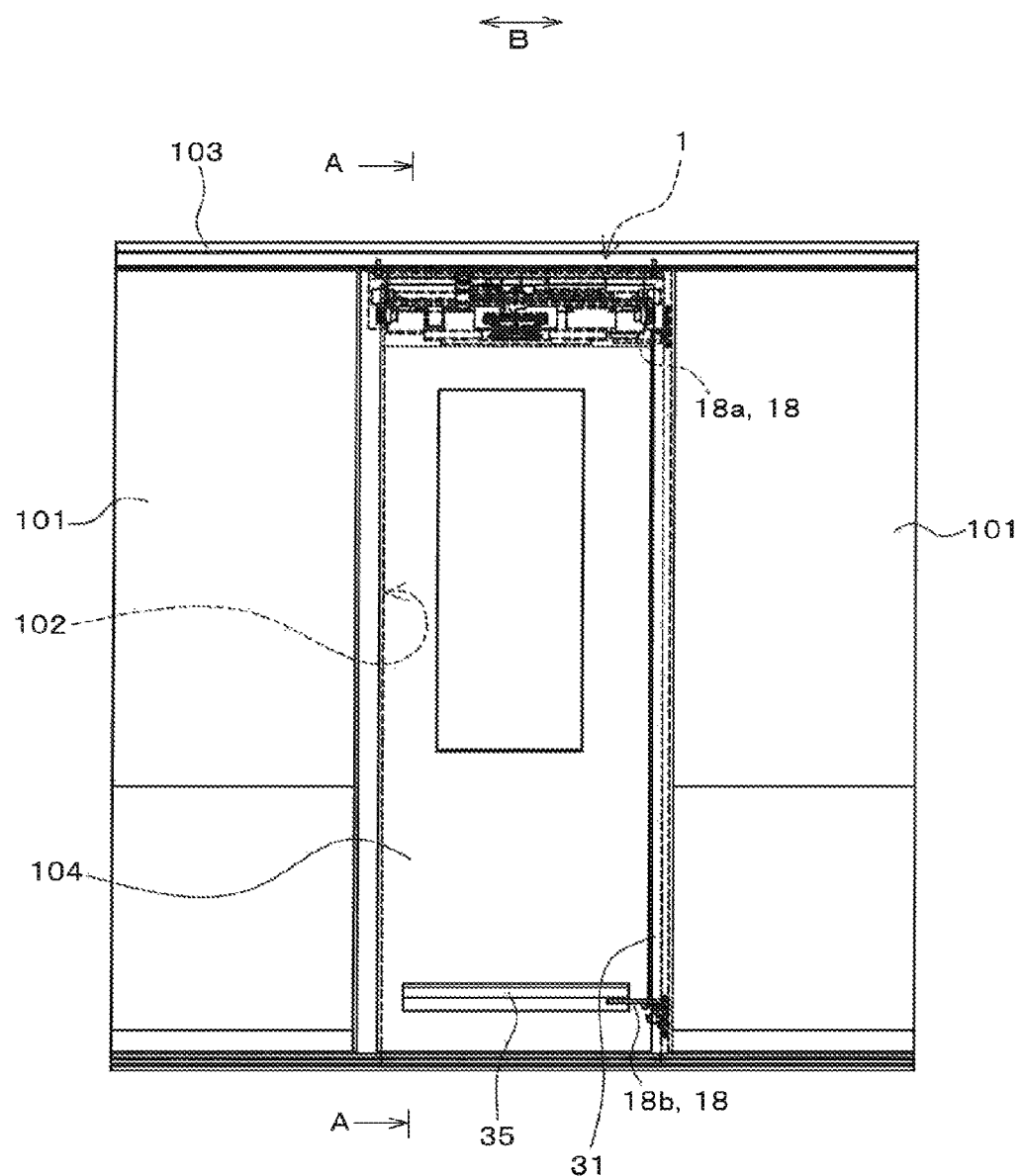
FIG. 1 is a schematic view showing an overall plug door device according to a first embodiment of the present invention.
Figure 2:
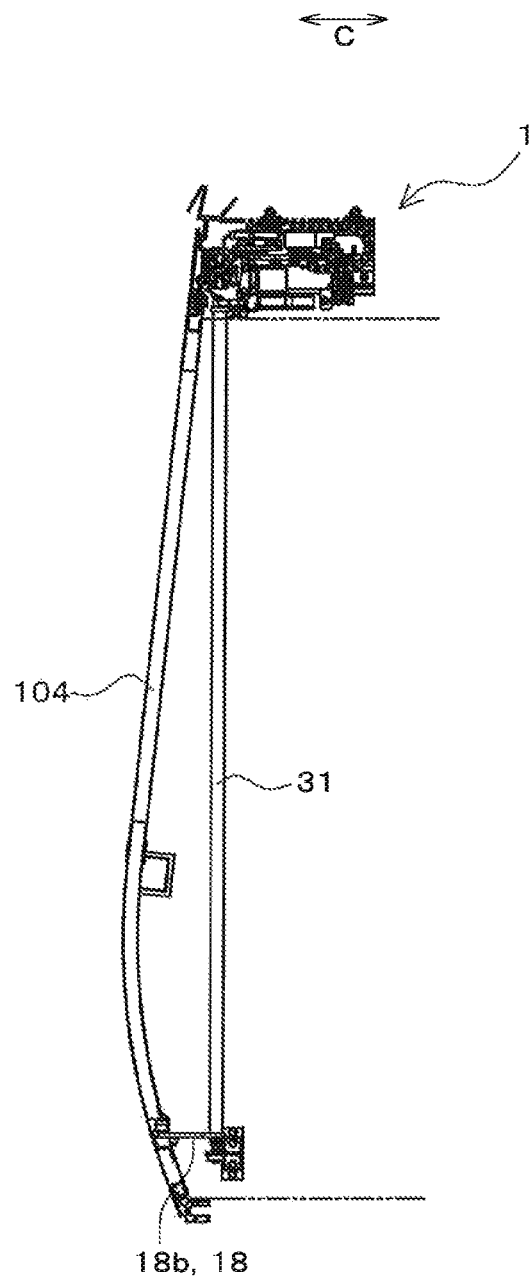
FIG. 2 is a schematic view showing a cross-section, as viewed from the position indicated by arrows of line A-A in FIG. 1.
Figure 3:
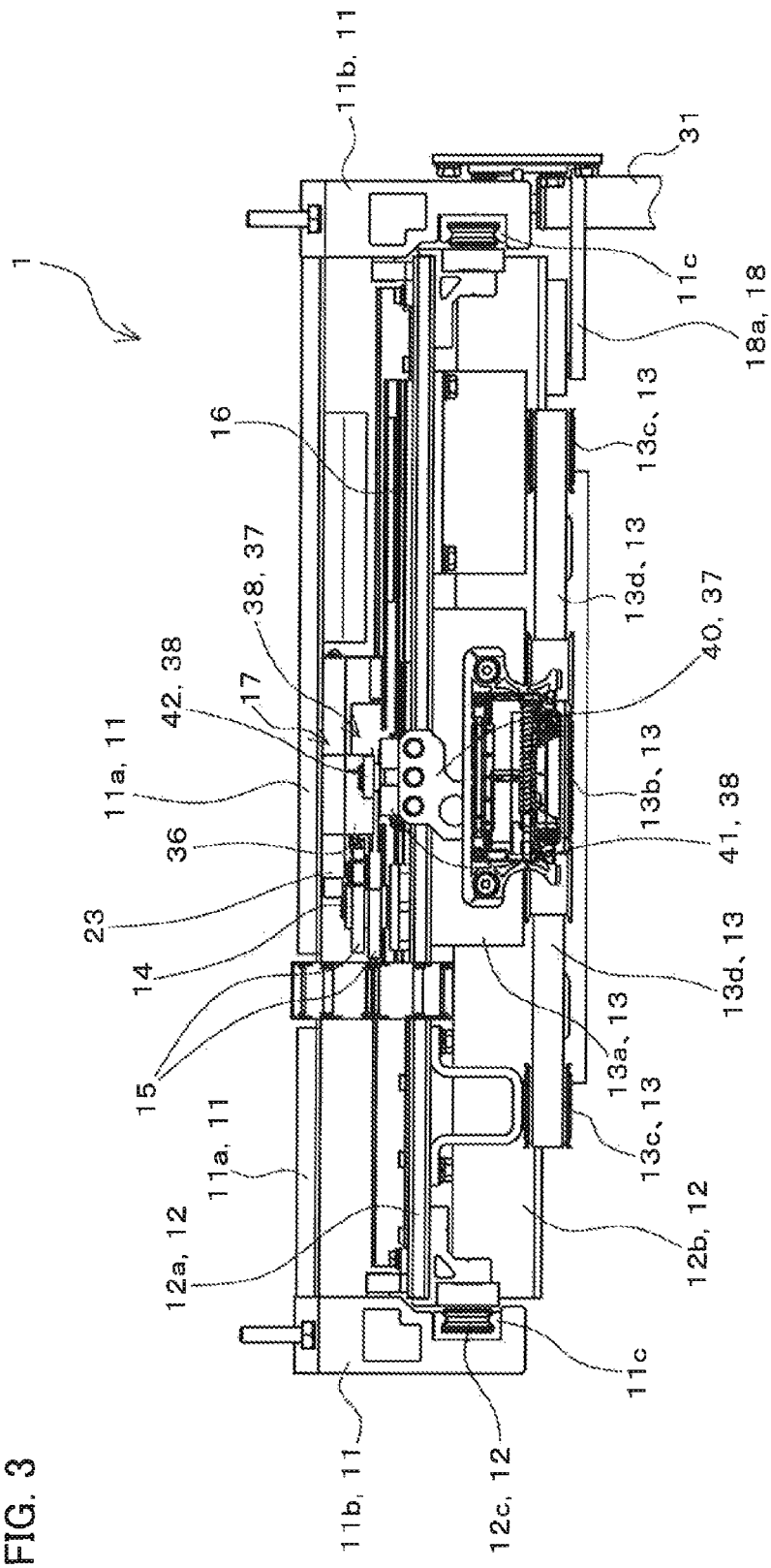
FIG. 3 is a schematic view serving as a front view of the plug door device shown in FIG. 1.
Figure 4:
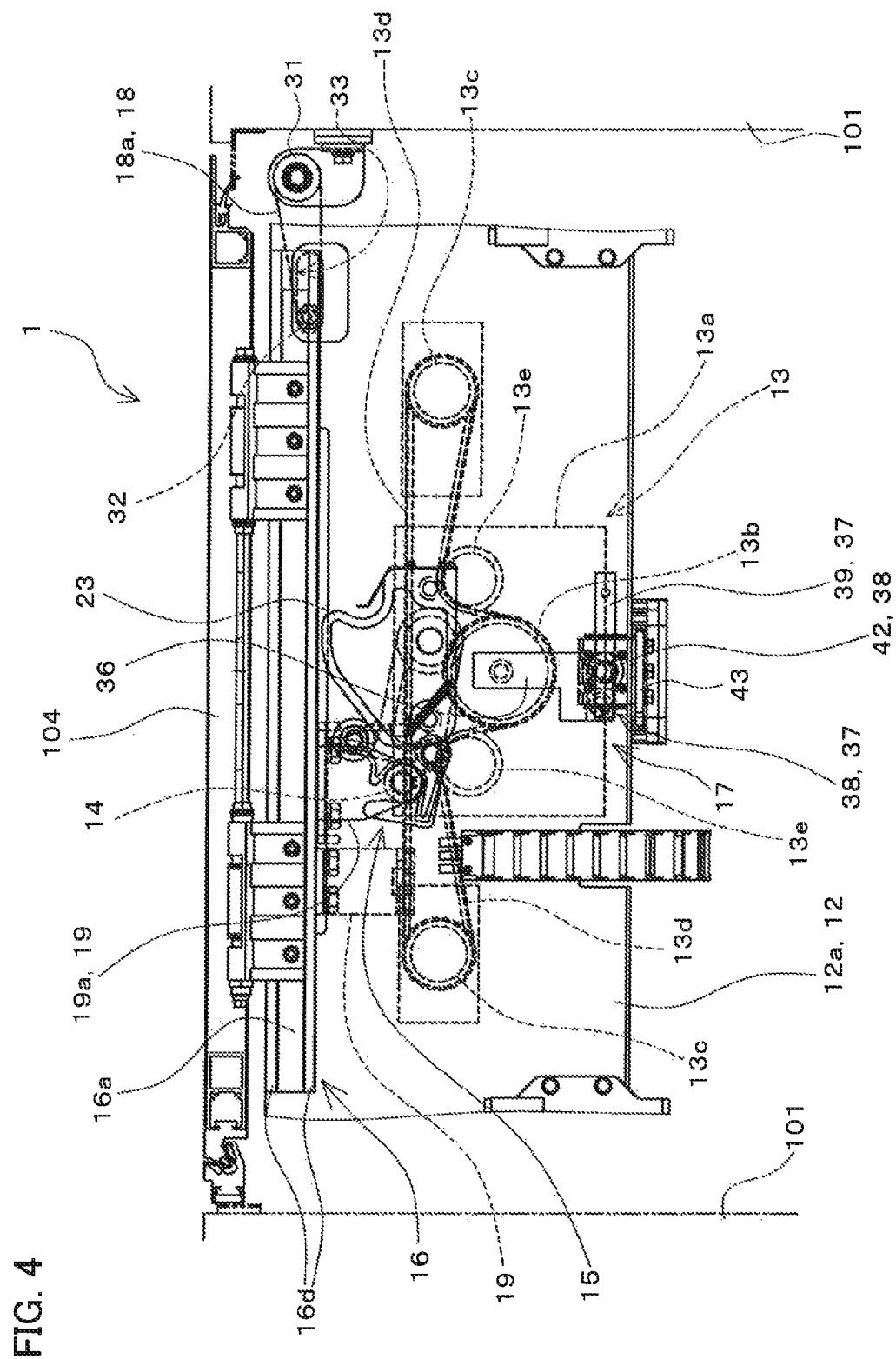
FIG. 4 is a schematic view serving as a plan view of the plug door device shown in FIG. 3.
Figure 5:
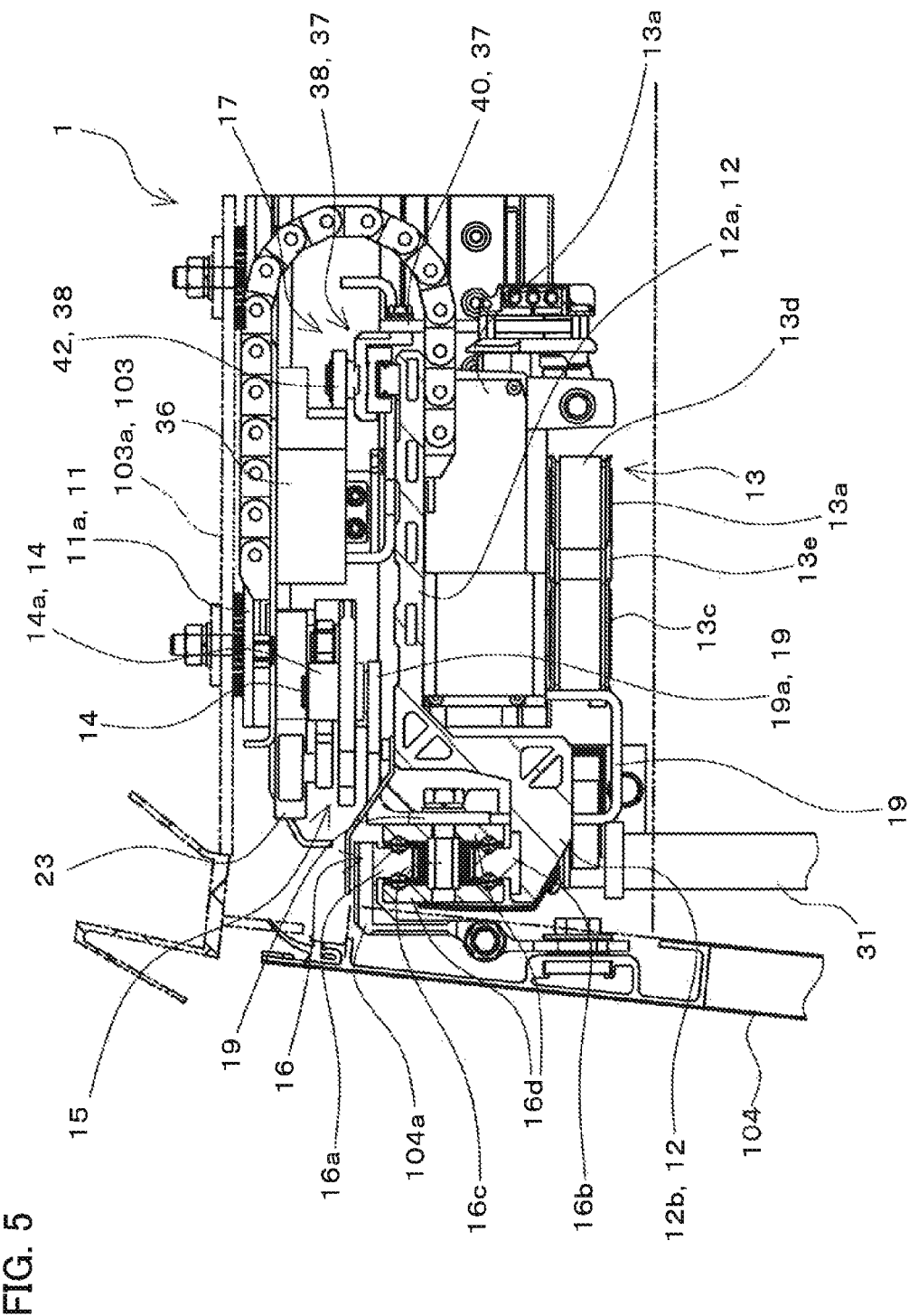
FIG. 5 is an enlarged schematic view of the upper part of a door in FIG. 2.

FIG. 1 is a schematic view showing an overall plug door device 1 according to a first embodiment of the present invention. The plug door device 1 shown in FIG. 1 is also applicable to a one-panel sliding door constituted by one door. Note that FIG. 1 is a schematic view as viewed from the inside of a vehicle, and shows a state where the plug door device 1 is installed together with a door 104 at an entrance 102 of the vehicle. FIG. 2 is a schematic view showing a cross-section, as viewed from the position indicated by arrows of line A-A in FIG. 1. FIG. 3 is a schematic view serving as a front view of the plug door device 1 and enlarges the upper part of the door 104 in FIG. 1. Note that FIG. 1 indicates a state where the plug door device 1 is housed in the vehicle at the upper part of the entrance 102 with broken lines, and FIG. 3 omits constituents on the vehicle side. FIG. 4 is a schematic view serving as a plan view of the plug door device 1 shown in FIG. 3, showing the plug door device 1 together with the door 104. FIG. 5 is a schematic view serving as a side view of the plug door device 1 and enlarges the upper part of the door 104 in FIG. 2.

Regarding Overall Configuration

As shown in FIG. 1, a vehicle side wall 101 is provided with the entrance 102. Note that FIG. 1 shows a state where the door 104 is in a closed state, and indicates the entrance 102 with broken lines. A frame 103 is fixed above the entrance 102 so as to extend in a vehicle front-rear direction. Here, the "vehicle front-rear direction" is a direction parallel to a vehicle travelling direction, and is the direction indicated by double arrow B in FIG. 1. Note that the vehicle side wall 101 and the frame 103 constitute a part of the vehicle body.

Also, one door 104 is installed so as to cover the entrance 102. One door 104 is a one-panel sliding door, and is opened/closed by the plug door device 1. As shown in FIG. 2 in detail, the door 104 is formed so as to gradually curve and bulge at its lower side, outward in a width direction of the vehicle. Here, the "width direction of the vehicle" (hereinafter referred to also as the "vehicle width direction") is a direction perpendicular to the vehicle front-rear direction and up-down direction, and is a direction indicated by double arrow C in FIG. 2. Note that the door 104 is configured to substantially seal the entrance 102 at a closed position (position shown in FIGS. 1 and 2), which is the position where the door 104 is in a closed state.

The plug door device 1 shown in FIGS. 1 to 5 is installed at the entrance 102 of the vehicle, and is provided as a device for performing an operation of opening/closing the door 104 and a plugging operation of moving the door 104 in the vehicle width direction. This plug door device 1 is configured to include a fixed base 11, a slide base 12, a door drive mechanism 13 for driving one door 104 so as to move the door 104 in the vehicle front-and-rear direction, a shaft portion 14 that is driven by the door drive mechanism 13 in the vehicle front-rear direction, a guide portion 15 for guiding the shaft portion 14, a double-speed rail 16, a locking mechanism 17, a pivoting arm 18, and the like. Note that FIG. 4 omits the fixed base 11.

The fixed base 11 is fixed to a plate-like member 103a, which is a part of the frame 103 that constitutes the vehicle body (see FIG. 5). The fixed base 11 is thereby fixed so as not to move relatively to the vehicle body. Also, the fixed base 11 is provided with a flat plate-like portion 11a that is horizontally installed, and a pair of slide support portions (11b, 11b) that are provided on both sides in the vehicle front-rear direction of the plate-like portion 11a. The slide support portions 11b are provided as block-like members installed so as to extend in the vehicle width direction. A rail member 11c for supporting the slide base 12 slidably in the vehicle width direction is fixed to each slide support portion 11b. Note that the present embodiment describes an exemplary mode in which the plate-like portion 11a is configured as two plate-like members fixed to the vehicle body.

The slide base 12 shown in FIGS. 3 to 5 is installed on the underside of the fixed base 11, slidably in the vehicle width direction relative to the fixed base 11. The slide base 12 is provided with a main body 12a installed so as to horizontally extend in a flat manner, a bracket portion 12b, and wheel portions 12c.

The bracket portion 12b is provided as a portion that extends so as to bend downward relative to the main body 12a at an end on the outside (door 104 side) in the vehicle width direction of the main body 12a, and thereafter, horizontally bend toward the outside in the vehicle width direction. The double-speed rail 16, which will be described later, is installed on this bracket portion 12b. The wheel portions 12c are installed on both sides in the vehicle front-rear direction of the main body 12a, and are each configured to include a wheel that rolls on the rail member 11c extending in the vehicle width direction. The slide base 12 is thereby configured to be slidable in the vehicle width direction relative to the fixed base 11.

Regarding Door Drive Mechanism and Double-Speed Rail

The door drive mechanism 13 shown in FIGS. 3 to 5 is installed on the main body 12a of the slide base 12 and is provided as a mechanism for moving one door 104 in the vehicle front-rear direction via the connecting portion 19. Note that in the present embodiment, the door drive mechanism 13 is installed at the lower side of the main body 12a. The door drive mechanism 13 is configured to include a drive portion 13a including a direct-drive brushless electric motor 21 (see FIG. 6, which will be described later), a drive pulley 13b, a plurality of follower pulleys 13c, a drive belt 13d, a plurality of idler pulleys 13e, and the like.

The drive pulley 13b is provided as a pulley to which a driving force from the drive portion 13a is input. The follower pulleys 13c are provided in association with the drive pulley 13b, and the number of the follower pulleys 13c is two in the present embodiment. The drive pulley 13b constitutes a drive wheel member in the present embodiment, the follower pulleys 13c constitute a follower wheel member in the present embodiment, and the drive belt 13d constitutes an endless member in the present embodiment. The drive belt 13d is a toothed belt, and is provided as a looped belt member that is looped around the outer circumference of the drive pulley 13b and the follower pulleys (13c, 13c) so as to circle therearound, and that rotates the follower pulleys (13c, 13c) with rotation of the drive pulley 13b. The connecting portion 19 is attached to the drive belt 13d.

The number of idler pulleys 13e is two in the present embodiment, and each idler pulley 13e is disposed at a position where it is pressed against the drive belt 13d from the outside of the drive belt 13d toward the inside, between the drive pulley 13b and a corresponding follower pulley 13c. The drive belt 13d is thereby configured to be looped so as to form a predetermined angle with respect to the outer circumference of each idler pulley 13e, and to generate predetermined tension on the drive belt 13d.

Note that the drive portion 13a and the drive pulley 13b are disposed at the central part in the vehicle front-rear direction of the slide base 12. The follower pulleys (13c, 13c) are disposed respectively on both sides in the vehicle front-rear direction of the drive pulley 13b.

Figure 6:
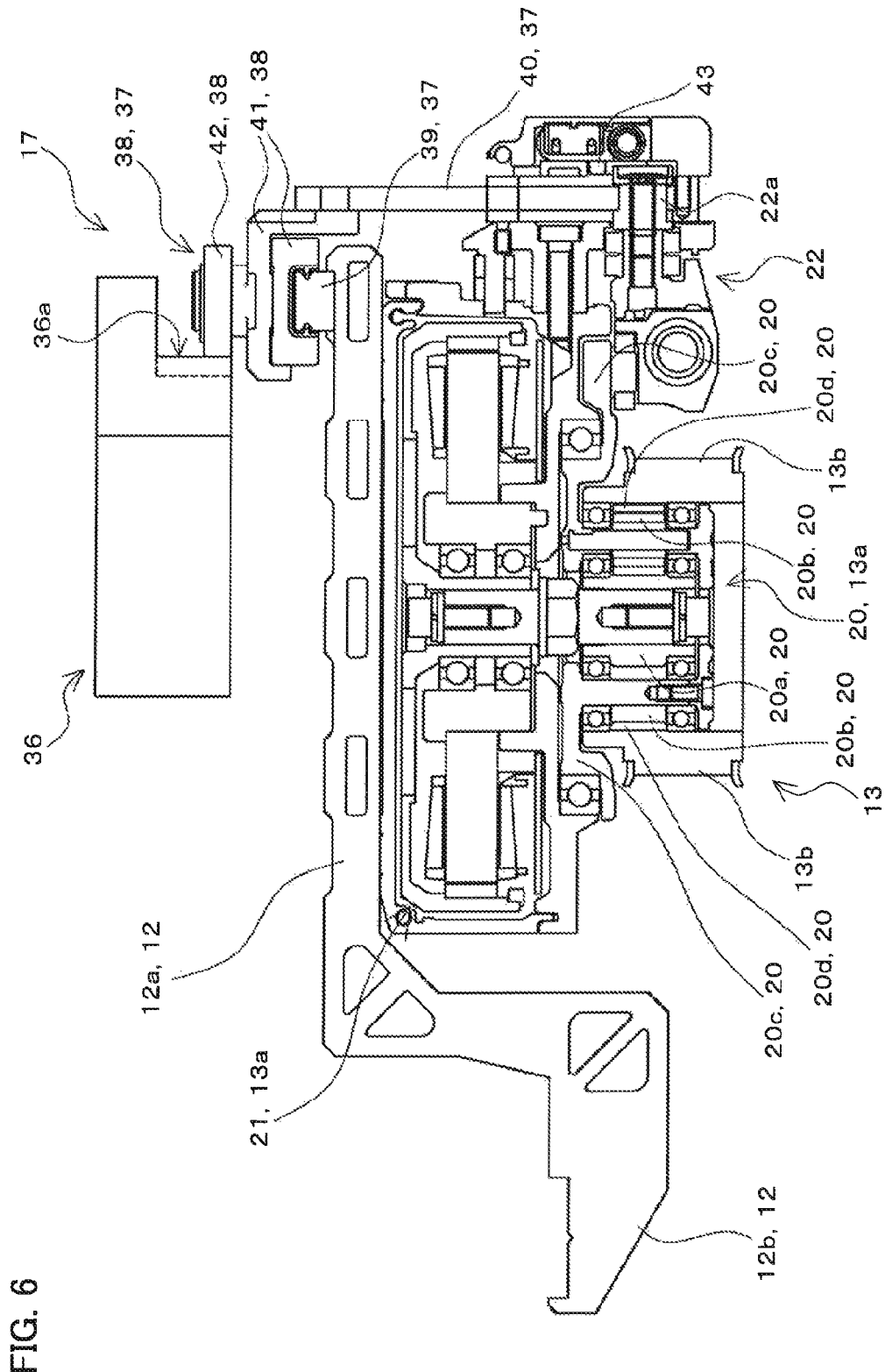
FIG. 6 is a diagram schematically showing a cross-sectional structure of the center in a vehicle front-rear direction of a door drive mechanism in the plug door device shown in FIG. 3.

FIG. 6 is a diagram schematically showing a cross-sectional structure at the center in the vehicle front-rear direction of the door drive mechanism 13, and shows a cross-sectional structure of a face perpendicular to the vehicle front-rear direction. FIG. 6 omits some of the constituent elements and shows the remaining constituent elements in a simplified manner, and also omits hatching for indicating a cross-sectional state, from a viewpoint of clearly illustrating the shown constituent elements. Note that FIG. 6 also shows an outer shape of the locking mechanism 17, which will be described later.

As shown in FIG. 6, the drive portion 13a is configured to include the brushless electric motor 21 that is provided as a driving source and constitutes an electric motor in the present embodiment, as well as a planet gear mechanism 20 to which a driving force from the brushless electric motor 21 is input. The planet gear mechanism 20 is configured to include a sun gear 20a, a plurality of planet gears 20b, a carrier 20c, a ring gear 20d, and the like.

A driving force from the brushless electric motor 21 is input to the sun gear 20a. The planet gears 20b are disposed around the sun gear 20a, and are provided so as to mesh with the sun gear 20a and revolve around the sun gear 20a while rotating. The carrier 20c is provided as a frame member for rotatably supporting each planet gear 20b and also revolvably supporting each planet gear 20b. The ring gear 20d is provided as a ring-like gear having an inner-circumferential internal gear that meshes with the planet gears 20b.

Note that in the ring gear 20d, its ring-like portion having the internal gear formed so as to mesh with the planet gears 20b is formed integrally with the drive pulley 13b inside the cylindrically-shaped drive pulley 13b. Thus, a reduction in the number of parts is achieved. Also, in the door drive mechanism 13, the sun gear 20a, the planet gears 20b, and the ring gear 20d in the planet gear mechanism 20 are disposed inside the drive pulley 13b, thereby achieving a size reduction. For this reason, a further reduction in the size of the plug door device 1 is achieved.

Also, a part of the outer-circumferential portion of the carrier 20c is connected to a lock output portion 22. The lock output portion 22 is provided as a mechanism for inputting a driving force that is output from the carrier 20c to the locking mechanism 17, which will be described later, as a result of the carrier 20c swinging around the axis of the sun gear 20a. The lock output portion 22 is configured to convert the direction in which a driving force output as a result of the swinging of the carrier 20c acts, and output the converted driving force as a driving force in a linear direction parallel to the vehicle front-rear direction. Also, an output roller 22a is provided at a tip portion of the lock output portion 22 from which the driving force is output. The driving force of the carrier 20c is input to the locking mechanism 17, which will be described later, via the output roller 22a.

Note that although the present embodiment described an exemplary mode in which the driving force from the direct-drive brushless electric motor 21 is input to the sun gear 20a, the driving force output from the ring gear 20d is input to the drive pulley 13b, and the driving force output from the carrier 20c is input to the locking mechanism 17, this need not be the case. The configuration need only be such that the driving force from the brushless electric motor 21 is input to one of the sun gear 20a, the carrier 20c, and the ring gear 20d, the driving force output from one of the sun gear 20a, the carrier 20c, and the ring gear 20d is input to the drive pulley 20b, and the driving force output from the remaining one of the sun gear 20a, the carrier 20c, and the ring gear 20d is input to the locking mechanism 17.

The connecting portion 19 that is attached to the drive belt 13d and transmits a driving force from the door drive mechanism 13 is constituted by a plate-like member that is formed in a bent manner. An end of the connecting portion 19 is fixed relative to the drive belt 13d at a position between the two follower pulleys (13c, 13c) on the side where the drive belt 13d is looped around the follower pulleys (13c, 13c) opposite the drive pulley 13b.

Also, the connecting portion 19 is configured to extend downward from a portion fixed to the drive belt 13d, then bend and horizontally extend toward the door 104 side, and again bend and extend upward. Further, the connecting portion 19 is fixed, at an end of the upward-extending portion, to a support rail 16d of the double-speed rail 16, which will be described later.

Also, the connecting portion 19 is provided with a protruding end portion 19a that partially bends from the end of the upward-extending portion and horizontally protrudes and extends. The protruding end portion 19a is provided with the shaft portion 14 that protrudes in a cantilevered manner so as to extend upward. Note that the shaft portion 14 is provided with a shaft portion roller 14a that is rotatably attached to a shaft body of the shaft portion 14 fixed to the protruding end portion 19a.

The double-speed rail 16 shown in FIGS. 3 to 5 is provided so as to extend in the vehicle front-rear direction. The double-speed rail 16 is configured to include two facing racks (16a, 16b), a pinion 16c, and the support rail 16d. The two facing racks (16a, 16b) include an upper rack 16a disposed at the upper side and a lower rack 16b disposed at the lower side. The upper rack 16a and the lower rack 16b are disposed so as to extend parallel to each other in the vehicle front-rear direction.

The pinion 16c is disposed between the two racks (16a, 16b), and is disposed so as to mesh with teeth provided on the racks (16a, 16b). This pinion 16c is rotatably supported by the support rail 16d. The pinion 16c is thereby connected to the connecting portion 19 side. That is to say, the pinion 16c is connected to the connecting portion 19 via the support rail 16d. For this reason, the connecting portion 19 fixed to the drive belt 13d, the support rail 16d, and the pinion 16c are connected to one another such that the relative positions thereof do not change.

Also, the support rail 16d for rotatably supporting the pinion 16c is configured to support the upper rack 16a and the lower rack 16b in a state of sandwiching them from both sides in the vehicle width direction. Note that the support rail 16d supports the upper rack 16a and the lower rack 16b slidably in the vehicle front-rear direction.

Also, in the double-speed rail 16, the lower rack 16b, which is one of the two racks (16a, 16b), is fixed and connected to the bracket portion 12b of the slide base 12, and the other rack, namely the upper rack 16a is connected to the door 104 side. Note that the upper rack 16a is connected to the door 104 via a door support member 104a. The door support member 104a supports the door 104 in a suspending manner.

Due to the above-described configuration of the double-speed rail 16, upon the drive pulley 13b in the door drive mechanism 13 being driven, the support rail 16d and the pinion 16c move in the vehicle front-rear direction together with the connecting portion 19 fixed to the drive belt 13d. The pinion 16c thereby moves toward one side in the vehicle front-rear direction while meshing with the lower rack 16b fixed to the slide base 12. Then, relative to this moving pinion 16c, the upper rack 16a that meshes with the pinion 16c moves toward the same side in the vehicle front-rear direction. For this reason, the upper rack 16a moves relative to the lower rack 16b at a speed that is double the moving speed of the pinion 16c. The amount of movement of the upper rack 16a relative to the lower rack 16b is double the amount of movement of the pinion 16c relative to the lower rack 16b, and the direction of the movement is the same. The door 104 connected to the upper rack 16a via the door support member 104a will also move at the same speed as that of the upper rack 16a. Then, the door 104 moves in the vehicle front-rear direction relative to the slide base 12 to which the lower rack 16b is connected.

Regarding Plugging Mechanism

Figure 7:
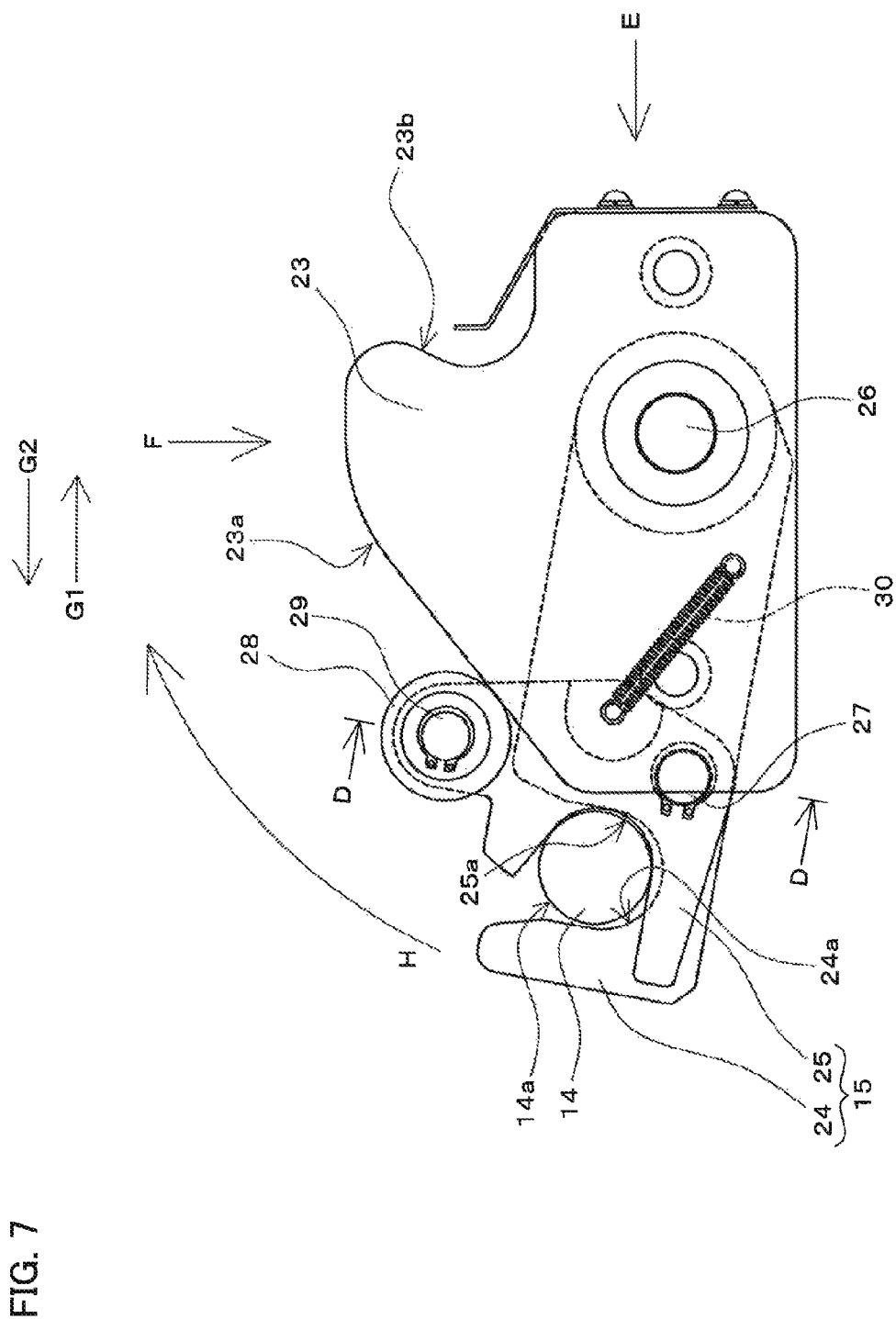
FIG. 7 is a plan view of a plugging mechanism of the plug door device shown in FIG. 3.
Figure 8:
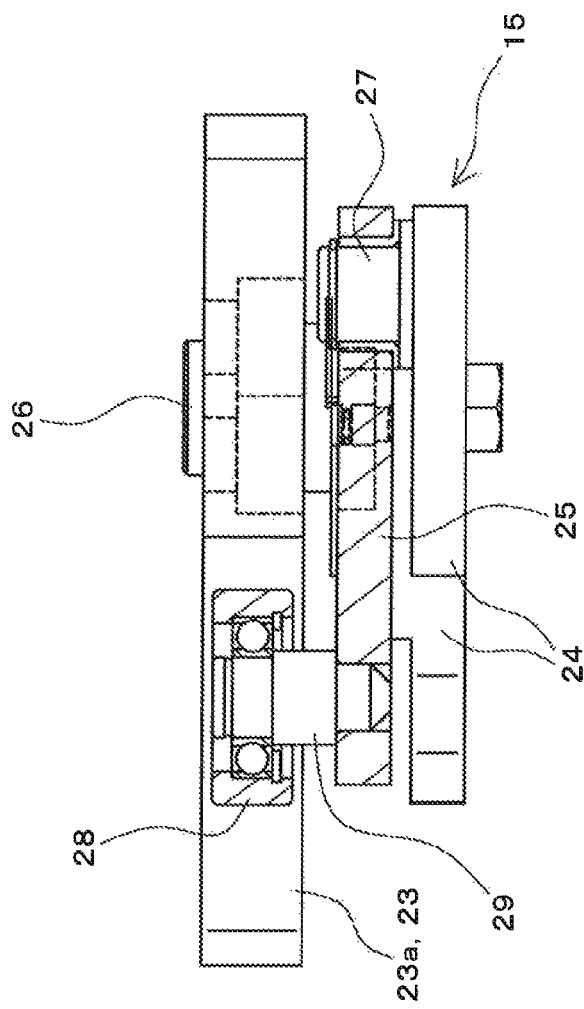
FIG. 8 is a diagram including a partial cross-section of the plugging mechanism shown in FIG. 7, as viewed from the position indicated by arrows of line D-D.
Figure 9:
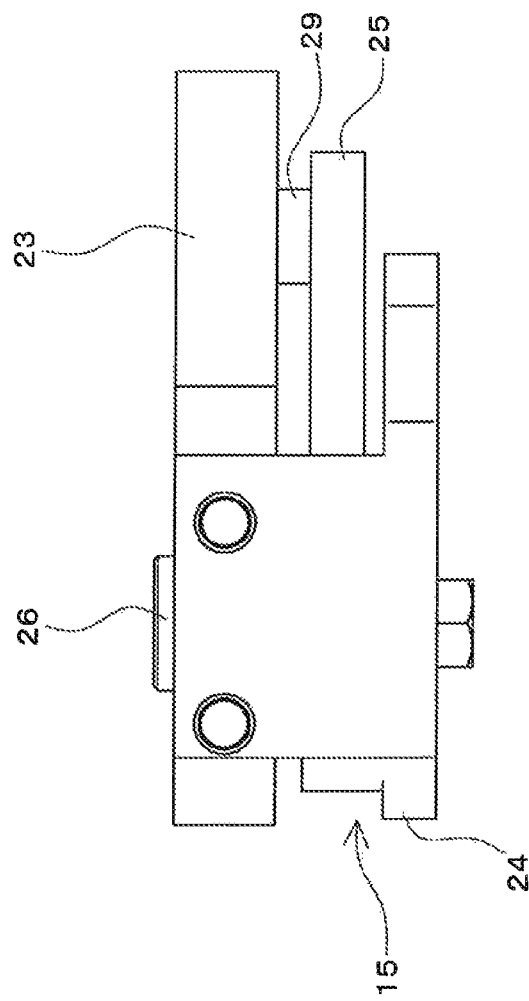
FIG. 9 is a side view of the plugging mechanism shown in FIG. 7, as viewed in the direction indicated by an arrow of line E.
Figure 10:
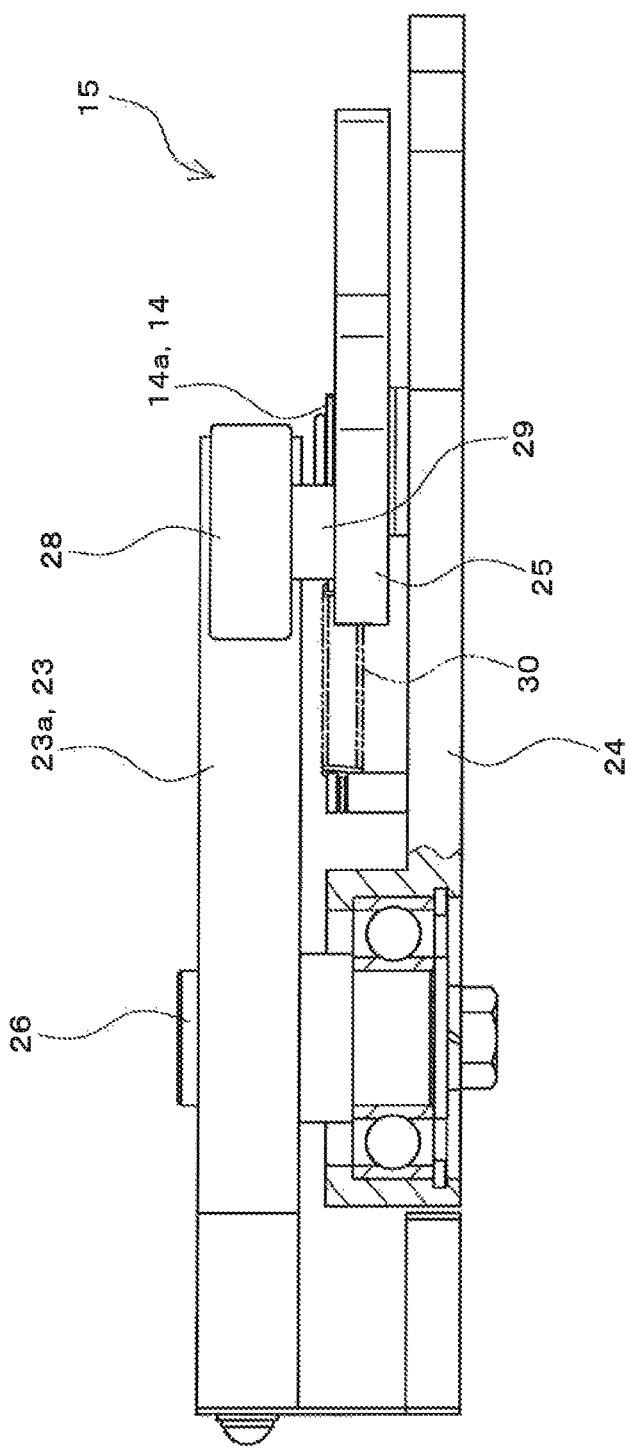
FIG. 10 is a back view of the plugging mechanism shown in FIG. 7 including a partial cross-section as viewed in the direction indicated by an arrow of line F.
Figure 11:
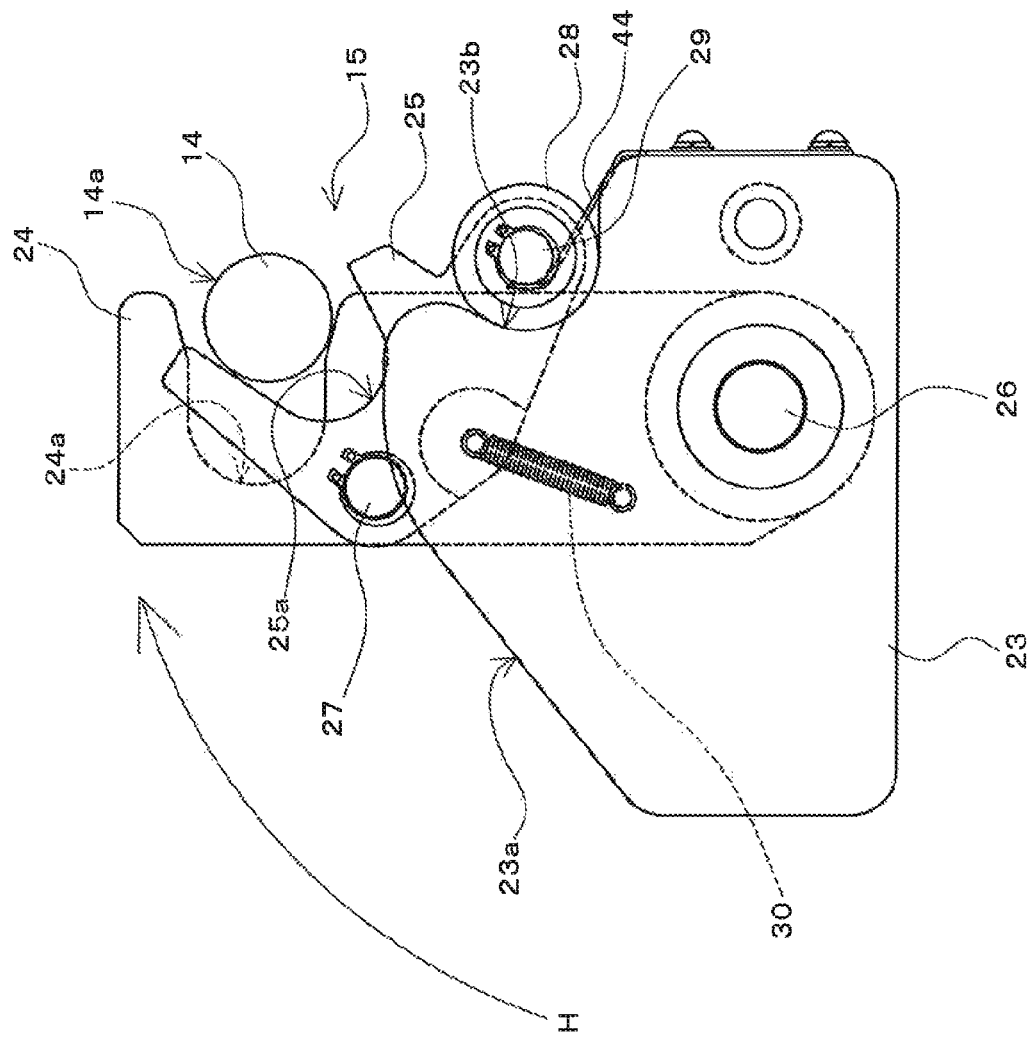
FIG. 11 is a plan view for illustrating an operation of the plugging mechanism shown in FIG. 7.

In the plug door device 1, a plugging mechanism for performing a plugging operation of moving the door 104 in the vehicle width direction is configured to include the shaft portion 14, the guide portion 15, and a roller guide 23. FIG. 7 is a plan view showing the plugging mechanism. FIG. 8 is a diagram including a partial cross-section of the plugging mechanism, as viewed from the position indicted by arrows of line D-D in FIG. 7. FIG. 9 is a side view of the plugging mechanism, as viewed in the direction indicated by an arrow of line E in FIG. 7. FIG. 10 is a back view of the plugging mechanism including a partial cross-section as viewed in the direction indicated by an arrow of line F in FIG. 7. FIG. 11 is a plan view for illustrating an operation of the plugging mechanism. Note that FIGS. 8 to 10 show enlarged parts, with respect to FIGS. 7 to 11. FIGS. 8 to 10 show a state of the plugging mechanism when the door 104 is at the closed position. On the other hand, FIG. 11 shows a state immediately after the plugging operation is finished when the door 104 opens from the closed position.

The plugging mechanism shown in FIGS. 3 to 5 and FIGS. 7 to 10 (shaft portion 14, guide portion 15, roller guide 23) is disposed between the fixed base 11 and the slide base 12. The shaft portion 14 is provided at the protruding end portion 19a of the connecting portion 19, as mentioned above. The roller guide 23 is fixed at the side of the lower face of the plate-like portion 11a of the fixed base 11. The guide portion 15 is configured to include a first link 24 and a second link 25, and is installed on the lower side of the fixed base 11. The guide portion 15 is rotatably installed, at the first link 24 thereof, on the fixed base 11.

The first link 24 is a substantially rectangular plate-like member, and one end side thereof is provided pivotably relative to the fixed base 11. Specifically, the first link 24 is provided pivotably around a first pivoting shaft 26 that is disposed in a substantially vertical direction. Also, a first dent portion 24a capable of housing the shaft portion roller 14a of the shaft portion 14 is formed in the periphery on the other end side of the first link 24.

The second link 25 is a plate-like member and is pivotably provided on the first link 24. Specifically, the second link 25 is provided pivotably around a second pivoting shaft 27 that is provided in the vicinity of the first dent portion 24a of the first link 24 and is disposed in a substantially vertical direction. Also, a second dent portion 25a capable of housing the shaft portion roller 14a of the shaft portion 14 is formed in the periphery of the second link 25. Also, the second link 25 is provided with a guide portion roller 28 that is attached rotatably around a vertical axis. The guide portion roller 28 is attached rotatably relative to a rotary shaft 29 that protrudes upward from the second link 25, and is disposed at substantially the same height as that of the roller guide 23 fixed to the fixed base 11.

When the door 104 is at the closed position, as shown in FIG. 7, the periphery of the shaft portion 14 is surrounded by the first dent portion 24a of the first link 24 and the second dent portion 25a of the second link 25, as viewed from above. Specifically, the first link 24 is retained such that the opening side of the first dent portion 24a faces outward in the vehicle width direction, and the second link 25 is retained such that the opening side of the second dent portion 25a faces toward the direction opposite to the direction toward the first pivoting shaft 26. Thus, the outward movement of the shaft portion 14 at the first link 24 from the inside of the first dent portion 24a is constrained by the second link 25.

Also, when the door 104 is at the closed position, the guide portion roller 28 of the second link 25 is located outward in the vehicle width direction of the second dent portion 25a. The second pivoting shaft 27 of the second link 25 is located inward in the vehicle width direction of the second dent portion 25a.

Also, a helical spring 30 serving as a biasing means is provided between the first link 24 and the second link 25. One end of the helical spring 30 is provided substantially halfway between the second pivoting shaft 27 of the second link 25 and the guide portion roller 28, and the other end is provided at a position near the first pivoting shaft 26 in the first link 24. Thus, the second link 25 is biased by the helical spring 30 so as to pivot in the direction in which the constraint on the shaft portion 14 is released (i.e., in the clockwise direction around the second pivoting shaft 27, as viewed from above). That is to say, the second link 25 is biased by the helical spring 30 in the direction in which the guide portion roller 28 approaches the roller guide 23.

The roller guide 23 is provided as a plate-like member. The roller guide 23 has, on its side faces, an angled face 23a for guiding the guide portion roller 28, and a curved face 23b for guiding the guide portion roller 28 continuously from the angled face 23a.

The angled face 23a is provided as a part of the side face of the roller guide 23, and is configured as a flat face formed so as to extend more outward in the vehicle width direction toward the direction in which the door 104 opens (hereinafter referred to as an "opening direction"; denoted by arrow G1 in FIG. 7).

The curved face 23b is provided as a part of the side face of the roller guide 23, and is configured as a curved face that continues from the angled face 23a, curves so as to protrude in a substantially semicircular shape, then further curves so as to be dent in a substantially semicircular shape, and then extends toward the inside in the vehicle width direction. Note that the curved face 23b protrudes in the opening direction at a position close to the outside in the vehicle width direction, and is recessed toward the direction in which the door 104 closes (i.e., the direction opposite to the opening direction, hereinafter referred to as a "closing direction"; denoted by arrow G2 in FIG. 7) at a position close to the inside in the vehicle width direction.

Regarding Pivoting Arm

Figure 12:
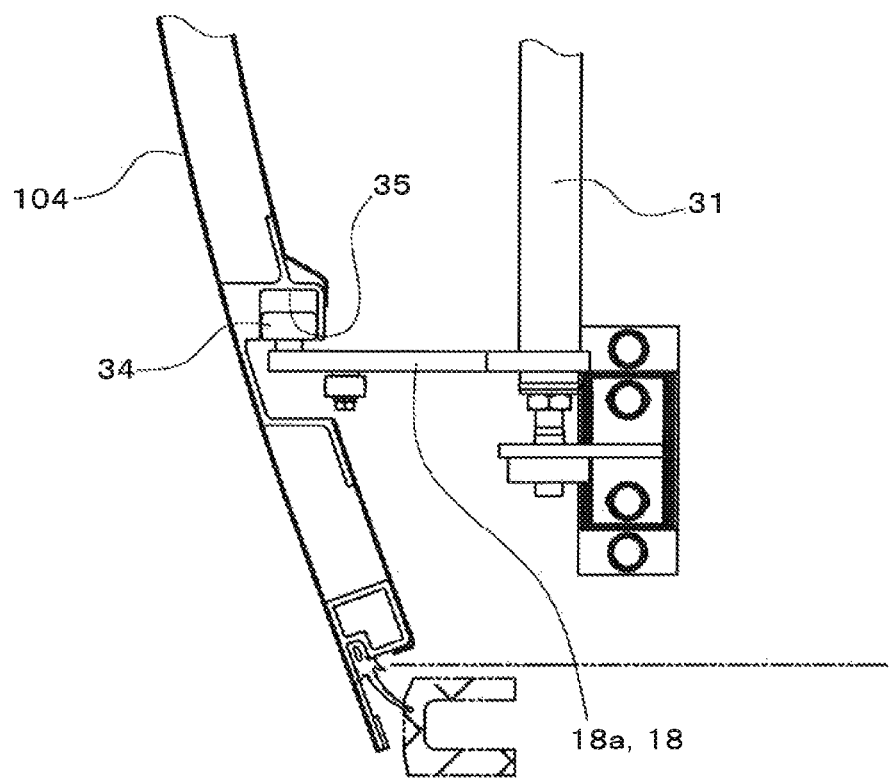
FIG. 12 is an enlarged schematic view of the lower part of the door in FIG. 2.

FIG. 12 is an enlarged schematic view of the lower part of the door 104 in FIG. 2. As shown in FIGS. 1 to 5 and 12, the pivoting arms 18 (18a, 18b) that pivot and thereby guide the door 104 in the vehicle width direction are provided in the upper and lower parts of the entrance 102. Note that an upper pivoting arm 18a is provided in the upper part of the entrance 102, and a lower pivoting arm 18b is provided in the lower part of the entrance 102.

The upper pivoting arm 18a is fixed to the upper end side of the connecting shaft 31 extending in a substantially vertical direction, and is installed so as to horizontally protrude in a cantilevered manner from the connecting shaft 31. Also, the connecting shaft 31 is pivotably attached, at its upper and lower ends, to brackets that extend from the edges of the entrance 102 on the vehicle side wall 101. Also, the tip of the upper pivoting arm 18a is provided with an upper roller 32 that is provided rotatably around a rotary shaft extending upward in a substantially vertical direction. Also, the main body 12a of the slide base 12 is provided with an elongated hole 33 that extends in the vehicle front-rear direction (see FIG. 4). The upper roller 32 is inserted in the elongated hole 33 from below and is disposed in a relatively movable manner along the elongated hole 33.

The lower pivoting arm 18b is fixed to the lower side of the connecting shaft 31 and is installed so as to horizontally protrude in a cantilevered manner from the connecting shaft 31. For this reason, the lower pivoting arm 18b is configured to pivot together with the connecting shaft 31 as a result of the pivoting of the upper pivoting arm 18a. Also, the tip of the lower pivoting arm 18b is provided with a lower roller 34 that is provided rotatably around a rotary shaft extending upward in a substantially vertical direction. A door rail 35 that extends in the vehicle front-rear direction is provided on the lower end side, on the inside in the vehicle width direction of the door 104. This door rail 35 has a groove formed so as to open downward and extend in the vehicle front-rear direction. The lower roller 34 is inserted in the groove of the door rail 35 from below and is configured in a relatively movable manner along the door rail 35 (see FIG. 12).

Regarding Locking Mechanism

Figure 13:
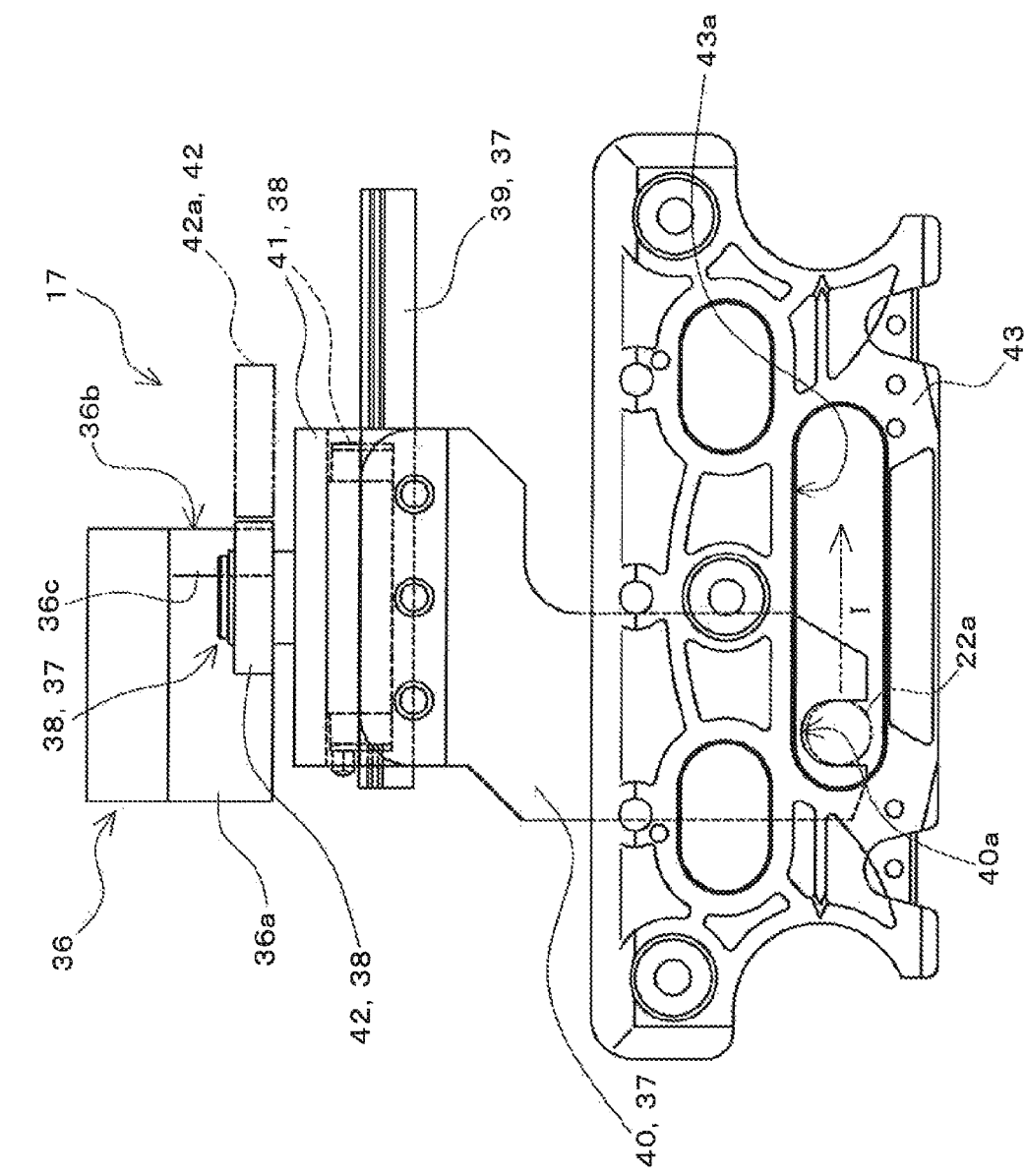
FIG. 13 is a front view of a locking mechanism in the plug door device shown in FIG. 3.
Figure 14:
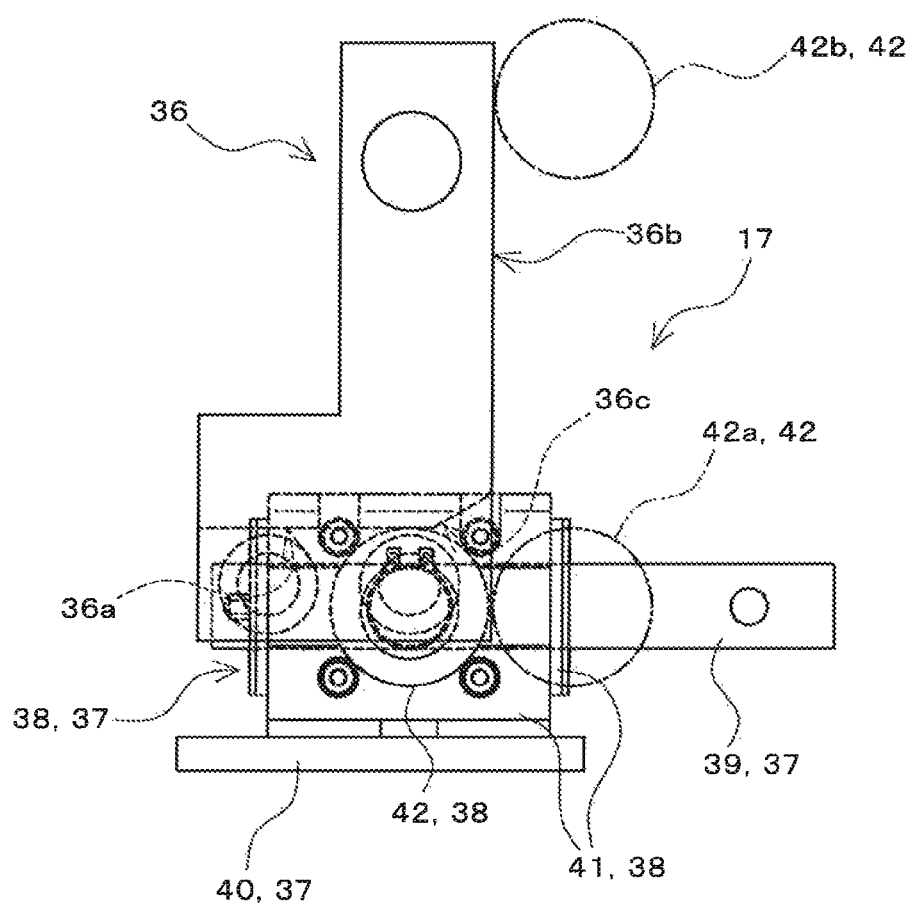
FIG. 14 is a plan view of the locking mechanism shown in FIG. 13.

FIG. 13 is a front view of the locking mechanism 17. FIG. 14 is a plan view of the locking mechanism 17. The locking mechanism 17 shown in FIGS. 3 to 6, 13, and 14 is provided as a mechanism capable of locking the door 104 at the closed position of the door 104 so as to restrict movement of the door 104. The locking mechanism 17 is configured to include a fixed lock portion 36 and a movable lock portion 37.

The fixed lock portion 36 is configured as a block-like member provided so as to be fixed to the fixed base 11. Note that FIGS. 4, 6, 13, and 14 omit the fixed base 11. Although the fixed lock portion 36 is provided as a block-like member in the present embodiment, this need not be the case. It may alternatively be provided as a plate-like member, a pin-like member, or the like that is fixed to the fixed base 11.

The movable lock portion 37 is provided so as to be movable with a driving force that is output from the carrier 20c in the planet gear mechanism 20 to the locking mechanism 17. The movable lock portion 37 is configured to come into contact with the fixed lock portion 36 on the inside in the vehicle width direction at the closed position of the door 104. Thus, the locking mechanism 17 is provided so as to restrict movement of the door 104 outward in the vehicle width direction when the door 104 is in a closed state, as a result of the movable lock portion 37 coming into contact with the fixed lock portion 36.

Also, the movable lock portion 37 is configured to include a sliding contact portion 38 capable of coming into contact with the fixed lock portion 36, a slide rail 39, and a transmission member 40. The slide rail 39 is provided as a rail member that is fixed to the slide base 12 and extends in the vehicle front-rear direction. Thus, the slide rail 39 is configured to restrict the direction of sliding movement of the sliding contact portion 38 to a direction parallel to the vehicle front-rear direction.

The transmission member 40 is provided as a plate-like member and is disposed so as to extend in the up-down direction. The transmission member 40 is provided as a member for transmitting a driving force that is output from the carrier 20c in the planet gear mechanism 20 to the locking mechanism 17, to the sliding contact portion 38. Note that in the present embodiment, the transmission member 40 is provided with a dent portion 40a at its lower side, and is disposed in a state where the output roller 22a of the lock output portion 22 is fitted to the dent portion 40a. Also, the upper end side of the transmission member 40 is connected to the sliding contact portion 38.

As a result thereof, the locking mechanism 17 is configured such that a driving force output from the carrier 20c via the lock output portion 22 is input to the transmission member 40. Further, the transmission member 40 moves in the vehicle front-rear direction with movement of the output roller 22a with a driving force from the planet gear mechanism 20. Furthermore, with the movement of the transmission member 40, the sliding contact portion 38 whose sliding movement direction is restricted by the slide rail 39 moves in the vehicle front-rear direction.

Note that the tip of the output roller 22a is disposed inside an elongated hole 43a formed in a guide plate 43. The output roller 22a is disposed movably along the elongated hole 43a (see FIG. 13). Thus, movement of the output roller 22a in the vehicle front-rear direction is configured to be ensured. Note that the guide plate 43 is provided as a plate-like member that is fixed to a housing or the like of the drive portion 13a installed on the slide base 12.

Also, the sliding contact portion 38 is configured to include a slide block 41 and a roller 42. The slide block 41 is provided in a block shape, and is provided as a member whose sliding movement direction is restricted to the vehicle front-rear direction by the slide rail 39. Note that in the present embodiment, the slide block 41 is configured by a plurality of members being fixed so as to be integrated. The upper end side of the transmission member 40 is fixed to one of the integrated members, and a groove is formed in another one of the integrated members such that the sliding contact portion 38 is fitted to the rail face of the slide rail 39 so as to be movable thereon in a sliding manner.

The roller 42 is supported rotatably around a vertical axis relative to the slide block 41. The outer-circumferential side face of the roller 42 is disposed so as to be able to come into contact with the side face of the fixed lock portion 36.

Also, as shown in FIGS. 6, 13, and 14 in detail, the fixed lock portion 36 is provided as a member having a shape with two perpendicular block-like portions that are integrated. A first face 36a, a second face 36b, and an angled face 36c, with which the roller 42 can come into contact, are provided on the side face of the fixed lock portion 36.

The first face 36a is provided as a side face of the fixed lock portion 36 that faces inward in the vehicle width direction. The first face 36a is formed as a face orthogonal to the vehicle width direction, and is configured to come into contact with the outer circumference of the roller 42 in the sliding contact portion 38 of the movable lock portion 37 when the door 104 is in a closed state, and thereby restrict movement of the door 104 to the outside in the vehicle width direction.

The second face 36b is provided as a side face of the fixed lock portion 36 that faces toward the opening direction side in the vehicle front-rear direction. The second face 36b is formed as a face that is orthogonal to the vehicle front-rear direction and capable of coming into contact with the outer circumference of the roller 42 in the movable lock portion 37. Thus, the second face 36b is configured to generate a reaction force balanced with a driving force that is input from the carrier 20c in the planet gear mechanism 20 to the locking mechanism 17 such that the drive pulley 13b is driven to rotate with a driving force that is input from the ring gear 20d in the planet gear mechanism 20 to the drive pulley 13b.

The angled face 36c is provided as a side face of the fixed lock portion 36 between the first face 36a and the second face 36b, and continues to the first face 36a and the second face 36b. This angled face 36c is formed as a face perpendicular to the horizontal direction, and is provided as a face that is angled relative to both the first face 36a and the second face 36b. The roller 42 is disposed so as to be able to come into contact with the fixed lock portion 36 on the first face 36a and the second face 36b, and is configured, due to provision of the angled face 36c, to smoothly move between the first face 36a and the second face 36b that are orthogonal to each other.

Regarding Operation of Plug Door Device

Next, the operation of the plug door device 1 will be described. As shown in FIGS. 1 to 5, when the door 104 is at the closed position, the shaft portion 14 is engaged with both the first dent portion 24a of the first link 24 and the second dent portion 25a of the second link 25, as viewed from above (see FIG. 7). That is to say, the shaft portion 14 is located within the dent portions (24a, 25a).

Also, in the locking mechanism 17, the roller 42 is in contact with the first face 36a of the fixed lock portion 36 when the door 104 is in a closed state, as shown in FIGS. 6, 13, and 14. For this reason, movement of the slide base 12 outward in the vehicle width direction is restricted via the locking mechanism 17 and the carrier 20c of the planet gear mechanism 20. This state restricts the plugging operation toward the outside in the vehicle width direction by the plugging mechanism, and the door 104 is locked such that its movement is restricted.

As a result of the direct-drive brushless electric motor 21 in the door drive mechanism 13 being driven in the above-described state at the closed position, the sun gear 20a in the planet gear mechanism 20 starts to rotate, and the planet gears 20b around the sun gear 20a start to revolve around the sun gear 20a while meshing with the ring gear 20d. Then, the carrier 20c swings with the revolution of the planet gears 20b, and the output roller 22a thereby moves within the elongated hole 43a in the direction indicated by two-dot chain line arrow I in FIG. 13. Thus, the transmission member 40 moves together with the output roller 22a parallel to the opening direction in the vehicle front-rear direction, and the slide block 41 also moves on the slide rail 39 parallel to the opening direction.

As a result thereof, the roller 42, which was in contact with the first face 36a, moves up to the position where the roller 42 is separated from the first face 36a. Note that in FIGS. 13 and 14, the position of the roller 42 that has moved up to the position where it is separated from the first face 36a is shown as the roller 42a indicated by a two-dot chain line. Thus, the state of the door 104 being locked by the locking mechanism 17 is released, and the plugging operation toward the outside in the vehicle width direction by the plugging mechanism is enabled.

As described above, after the plugging operation toward the outside in the vehicle width direction is enabled, drive of the brushless electric motor 21 in the door drive mechanism 13 is further continued. Thus, a driving force that is output to the drive pulley 13b via the ring gear 20d is further transmitted to the shaft portion 14 via the drive belt 13d and the connecting portion 19. Therefore, the shaft portion 14, when moving in the opening direction, biases the second link 25 in the same direction.

Here, as shown in FIG. 7, the pivoting of the second link 25 relative to the first link 24 (pivoting in the clockwise direction around the second pivoting shaft 27, as viewed from above) is restricted at a position where the guide portion roller 28 comes into contact with the angled face 23a of the roller guide 23. Therefore, the second link 25 hardly pivots relative to the first link 24, and gives a pivoting force around the first pivoting shaft 26 (a pivoting force in the clockwise direction, as viewed from above) to the first link 24 via the second pivoting shaft 27. As a result, the guide portion roller 28 moves along the angled face 23a, and the first link 24 pivots around the first pivoting shaft 26 toward the direction indicated by arrow H in the diagram.

While the first link 24 is pivoting in the clockwise direction as viewed from above, the guide portion roller 28 of the second link 25 moves along the angled face 23a of the roller guide 23. At this time, since the second link 25 is attracted toward the angled face 23a side by the helical spring 30, the guide portion roller 28 is not detached from the angled face 23a. Also, while the guide portion roller 28 is moving along the angled face 23a, a state where the first dent portion 24a of the first link 24 and the second dent portion 25a of the second link 25 surround the shaft portion 14 is maintained.

Upon the shaft portion 14 further moving in the opening direction in the above-described state, the position where the guide portion roller 28 and the roller guide 23 come into contact moves from the angled face 23a to the curved face 23b. The guide portion roller 28 is thereby drawn inward in the vehicle width direction along the curved face 23b, and the second link 25 rotates around the second pivoting shaft 27 in the clockwise direction relative to the first link 24, as viewed from above. In other words, as shown in FIG. 11, constraint on the shaft portion 14 by the second link 25 is released. Also, at this time, the pivoting of the first link 24 in the arrow H direction is restricted due to the first link 24 coming into contact with a stopper 44 that is fixed to the roller guide 23.

As described above, the guide portion 15 is configured as a mechanism that pivots while coming into contact with the shaft portion 14 and guides the shaft portion 14 such that the shaft portion 14 moves toward one side in the vehicle width direction (i.e., in the opening direction), when the door 104 opens.

Note that, in the present embodiment, the first link 24 is disposed such that the first dent portion 24a is located outward in the vehicle width direction of the position of the first pivoting shaft 26, when the door 104 is at the closed position. Also, when the door 104 is at the closed position, the second link 25 is disposed such that the guide portion roller 28 is located outward in the vehicle width direction of the center of the shaft portion 14, and that the second pivoting shaft 27 is located inward in the vehicle width direction of the center of the shaft portion 14. With this configuration, the guide portion 15 is configured such that a biasing force from the shaft portion 14 can be efficiently used for the pivoting of the first link 24.

When the first link 24 pivots as described above, a force toward the outside in the vehicle width direction acts on the shaft portion 14. Therefore, a force toward the outside in the vehicle width direction also acts on the door drive mechanism 13 connected to the shaft portion 14 via the connecting portion 19, and a force toward the outside in the vehicle width direction also acts on the slide base 12 on which the door drive mechanism 13 is installed.

As a result thereof, the door drive mechanism 13 and the slide base 12 are guided by the slide support portion 11b of the fixed base 11 and move outward in the vehicle width direction. As a result, the plugging operation in which the door 104 moves outward in the vehicle width direction is performed. Further, as a result of the plugging operation being performed, movement of the door 104 in the opening direction is enabled.

Also, upon the plugging operation toward the outside in the vehicle width direction by the plugging mechanism being finished, the sliding contact portion 38 disposed on the slide rail 39 fixed to the slide base 12 also moves outward in the vehicle width direction together with the slide base 12. As a result, the roller 42 that was at the position of the roller 42a indicated by a two-dot chain line in FIG. 14 moves to the position of the roller 42b indicated by a dashed line. Then, the roller 42 (42b) transitions into a state of being in contact with the second face 36b of the fixed lock portion 36.

Note that the lock output portion 22 connected to the carrier 20c in the planet gear mechanism 20 is provided with a biasing means (not shown), such as a spring, for biasing the output roller 22a in the direction opposite to the direction indicated by two-dot chain line arrow I in FIG. 13. In a state where the roller 42 is in contact with the second face 36b, a biasing force of the aforementioned biasing means acts on the sliding contact portion 38 via the output roller 22a and the transmission member 40, and thus, a state where the roller 42 is pressed against the second face 36b is maintained.

Also, in a state where the roller 42 is pressed against and in contact with the second face 36b, a reaction force balanced with a driving force that is input from the carrier 20c in the planet gear mechanism 20 to the locking mechanism 17 is generated on the second face 36b. Thus, the drive pulley 13b is driven to rotate with a driving force that is input from the ring gear 20d in the planet gear mechanism 20 to the drive pulley 13b.

Then, the drive belt 13d is driven with the rotation of the drive pulley 13b, and the support rail 16d and the pinion 16c in the double-speed rail 16 move together with the connecting portion 19. For this reason, the upper rack 16a connected to the door 104 moves at a speed that is double the speed of the pinion 16c, relative to the lower rack 16b fixed to the slide base 12. Thus, the door 104 moves in the opening direction, and the operation of opening the door 104 is performed. Note that while the door 104 is moving in the opening direction, the shaft portion 14 linearly moves in the opening direction together with the connecting portion 19, without receiving a force in the vehicle width direction from the guide portion 15.

Figure 15:
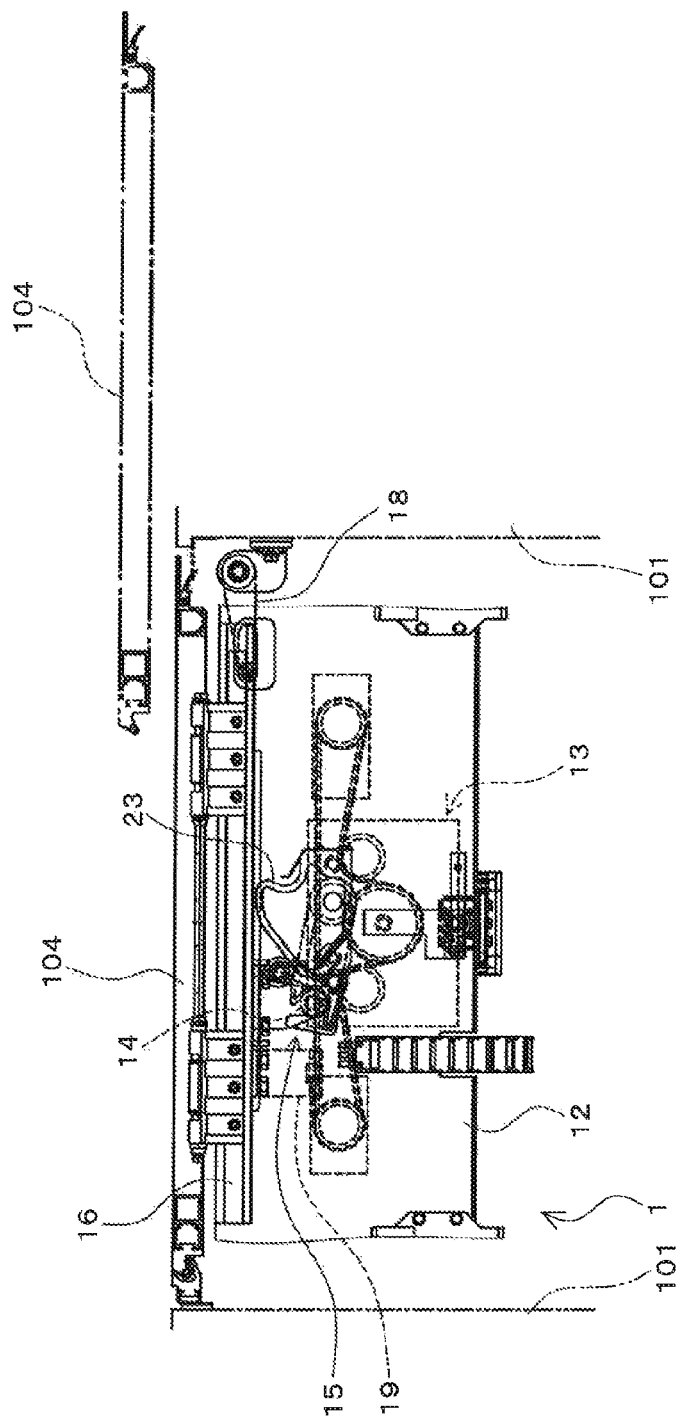
FIG. 15 is a schematic view serving as a plan view of the plug door device shown in FIG. 3, also indicating the position of a door that has undergone an opening operation.

FIG. 15 is a schematic view serving as a plan view of the plug door device 1 shown in FIG. 3, and is also a diagram indicating the position of the door 104 that has undergone an opening operation. Upon the operation of opening the door 104 being finished, the door 104 will move up to the position indicated by a two-dot chain line in FIG. 15.

In contrast, when the door 104 closes, a reverse operation of the above-described operation of opening the door 104 is performed. In other words, the direct-drive brushless electric motor 21 in the door drive mechanism 13 is driven, and the drive pulley 13b driven via the planet gear mechanism 20 rotates in the direction opposite to that in the above-described opening operation. Thus, the support rail 16d and the pinion 16c that are connected to the connecting portion 19 move in the direction opposite to that in the above-described opening operation. Then, the upper rack 16a connected to the door 104 moves at a speed that is double the speed of the pinion 16c, relative to the lower rack 16b fixed to the slide base 12. Thus, the door 104 moves in the closing direction, and the operation of closing the door 104 is performed. Also, the shaft portion 14 linearly moves in the closing direction toward the guide portion 15.

Note that in the guide portion 15, a pivoting force in the clockwise direction, as viewed from above, acts on the second link 25 due to the helical spring 30 when the door 104 is in an open state. That is to say, a tension force from the helical spring 30 acts on the second link 25 such that the guide portion roller 28 is located at a position where it comes into contact with the curved face 23b of the roller guide 23. In the present embodiment, the guide portion roller 28 is fitted into a recess having substantially the same semicircular shape as the outer-circumferential shape of the guide portion roller 28 in its curved face 23b. Accordingly, the first link 24 and the second link 25 are stably retained at predetermined positions. Specifically, the second link 25 is retained at a position where the shaft portion 14 that has linearly moved in the closing direction can come into contact with the inner periphery of the second dent portion 25a. Also, the first link 24 is retained at a position where the shaft portion 14 that has linearly moved in the closing direction can be housed within the first dent portion 24a (see FIG. 11).

Accordingly, when the door 104 has moved in the closing direction by a predetermined amount from the fully-opened position, the shaft portion 14 comes into contact with the inner periphery of the second dent portion 25a of the second link 25 (see FIG. 11) and biases the second link 25. At this time, since the second link 25 pivots around the second pivoting shaft 27 in the anticlockwise direction, as viewed from above, against the force of the helical spring 30, linear movement of the shaft portion 14 in the closing direction is not hindered. During the above pivoting of the second link 25, the guide portion roller 28 moves along the curved face 23b of the roller guide 23. Note that at the time of the pivoting of the second link 25, the first link 24 hardly pivots and is retained at a predetermined position or in the vicinity thereof.

Then, the shaft portion 14 moves in the closing direction up to the position where it comes into contact with the inner periphery of the first dent portion 24a of the first link 24, and biases the first link 24 in the closing direction. The first link 24 thereby pivots around the first pivoting shaft 26 in the anticlockwise direction, as viewed from above, and the shaft portion 14 is guided toward the inside in the vehicle width direction.

At this time, the door 104 moves similarly to the shaft portion 14. In other words, the door 104 linearly moves in the closing direction from the fully-opened position, and is also drawn inward in the vehicle width direction in the vicinity of the closed position and transitions to the closed position. Thus, the plugging operation toward the inside in the vehicle width direction by the plugging mechanism is finished.

As described above, the guide portion 15 is configured as a mechanism that pivots while coming into contact with the shaft portion 14 and guides the shaft portion 14 such that the shaft portion 14 moves toward the other side in the vehicle width direction (i.e., toward the closing direction), when the door 104 closes.

Also, upon the plugging operation toward the inside in the vehicle width direction by the plugging mechanism being finished, the sliding contact portion 38 disposed on the slide rail 39 fixed to the slide base 12 also moves toward the inside in the vehicle width direction, together with the slide base 12. As a result, the roller 42 that was located at the position of the roller 42b indicated by a dashed line in FIG. 14 moves to the position of the roller 42a indicated by a two-dot chain line.

After the roller 42 moves as described above, the reaction force from the second face 36b of the fixed lock portion 36 does not act on the roller 42. Therefore, the transmission member 40 moves parallel to the closing direction in the vehicle front-rear direction with a driving force that is input from the carrier 20c in the planet gear mechanism 20 via the output roller 22a, and the slide block 41 also moves on the slide rail 39 parallel to the closing direction.

As a result thereof, the roller 42 moves from the position of the roller 42a indicated by a two-dot chain line in FIG. 14 up to the position where it comes into contact with the first face 36a of the fixed lock portion 36. Thus, the state of the door 104 being locked by the locking mechanism 17 is ensured, and the plugging operation toward the outside in the vehicle width direction by the plugging mechanism is disabled.

Note that when the above-described opening operation and closing operation of the door 104 are performed, the pivoting arms 18 (18*a*, 18*b*) provided respectively in the upper part and the lower part of the entrance 102 pivot. Thus, the movement of the door 104 in the vehicle width direction is also guided by the upper and lower pivoting arms 18 (18*a*, 18*b*), and a smooth plugging operation of the door 104 is performed.

Regarding Effect of Plug Door Device

With the above-described plug door device 1, the guide portion 15 guides the shaft portion 14 in the vehicle width direction by pivoting while coming into contact with the shaft portion 14. For this reason, the operation of the guide portion 15 is an operation of following the movement of the door 104 in the vehicle width direction. With this configuration, the space occupied by the guide portion 15 in the vehicle width direction can be further reduced in accordance with the state of movement of the door 104 in the vehicle width direction. As a result, a smaller plug door device 1 can be realized that can perform the opening/closing operation and the plugging operation using the door drive mechanism 13 for causing a force in the vehicle front-rear direction to act on the door 104. Also, since the door drive mechanism 13 moves the door 104 in the vehicle front-rear direction via the double-speed rail 16 constituted by the two racks (16*a*, 16*b*) and the pinion 16*c*, the operating stroke of the door drive mechanism 13 can be doubled to efficiently move the door 104. As a result, an even smaller plug door device 1 that is even smaller also in the vehicle front-rear direction can be realized.

Further, with the plug door device 1, one door drive mechanism 13 that is installed on the slide base 12 and moves one door 104 in the vehicle front-rear direction via the connecting portion 19 and the double-speed rail 16 is configured to include the drive portion 13*a* including the direct-drive brushless electric motor 21, the drive pulley 13*b* to which a driving force from the drive portion 13*a* is input, the follower pulleys 13*c*, and the endless member (drive belt) 13*d* for rotating the follower pulleys 13*c* with the rotation of the drive pulley 13*b*. For this reason, when the door drive mechanism 13 operates, the drive pulley 13*b* and the follower pulleys 13*c* do not move. As a result, a part of the door drive mechanism 13 does not remarkably protrude relative to the entrance 102 where the door 104 is installed, unlike a door drive mechanism including a rack-and-pinion mechanism in which a pair of racks that mesh with a pinion move in opposite directions, such as one disclosed in Patent Literature 1. Accordingly, occurrence of restriction on the installation space is significantly suppressed, and the present invention is easily applied also to a one-panel sliding door 104.

Accordingly, according to the present embodiment, a small plug door device 1 can be realized that can perform the opening/closing operation and the plugging operation using the door drive mechanism 13 for causing a force in the vehicle front-rear direction to act on the door 104, and furthermore, a plug door device 1 that is also applicable to a one-panel sliding door 104 can be provided.

Also, with the plug door device 1, the drive portion 13*a* is constituted by the direct-drive brushless electric motor 21 and the planet gear mechanism 20. Further, a driving force of the brushless electric motor 21 is input to one of the sun gear 20*a*, the carrier 20*c*, and the ring gear 20*d* in the planet gear mechanism 20, a driving force from another one thereof is output to the drive pulley 13*b*, and a driving force from the remaining one thereof is output to the locking mechanism 17. For this reason, one direct-drive brushless electric motor 21 enables the operation of opening/closing the door 104, the plugging operation, and the operation of locking the door 104 by the locking mechanism 17 to be performed, and a compact and efficient drive portion 13*a* can be realized.

Also, with the plug door device 1, the movable lock portion 37 comes into contact with the fixed lock portion 36 fixed on the fixed base 11 side, on the inside in the vehicle width direction, and movement of the door 104 in a closed state outward in the vehicle width direction is restricted. For this reason, when the door 104 is in a closed state, the door 104 is more reliably constrained without rattling such that it does not move outward in the vehicle width direction. Accordingly, the door 104 in a closed state can be locked without rattling.

Accordingly, according to the present embodiment, a small plug door device 1 can be realized that can perform the opening/closing operation and the plugging operation using the door drive mechanism 13 for causing a force in the vehicle front-rear direction to act on the door 104, and furthermore, a plug door device 1 that can lock the door 104 in a closed state without rattling can be provided.

Also, with the plug door device 1, a driving force from the planet gear mechanism 20 is transmitted to the sliding contact portion 38 via the transmission member 40, and the sliding contact portion 38 thereby slides in a predetermined restricted direction on the slide rail 39 and comes into contact with the fixed lock portion 36. For this reason, since the sliding contact portion 38 smoothly moves on the slide rail 39 with the driving force from the planet gear mechanism 20, the necessity for setting the strength of the planet gear mechanism 20 to a high level can be suppressed. As a result, a more compact planet gear mechanism 20 can be configured.

Also, with the plug door device 1, the sliding contact portion 38 can move with the slide block 41 on the slide rail 39, while the rotatable roller 42 of the slide contact portion 38 comes into contact with the fixed lock portion 36. For this reason, hindrance of movement of the sliding contact portion 38 on the slide rail 39 by a force of friction with the fixed lock portion 36 is suppressed, and the sliding contact portion 38 can smoothly move on the slide rail 39.

Also, with the plug door device 1, when the door 104 is in a closed state, the movable lock portion 37 comes into contact with the first face 36*a* of the fixed lock portion 36, and the door 104 is locked. On the other hand, when the door 104 opens/closes, the movable lock portion 37 comes into contact with the second face 36*b* of the fixed lock portion 36, the forces acting on the respective portions are in a balanced state, and the output from the planet gear mechanism 20 to the locking mechanism 17 is fixed. Then, the drive pulley 13*b*, the follower pulleys 13*c*, and the endless member (drive belt) 13*d* operate with a driving force that is input from the planet gear mechanism 20 to the drive pulley 13*b*, and the operation of opening/closing the door 104 is performed. For this reason, the driving force from the planet gear mechanism 20 to the drive pulley 13*b* and the locking mechanism 17 is distributed by the fixed lock portion 36 provided with the first face 36*a* and the second face 36*b* that are orthogonal to each other. Accordingly, with a simple mechanism in which the fixed lock portion 36 is provided with the first face 36*a* and the second face 36*b*, a configuration in which the driving force is efficiently distributed to the drive pulley 13*b* and the locking mechanism 17 can be realized.

Also, with the plug door device 1, the drive portion 13*a* for outputting a driving force to the locking mechanism 17 is disposed at the central part of the door 104 in the vehicle front-rear direction, and the locking operation by the locking mechanism 17 is performed at the central part of the door 104. For this reason, the position where the door 104 is locked is prevented from being biased, and the door 104 is locked at a central part in a well-balanced manner. Also, since the plurality of follower pulleys (13c, 13c) are disposed on both sides in the vehicle front-rear direction of the drive pulley 13b disposed at the central part of the door 104, the endless member (drive belt) 13d that circles therearound can be disposed over a longer circling distance in a compact area. For this reason, the circling distance of the endless member 13d can be efficiently ensured.

Also, with the plug door device 1, one door drive mechanism 13 that is installed on the slide base 12 and moves one door 104 in the vehicle front-rear direction via the connecting portion 19 and the double-speed rail 16 is configured to include the drive portion 13a including the brushless electric motor 21, the drive pulley 13b to which a driving force from the drive portion 13a is input, the follower pulleys 13c, and the drive belt 13d for rotating the follower pulleys 13c with the rotation of the drive pulley 13b. For this reason, when the door drive mechanism 13 operates, the drive pulley 13b and the follower pulleys 13c do not move. With this configuration, a part of the door drive mechanism 13 does not remarkably protrude relative to the entrance 102 where the door 104 is installed. Accordingly, occurrence of restriction on the installation space is significantly suppressed, and the present invention is easily applied also to a one-panel sliding door 104.

Also, with the plug door device 1, the drive portion 13a is constituted by a direct-drive brushless electric motor 21 and the planet gear mechanism 20. Further, a driving force of the brushless electric motor 21 is input to one of the sun gear 20a, the carrier 20c, and the ring gear 20d in the planet gear mechanism 20, a driving force from another one thereof is output to the drive pulley 13b, and a driving force from the remaining one thereof is output to the locking mechanism 17. For this reason, one direct-drive brushless electric motor 21 enables the operation of opening/closing the door 104, the plugging operation, and the operation of locking the door 104 by the locking mechanism to be performed, and a compact and efficient drive portion 13a can be realized.

Second Embodiment

Figure 16:
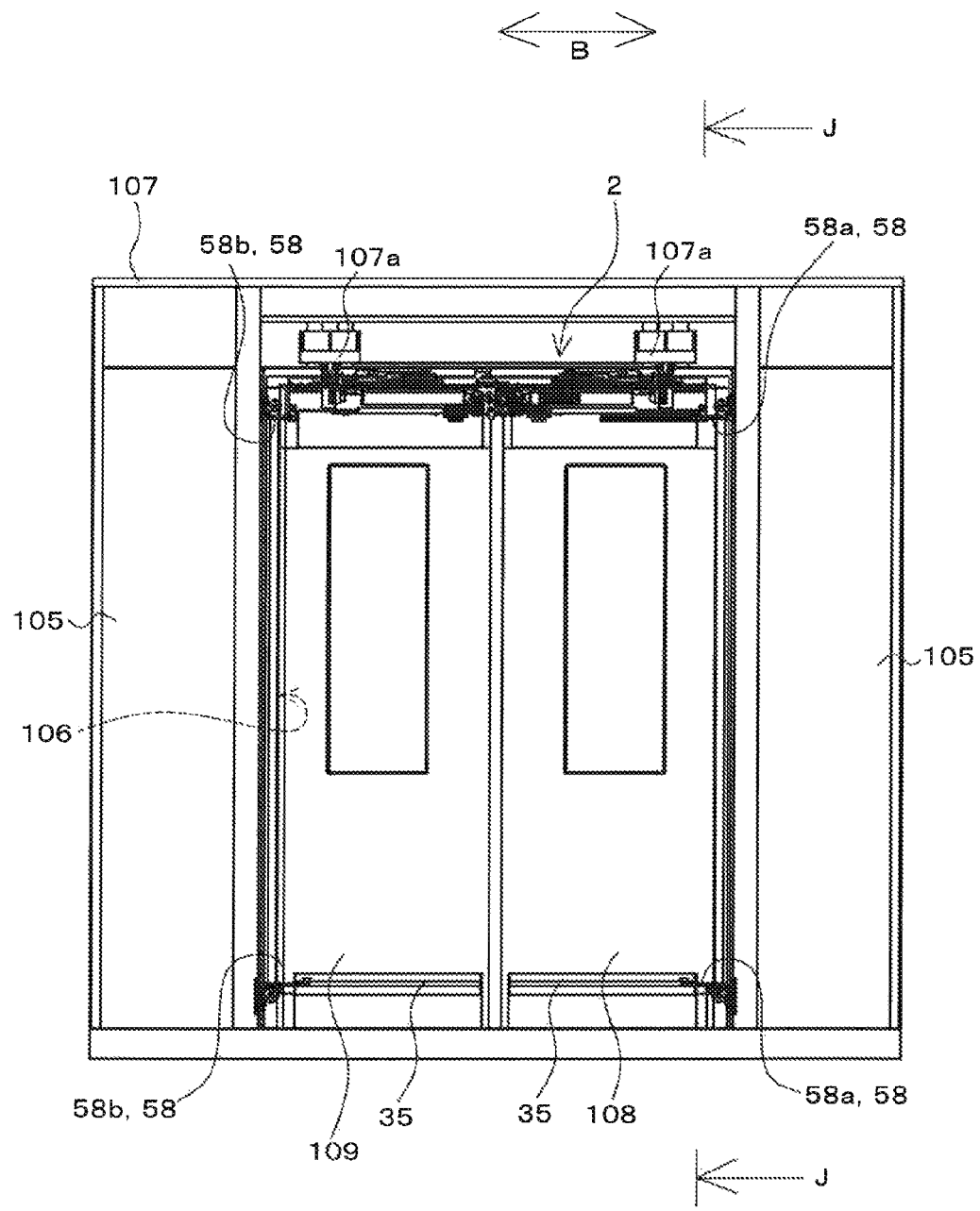
FIG. 16 is a schematic view showing an overall plug door device according to a second embodiment of the present invention.
Figure 17:
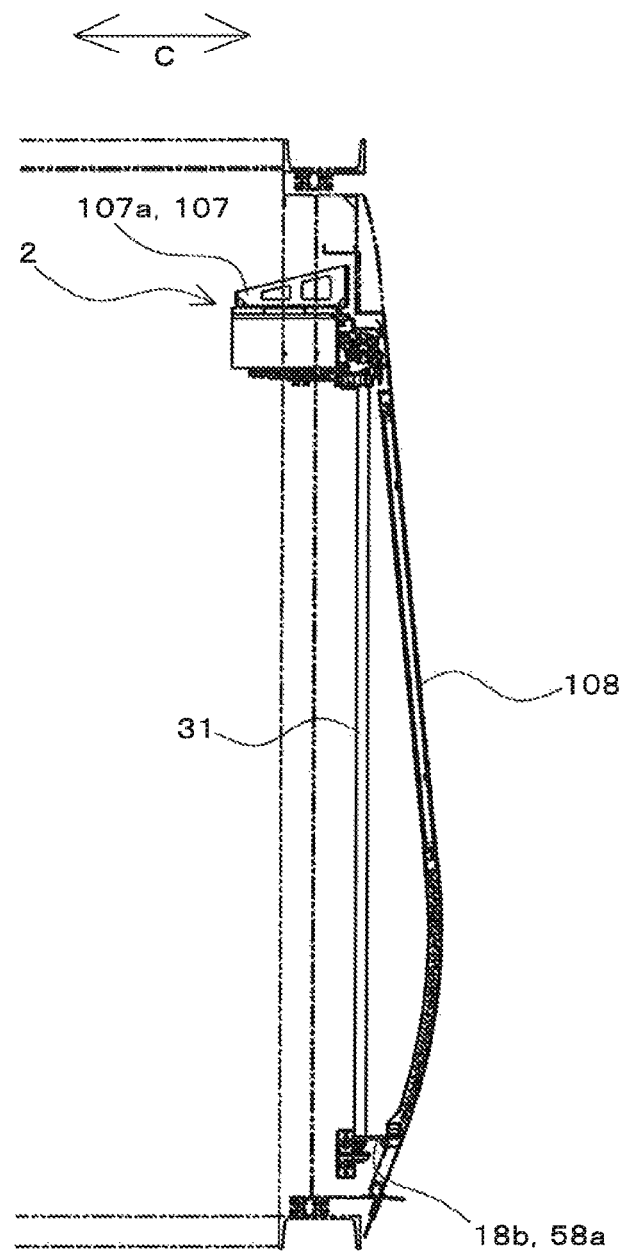
FIG. 17 is a schematic view showing a cross-section, as viewed from the position indicated by arrows of line J-J in FIG. 16.
Figure 18:
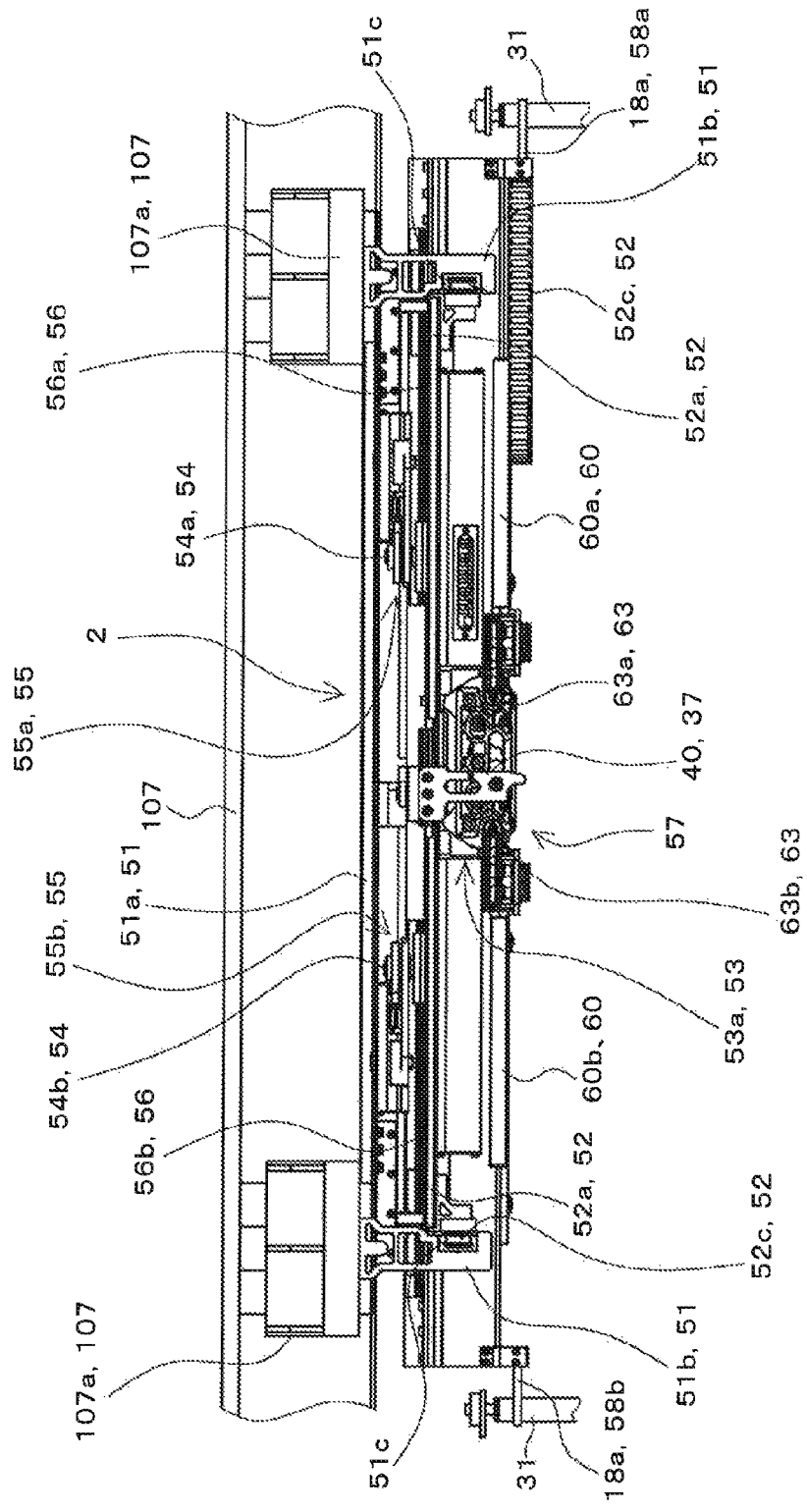
FIG. 18 is a schematic view serving as a front view of the plug door device shown in FIG. 16.
Figure 19:
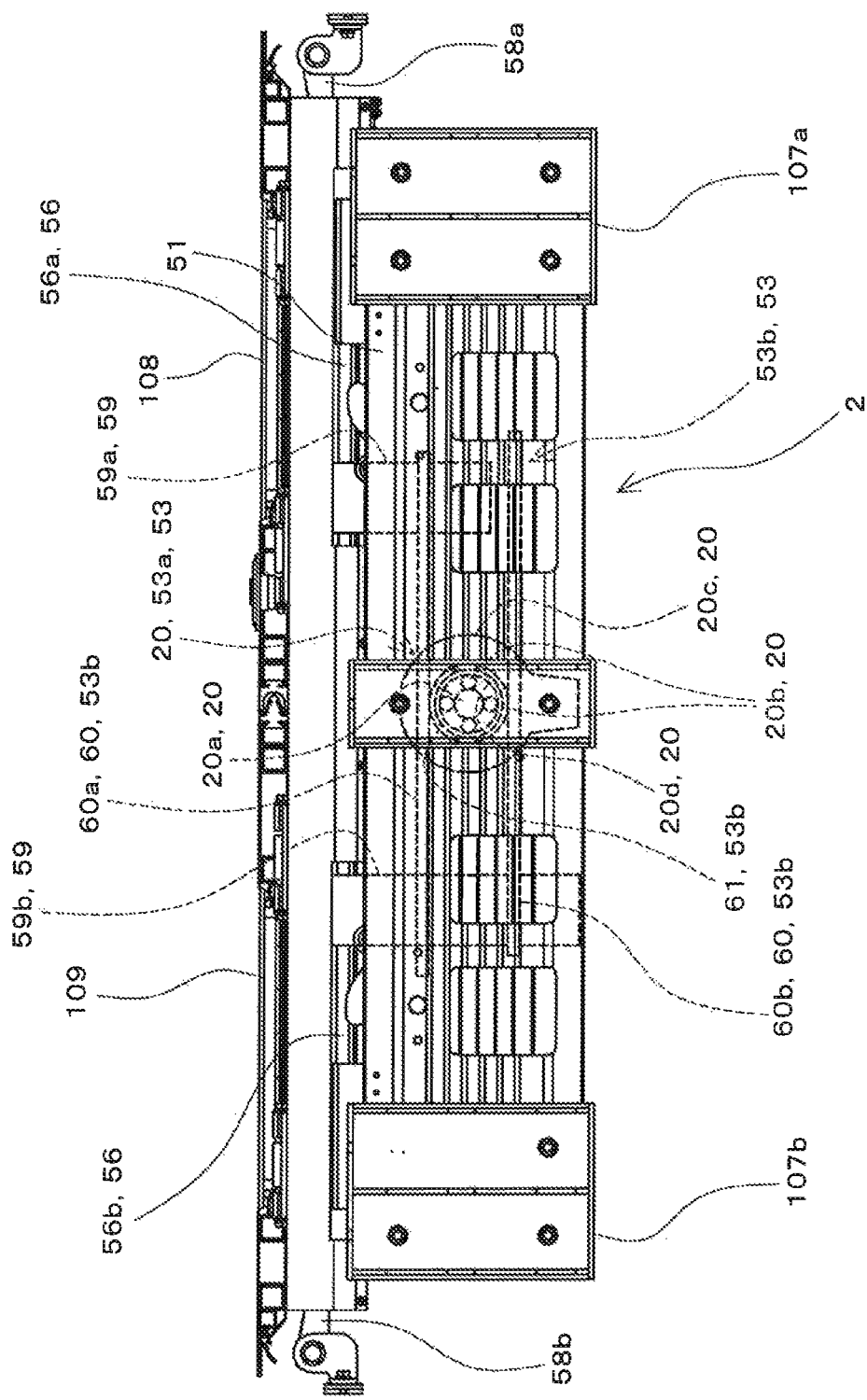
FIG. 19 is a schematic view serving as a plan view of the plug door device shown in FIG. 18.
Figure 20:
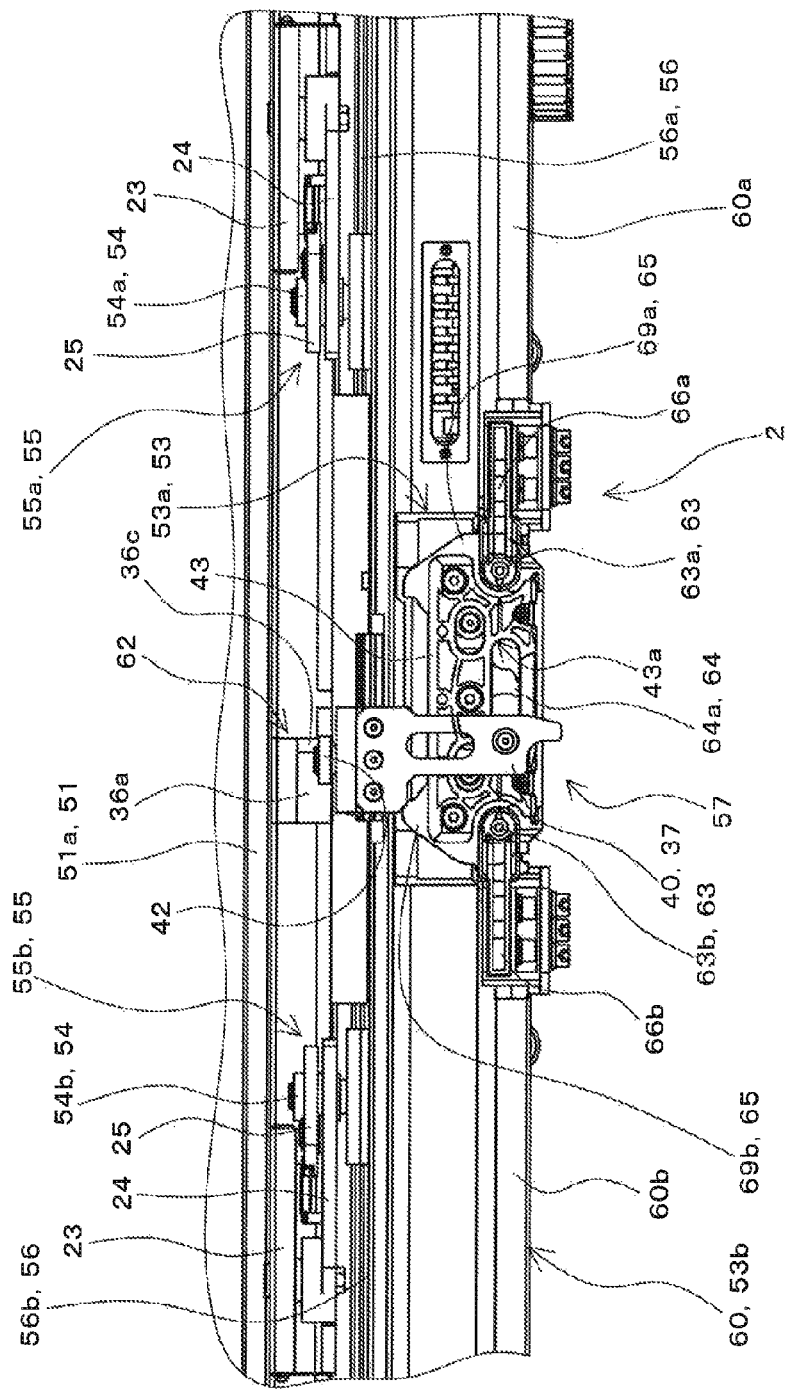
FIG. 20 is an enlarged diagram of a part of FIG. 18.
Figure 21:
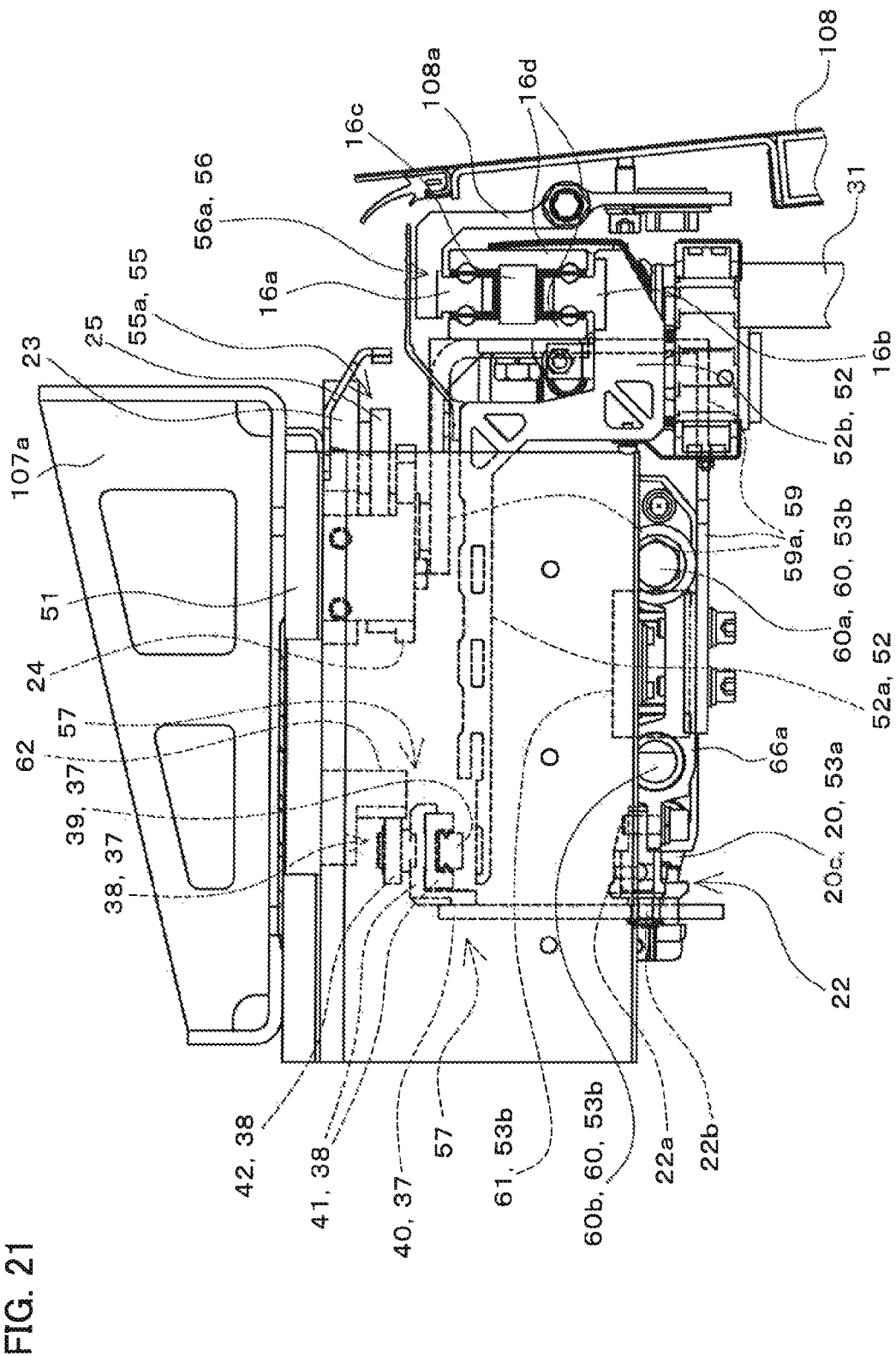
FIG. 21 is an enlarged schematic view of the upper part of a door in FIG. 17.

FIG. 16 is a schematic view showing an overall plug door device 2 (a door opening and closing apparatus) according to a second embodiment of the present invention. The plug door device 2 shown in FIG. 16 is suitable for two-panel sliding doors, which are constituted by two doors. Note that FIG. 16 is a schematic view as viewed from the inside of a vehicle, and shows a state where the plug door device 2 is installed together with doors (108, 109) at an entrance 106 of the vehicle. FIG. 17 is a schematic view showing a cross-section, as viewed from the position indicated by arrows of line J-J in FIG. 16. FIG. 18 is a schematic view serving as a front view of the plug door device 2 and enlarges the upper part of the door 108 in FIG. 16. Note that FIGS. 16 and 18 omit the drawing of a cover disposed on the inside the vehicle when the plug door device 2 is housed in the vehicle in the upper part of the entrance 106. FIG. 19 is a schematic view serving as a plan view of the plug door device 2 shown in FIG. 18, which is shown together with the doors (108, 109). FIG. 20 is an enlarged diagram of a part of FIG. 18. FIG. 21 is a schematic view serving as a side view of the plug door device 2 and enlarges the upper part of the door (108, 109) in FIG. 17.

Note that in the following description of the second embodiment, the description of the constituents that are configured similarly to those in the first embodiment will be omitted as appropriate by providing the same reference numerals thereto in the drawings or citing the same reference numerals.

Regarding Overall Configuration

As shown in FIG. 16, a vehicle side wall 105 is provided with the entrance 106. Note that FIG. 16 shows a state where the doors (108, 109) are in a closed state, and indicates the entrance 106 with broken lines. A frame 107 is fixed above the entrance 106 so as to extend in a vehicle front-rear direction. Here, similarly to the first embodiment, the "vehicle front-rear direction" is a direction parallel to a vehicle travelling direction, and is the direction indicated by double arrow B in FIG. 16. Note that the vehicle side wall 105 and the frame 107 constitute a part of the vehicle body.

Also, two doors (108, 109) are installed so as to cover the entrance 106. The two doors (108, 109) are two-panel sliding doors, and are opened/closed by the plug door device 2. The doors (108, 109) are formed so as to gradually curve and project at its lower side, outward in a width direction of the vehicle (see FIG. 17). Here, similarly to the first embodiment, the "width direction of the vehicle" (hereinafter referred to also as the "vehicle width direction") is a direction vertical to the vehicle front-rear direction and up-down direction, and is a direction indicated by double arrow C in FIG. 17. Note that the doors (108, 109) are configured to substantially seal the entrance 106 at a closed position (position shown in FIGS. 16 and 17), which is the position where the doors (108, 109) are in a closed state.

The plug door device 2 shown in FIGS. 16 to 21 is installed at the entrance 106 of the vehicle, and is provided as a device for performing an operation of opening/closing the doors (108, 109) and a plugging operation of moving the doors (108, 109) in the vehicle width direction. This plug door device 2 is configured to include a fixed base 51, a slide base 52, a door drive mechanism 53 for driving two-panel sliding doors (108, 109) so as to move the doors (108, 109) in the vehicle front-rear direction, shaft portions 54 (54a, 54b) that are driven by the door drive mechanism 53 in the vehicle front-rear direction, guide portions 55 (55a, 55b) for guiding the shaft portions 54 (54a, 54b), double-speed rails 56 (56a, 56b), a locking mechanism 57, pivoting arms 58 (58a, 58b), and the like.

The fixed base 51 is fixed to a bracket 107a, which is a part of the frame 107 that constitute the vehicle body. The fixed base 51 is thereby fixed so as not to move relatively to the vehicle body. Also, the fixed base 51 is provided with a flat plate-like portion 51a that is horizontally installed, and a pair of slide support portions (51b, 51b) that are provided on both sides in the vehicle front-rear direction of the plate-like portion 51a. The slide support portions 51b are provided as block-like members installed so as to extend in the vehicle width direction. A rail member 51c for supporting the slide base 52 slidably in the vehicle width direction is fixed to each slide support portion 51b.

The slide base 52 shown in FIGS. 18 and 21 is installed on the fixed base 51 under it, slidably in the vehicle width direction relative to the fixed base 51. The slide base 52 is provided with a main body 52a installed so as to horizontally extend in a flat manner, bracket portions 52b, and wheel portions 52c.

The bracket portions 52b are each provided as a portion that extends so as to bend downward relative to the main body 52a at an end on the outside (door 108, 109 side) in the vehicle width direction of the main body 52a, and thereafter, horizontally bend toward the outside in the vehicle width direction. A plurality of bracket portions 52b are provided so as to extend from a plurality of positions in the vehicle front-rear direction with respect to the main body 52a. The double-speed rails 56 (56a, 56b), which will be described later, are installed on the respective bracket portions 52b. The wheel portions 52c are installed on both sides in the vehicle front-rear direction of the main body 52a, and are each configured to include a wheel that rolls on the rail member 51c extending in the vehicle width direction. The slide base 52 is thereby configured to be slidable in the vehicle width direction relative to the fixed base 51.

Regarding Door Drive Mechanism and Double-Speed Rail

The door drive mechanism 53 shown in FIGS. 18 to 21 are installed on the main body 52a of the slide base 52 and is provided as a mechanism for moving the two doors (108, 109) in the vehicle front-rear direction via the connecting portion 59. Note that in the present embodiment, the door drive mechanism 53 is installed at the lower side of the main body 52a. The door drive mechanism 53 is configured to include a drive portion 53a including a direct-drive brushless electric motor 21 (an actuator, see FIG. 6 in the first embodiment; not shown in FIGS. 18 to 21) configured similarly to the brushless electric motor 21 in the first embodiment, a rack-and-pinion mechanism 53b, and the like.

The rack-and-pinion mechanism 53b is provided as a mechanism for moving the connecting portion 59 as a result of receiving an input of a driving force from the drive portion 53a. The rack-and-pinion mechanism 53b is configured to include two facing drive racks 60 (60a, 60b) and a drive pinion 61. The two facing drive racks 60 (60a, 60b) include an outer drive rack 60a disposed outside in the vehicle width direction and an inner drive rack 60b disposed on the inside in the vehicle width direction. The outer drive rack 60a and the inner drive rack 60b are disposed so as to extend parallel to each other in the vehicle front-rear direction.

The drive pinion 61 is disposed between the two drive racks (60a, 60b), and are disposed so as to mesh with teeth provided on the facing sides of the two drive racks (60a, 60b). Further, the drive pinion 61 is disposed such that its rotary axis extends in a vertical direction. Also, the drive pinion 61 is fixed concentrically with a ring gear 20d in a planet gear mechanism 20 in the drive portion 53a. For this reason, the drive pinion 61 is configured to rotate with the rotation of the ring gear 20d around the same rotary axis. As a result of the drive pinion 61 rotating together with the ring gear 20d, the two drive racks (60a, 60b) that mesh with the drive pinion 61 moves in opposite directions in the vehicle front-rear direction.

Also, the drive portion 53a and the drive pinion 61 in the rack-and-pinion mechanism 53b are disposed at the central part in the vehicle front-rear direction of the slide base 52. Further, the connecting portion 59 is attached to the drive racks 60 (60a, 60b) in the rack-and-pinion mechanism 53b.

The drive portion 53a is configured similarly to the drive portion 13a in the first embodiment. In other words, the drive portion 53a is configured to include the brushless electric motor 21 that is provided as a driving source and constitutes an electric motor in the present embodiment, as well as a planet gear mechanism 20 to which a driving force from the brushless electric motor 21 is input. The planet gear mechanism 20 is configured, similarly to that in the first embodiment, to include a sun gear 20a, a plurality of planet gears 20b, a carrier 20c, a ring gear 20d, and the like.

The sun gear 20a, the planet gears 20b, the carrier 20c, and the ring gear 20d are configured similarly to those in the first embodiment. In other words, a driving force from the brushless electric motor 21 is input to the sun gear 20a, the planet gears 20b are disposed so as to revolve around the sun gear 20a, and the carrier 20c is provided as a frame member for revolvably supporting the planet gears 20b. The ring gear 20d is provided as a ring-like gear having an inner-circumferential internal gear that mesh with the planet gears 20b. As described above, the drive pinion 61 in the rack-and-pinion mechanism 53b is fixed to the ring gear 20d.

A part of the outer-circumferential portion of the carrier 20c is connected to a lock output portion 22 (a projecting shaft), which is provided similarly to that in the first embodiment. The lock output portion 22 is provided as a mechanism for inputting a driving force that is output from the carrier 20c to the locking mechanism 57 as a result of the carrier 20c swinging around the axis of the sun gear 20a. The lock output portion 22 is configured to convert the direction in which a driving force output as a result of the swinging of the carrier 20c acts, and output the converted driving force as a driving force in a linear direction parallel to the vehicle front-rear direction. Also, an output roller 22a is provided at a tip portion of the lock output portion 22 from which the driving force is output. Also, the lock output portion 22 is provided with an output roller shaft 22b for rotatably supporting the output roller 22a, and a driving force of the carrier 20c is input to a transmission member 40 in the locking mechanism 57 via the output roller shaft 22b. The output roller 22a can come into contact with a first face 46 and a second face 47 that are formed in a peripheral portion of a later-described link 64a.

Note that although the present embodiment described an exemplary mode in which the driving force from the direct-drive brushless electric motor 21 is input to the sun gear 20a, the driving force output from the ring gear 20d is input to the rack-and-pinion mechanism 53b, and the driving force output from the carrier 20c is input to the locking mechanism 57, this need not be the case. The configuration need only be such that the driving force from the brushless electric motor 21 is input to one of the sun gear 20a, the carrier 20c, and the ring gear 20d, the driving force output from one of the sun gear 20a, the carrier 20c, and the ring gear 20d is input to the rack-and-pinion mechanism 53b, and the driving force output from the remaining one of the sun gear 20a, the carrier 20c, and the ring gear 20d is input to the locking mechanism 57.

The connecting portion 59 that is attached to the drive racks 60 (60a, 60b) and transmits a driving force from the door drive mechanism 53 include a connecting portion 59a attached to the outer drive rack 60a and a connecting portion 59b attached to the inner drive rack 60b. Both the connecting portion 59a and the connecting portion 59b are constituted by plate-like members that are formed in a bent manner. The connecting portion 59a is fixed to the outer drive rack 60a at its end on the door 108 side in the vehicle front-rear direction. The connecting portion 59b is fixed to the inner drive rack 60b at its end on the door 109 side in the vehicle front-rear direction.

The connecting portion 59a is configured to horizontally extend toward the door 108 side from the portion fixed to the outer drive rack 60a, and then bend and extend upward. Then, the connecting portion 59a is fixed, at an end of the upward-extending portion, to a support rail 16d of the double-speed rail 56a of the double-speed rails 56 that is disposed on the door 108 side in the vehicle front-rear direction. The connecting portion 59b is configured to horizontally extend toward the door 108 side from the portion fixed to the inner drive rack 60b, and then bend and extend upward. Then, the connecting portion 59b is fixed, at an end of the upward-extending portion, to a support rail 16d of the double-speed rail 56b of the double-speed rails 56 that is disposed on the door 109 side in the vehicle front-rear direction.

Also, the connecting portion 59a is provided with a protruding end portion that partially bends from the end of the upward-extending portion and horizontally protrudes and extends. This protruding end portion is provided with the shaft portion 54a that protrudes in a cantilevered manner so as to extend upward. Note that the shaft portion 54a is configured similarly to the shaft portion 14 in the first embodiment, and is provided with a shaft portion roller that is rotatably attached to the shaft body of the shaft portion 54a fixed to the protruding end portion.

Also, the connecting portion 59b is provided with a protruding end portion that partially bends from the end of the upward-extending portion and horizontally protrudes and extends. This protruding end portion is provided with the shaft portion 54b that protrudes in a cantilevered manner so as to extend upward. Note that the shaft portion 54b is configured similarly to the shaft portion 14 in the first embodiment, and is provided with a shaft portion roller that is rotatably attached to the shaft body of the shaft portion 54b fixed to the protruding end portion.

The double-speed rails 56 (56a, 56b) shown in FIGS. 18 to 21 include a double-speed rail 56a disposed on the door 108 side in the vehicle front-rear direction and a double-speed rail 56b disposed on the door 109 side in the vehicle front-rear direction. The double-speed rail 56a and the double-speed rail 56b are provided so as to extend in the vehicle front-rear direction, and both are configured similarly to the double-speed rail 16 in the first embodiment. In other words, both the double-speed rails (56a, 56b) are configured to include two racks (upper rack 16a, lower rack 16b) that extend parallel to each other in the vehicle front-rear direction and face each other, a pinion 16c that meshes with both racks (16a, 16b), and a support rail 16d for rotatably supporting the pinion 16c and supporting both racks (16a, 16b) slidably in the vehicle front-rear direction.

The pinion 16c in the double-speed rail 56a is connected to the connecting portion 59a side. In other words, the pinion 16c in the double-speed rail 56a is connected to the connecting portion 59a via the support rail 16d in the double-speed rail 56a. For this reason, the connecting portion 59a fixed to the drive rack 60a and the support rail 16d and the pinion 16c in the double-speed rail 56a are connected to each other such that relative positions thereof do not change.

On the other hand, the pinion 16c in the double-speed rail 56b is connected to the connecting portion 59b side. In other words, the pinion 16c in the double-speed rail 56b is connected to the connecting portion 59b via the support rail 16d in the double-speed rail 56b. For this reason, the connecting portion 59b fixed to the drive rack 60b and the support rail 16d and the pinion 16c in the double-speed rail 56b are connected to each other such that relative positions thereof do not change.

Also, in the double-speed rail 56a, the lower rack 16b, which is one of the two racks (16a, 16b), is fixed and connected to the bracket portion 52b of the slide base 52, and the other rack, namely the upper rack 16a is connected to the door 108 side. Note that the upper rack 16a is connected to the door 108 via a door support member 108a. The door support member 108a supports the door 108 in a suspending manner.

Also, in the double-speed rail 56b, the lower rack 16b, which is one of the two racks (16a, 16b), is fixed and connected to the bracket portion 52b of the slide base 52, and the other rack, namely the upper rack 16a is connected to the door 109 side. Note that the upper rack 16a is connected to the door 109 via a door support member, which is configured similarly to the door support member 108a. This door support member supports the door 109 in a suspending manner.

Upon the drive pinion 61 in the door drive mechanism 53 being driven, the support rail 16d and the pinion 16c in the double-speed rail 56a move together with the connecting portion 59a fixed to the drive rack 60a in the vehicle front-rear direction. Thus, similarly to the double-speed rail 16 in the first embodiment, the upper rack 16a in the double-speed rail 56a moves relative to the lower rack 16b at a speed that is double the moving speed of the pinion 16c by a distance that is double the moving distance of the pinion 16c. As a result, the door 108 connected to the upper rack 16a via the door support member 108a moves toward one side in the vehicle front-rear direction, relative to the slide base 52 to which the lower rack 16b in the double-speed rail 56a is connected.

Also, upon the drive pinion 61 being driven, the support rail 16d and the pinion 16c in the double-speed rail 56b also move together with the connecting portion 59b fixed to the drive rack 60b in the vehicle front-rear direction at the same timing as the aforementioned operation timing of the double-speed rail 56a. At this time, the drive rack 60b moves in an opposite direction that of to the drive rack 60a, and the pinion 16c of the double-speed rail 56b moves in an opposite direction to that of the pinion 16c in the double-speed rail 56a. Further, the upper rack 16a in the double-speed rail 56b also moves relative to the lower rack 16b at a speed that is double the moving speed of the pinion 16c by a distance that is double the moving distance of the pinion 16c. As a result, the door 109 connected to the upper rack 16a via the door support member moves toward the other side in the vehicle front-rear direction, relative to the slide base 52 to which the lower rack 16b of the double-speed rail 56b is connected. In other words, the door 109 moves in the direction opposite to the moving direction of the door 108 in the vehicle front-rear direction. For this reason, the plug door device 2 is configured such that the two-panel sliding doors (108, 109) are driven to symmetrically open/close.

Regarding Plugging Mechanism and Pivoting Arm

In the plug door device 2, the plugging mechanism for performing the plugging operation of moving the doors (108, 109) in the vehicle width direction is configured to include the shaft portions 54 (54a, 54b), the guide portions 55 (55a, 55b), and roller guides (23, 23). Note that the plugging mechanism for performing the plugging operation on the door 108 side is constituted by the shaft portion 54a, the guide portion 55a, and the roller guide 23, and the plugging mechanism for performing the plugging operation of the door 109 side is constituted by the shaft portion 54b, the guide portion 55b, and the roller guide 23.

The plugging mechanism for performing the plugging operation on the door 108 side and the plugging mechanism for performing the plugging operation on the door 109 side are both configured similarly to the plugging mechanism (shaft portion 14, guide portion 15, roller guide 23) in the first embodiment. Further, the guide portion 55a in the plugging mechanism on the door 108 side is configured to include a first link 24 and a second link 25, similarly to the guide portion 14 in the first embodiment, and is provided so as to guide the shaft portion 54a provided on the protruding end portion of the connecting portion 59a. Also, the guide portion 55b in the plugging mechanism on the door 109 side is configured to include a first link 24 and a second link 25, similarly to the guide portion 14 in the first embodiment, and is provided so as to guide the shaft portion 54b provided on the protruding end portion of the connecting portion 59b.

Note that the plugging mechanism on the door 108 side is set such that the disposition and configuration of the constituent elements in the vehicle front-rear direction and in the vehicle width direction are similar to those in the plugging mechanism (shaft portion 14, guide portion 15, roller guide 23) in the first embodiment. On the other hand, the plugging mechanism on the door 109 side is set such that the disposition and configuration of the constituent elements in the vehicle front-rear direction and in the vehicle width direction are in a state of disposition in line symmetry with respect to the plugging mechanism on the door 108 side about a virtual line that passes through the central position in the vehicle front-rear direction of the entrance 106 and horizontally extends in the vehicle width direction.

The pivoting arms 58 are disposed in the upper part and the lower part of the entrance 106 on both sides in the vehicle front-rear direction, and a pivoting arm 58a for guiding the door 108 in the vehicle width direction and a pivoting arm 58b for guiding the door 109 in the vehicle width direction are provided as the pivoting arms 58. Both the pivoting arm 58a and the pivoting arm 58b are configured similarly to the pivoting arm 18 in the first embodiment, and are each configured to include an upper pivoting arm 18a fixed on the upper side of the connecting shaft 31 and a lower pivoting arm 18b fixed on the lower side of the connecting shaft 31.

Note that the pivoting arm 58a is set such that the disposition and configuration of the constituent components in the vehicle front-rear direction and in the vehicle width direction are similar to those of the pivoting arm 18 in the first embodiment. On the other hand, the pivoting arm 58b is set such that the disposition and configuration of the constituent elements in the vehicle front-rear direction and in the vehicle width direction are in a state of disposition in line symmetry with respect to the pivoting arm 58a about a virtual line that passes through the central position in the vehicle front-rear direction of the entrance 106 and horizontally extends in the vehicle width direction.

Regarding Locking Mechanism

The locking mechanism 57 shown in FIGS. 18, 20, and 21 are provided as a mechanism capable of locking the doors (108, 109) so as to limit their movement at the closed positions of the doors (108, 109). The locking mechanism 57 is configured to include locking pins 63 (63a, 63b) (lock members), link mechanisms 64 (64a, 64b, 64c), a link retaining mechanism 65, a fixed lock portion 62, and a movable lock portion 37.

The locking pins 63 (63a, 63b) are provided as pin-like portions installed on arm members (66a, 66b) that are fixed to the drive racks 60 (60a, 60b) or the connecting portions 59 (59a, 59b). The arm member 66a is fixed to the drive rack 60a or the connecting portion 59a. The arm member 66b is fixed to the drive rack 60b or the connecting portion 59b. The arm members (66a, 66b) are provided so as to extend inward in the vehicle width direction from the drive racks 60 (60a, 60b) or the connecting portions 59 (59a, 59b). Further, the arm members (66a, 66b) are each provided with a portion that protrudes along the vehicle front-rear direction on its inner end side in the vehicle width direction. The portions of the arm members (66a, 66b) protruding in the vehicle front-rear direction are disposed so as to protrude in a cantilevered manner from the front side and the rear side of the vehicle, respectively, toward the center in the vehicle front-rear direction of the entrance 106. Further, the locking pins (63a, 63b) are fixed respectively to the ends on the tip side of the arm members (66a, 66b) that protrude in a cantilevered manner in the vehicle front-rear direction. Note that the locking pin 63a is provided so as to protrude outward in the vehicle width direction from the end on the tip side of the arm member 66a. On the other hand, the locking pin 63b is provided so as to protrude outward in the vehicle width direction from the end on the tip side of the arm member 66b.

Figure 22:
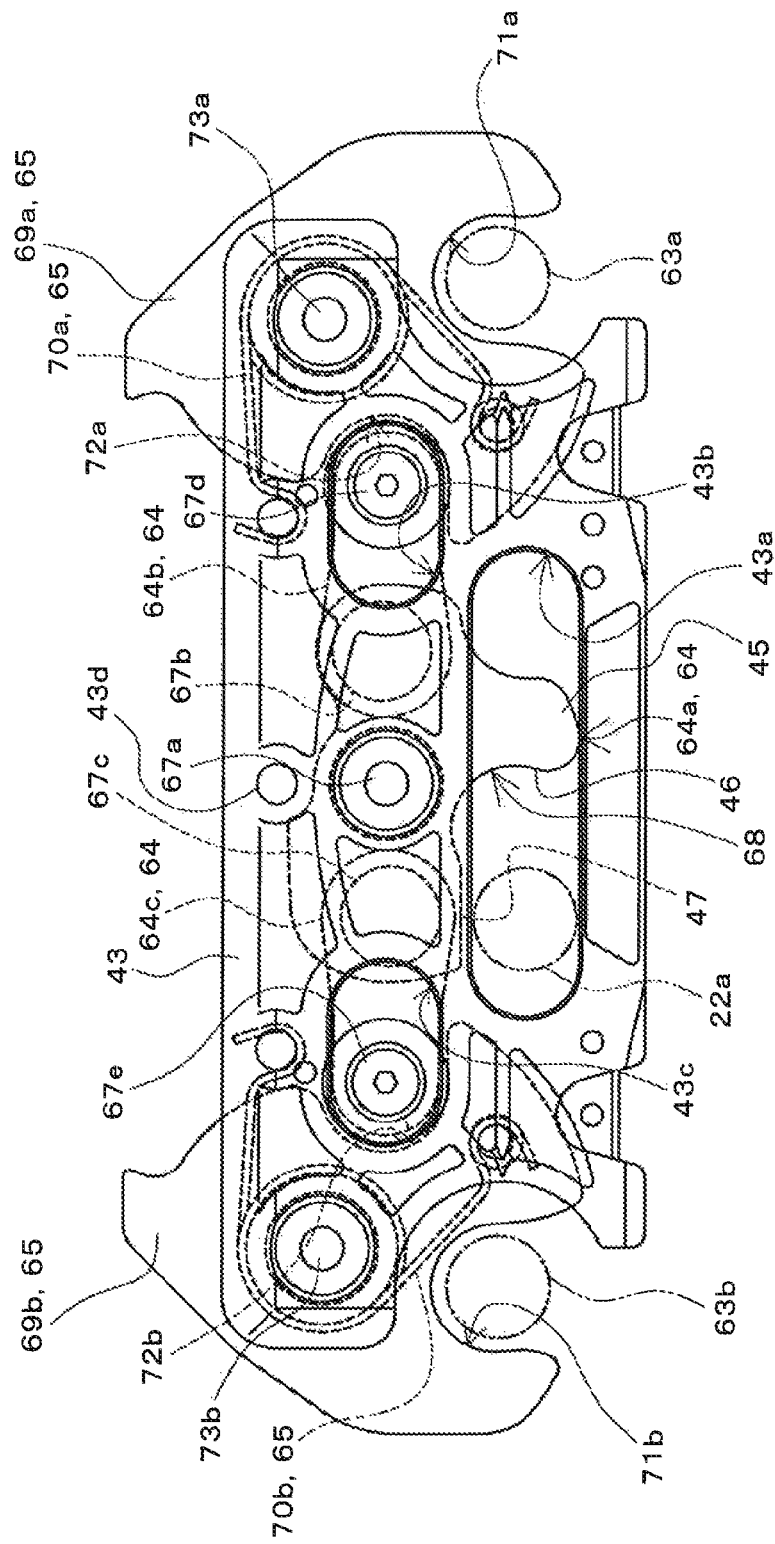
FIG. 22 is a front view showing a part of a locking mechanism in the plug door device shown in FIG. 18.

FIG. 22 is a front view showing the link mechanism 64 and the link retaining mechanism 65 together with a guide plate 43. As shown well in FIGS. 20 and 22, the link mechanism 64 is provided as a mechanism capable of being deformed into a linear state and into a bent state on a vertical plane. The link mechanism 64 is configured by three links (64a, 64b, 64c) (three link members) being connected in tandem. The central link 64a (a central link member, a second link member) is pivotably supported by a connecting pin 67a at the center, relative to the guide plate 43. Note that the guide plate 43 is provided as a plate-like member that is fixed to a housing or the like of the drive portion 53a installed on the slide base 52, similarly to that in the first embodiment. Further, the guide plate 43 has an elongated hole 43a that is formed below the position where the connecting pin 67a is attached and in which the output roller 22a is disposed. The output roller 22a moves in the vehicle front-rear direction by moving along the elongated hole 43a.

Further, one end of the link 64b (a first link member) is pivotably connected to one end of the central link 64a via the connecting pin 67b. One end of the link 64c (a first link member) is pivotably connected to the other end of the central link 64a via the connecting pin 67c. Also, a pin 67d is provided at an end of the link 64b opposite to the side connected to the link 64a. A pin 67e is provided at an end of the link 64c opposite to the side connected to the link 64a. Ends of the aforementioned pins (67d, 67e) provided at the ends of the link mechanism 64 are inserted in a freely fitted manner in guide grooves (43b, 43c) in an elongated hole shape extending parallel to the vehicle front-rear direction in the guide plate 43.

Also, the central link 64a is provided with a portion (a first protruding portion 45) protruding downward from the halfway part between the connecting pin 67a and the connecting pin 67b, and a recessed portion 68 that is open at a position facing the elongated hole 43a and is able to come into contact with the output roller 22a is formed by an end of the first protruding portion 45.

The central link 64a has the first face 46 and the second face 47. The first face 46 is a face on the link 64c side in the first protruding portion 45. Although the details will be described later, the first face 46 is a portion that is pressed by the output roller 22a of the lock output portion 22 when the link mechanism 64 changes from a linear state to a bent state. The second face 47 is a portion that is pressed by the output roller 22a of the lock output portion 22 when the link mechanism 64 changes from a bent state to a linear state.

Figure 23:
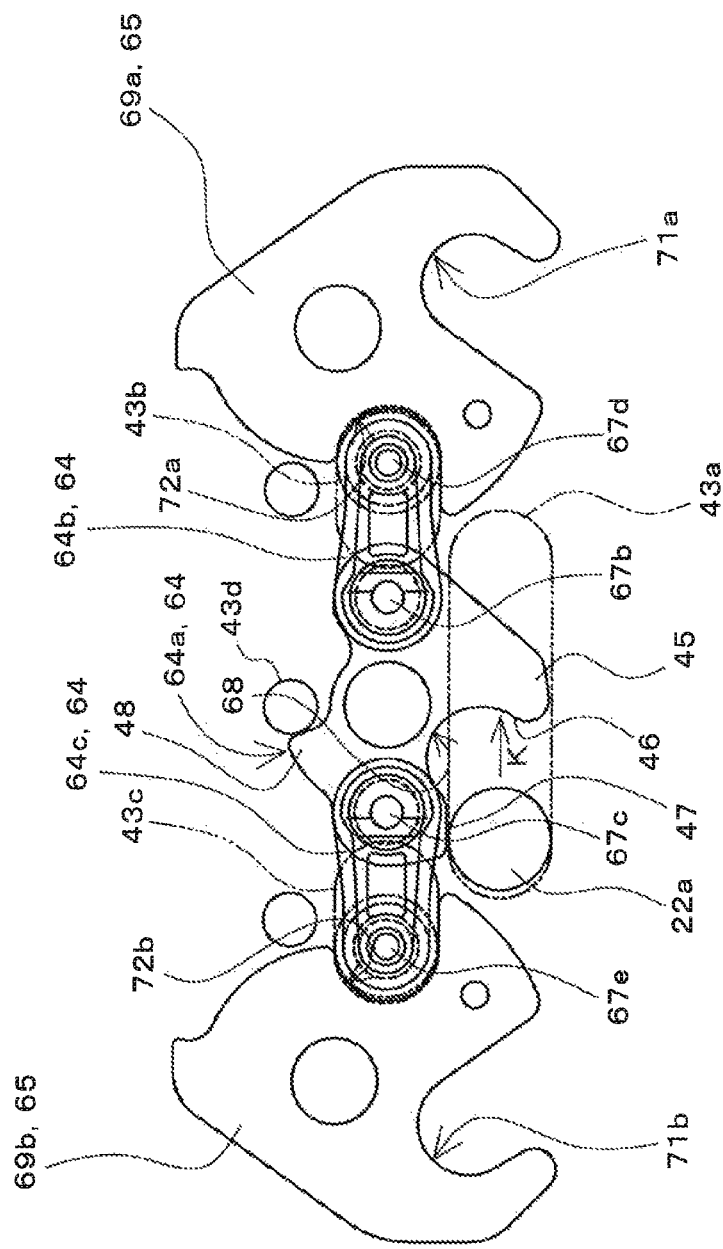
FIG. 23 is a diagram schematically showing a part of the locking mechanism shown in FIG. 18.

As shown in FIGS. 22 to 25, the first face 46 and the second face 47 are in a positional relationship in which the first and second faces 46 and 47 intersect each other, that is, a positional relationship in which the first and second faces 46 and 47 are not parallel with each other. Note that, although the angle between the first face 46 and the second face 47 is substantially a right angle in the present embodiment, there is no limitation thereto, and the angle therebetween may be an acute angle or an obtuse angle. The second face 47 is a face aligned with the direction of arrow K (i.e., aligned with the moving direction of the output roller 22a of the lock output portion 22) when the link mechanism 64 is in a linear state as shown in FIG. 23.

In the link mechanism 64, the link 64a that comes into contact, at the first face 46 of the recessed portion 68, with the output roller 22a moving along the elongated hole 43a pivots around the connecting pin 67a. Further, with the pivoting of the link 64a, the links (64b, 64c) with the pins (67d, 67e) whose moving directions are restricted by the guide grooves (43b, 43c) pivot around the connecting pins (67b, 67c) relatively to the link 64a. Thus, the link mechanism 64 deform from a linear state into a bent state.

A cylindrical rotation restricting member 43d is provided on the guide plate 43 near the connecting pin 67a. This rotation restricting member 43d comes into contact with a second protruding portion 48 that is formed on the link 64a, when the link mechanism 64 is in a linear state shown in FIG. 23. The rotation restricting member 43d thereby restricts further clockwise rotation of the link 64a from the state shown in FIG. 23. The link 62a in the link mechanism 61 in a linear state is also in a state of being sandwiched by the output roller 22a and the rotation restricting member 43d.

The link retaining mechanism 65 is configured to include a pair of engaging members (69a, 69b) and a pair of biasing springs (70a, 70b) (biasing portions). The pair of engaging members (69a, 69b) are disposed pivotably on a vertical plane symmetrically to the link mechanism 64 (i.e., to the connecting pin 67a) in the vicinity of both ends of the link mechanism 64. Note that the engaging member 69a is pivotably supported via the pivoting shaft 73a relative to the guide plate 43. Also, the engaging member 69b is pivotably supported via the pivoting shaft 73b relative to the guide plate 43.

The engaging members (69a, 69b) are each provided at their peripheral part with a first engaging portion (71a, 71b) and a second engaging portion (72a, 72b) that are formed in a recessed shape. The first engaging portion 71a and the second engaging portion 72a are provided in the engaging member 69a, and the first engaging portion 71b and the second engaging portion 72b are provided in the engaging member 69b.

The first engaging portion 71a is provided as a recess that can be engaged with the locking pin 63a, and the first engaging portion 71b is provided as a recess that can be engaged with the locking pin 63b. Also, the second engaging portion 72a is provided as a recess that can be engaged with the pin 67d, and the second engaging portion 72b is provided as a recess that can be engaged with the pin 67e. Note that the portion of the pin 67d that can be engaged with the second engaging portion 72a is provided as a portion which has a diameter that is a step-wise concentric expansion of a portion thereof that can come into contact with the guide groove 43b. The portion of the pin 67e that can be engaged with the second engaging portion 72b is provided as a portion which has a diameter that is a step-wise concentric expansion of a portion thereof that can come into contact with the guide groove 43c.

The pair of biasing springs (70a, 70b) are provided with coil-like spring members that respectively bias the engaging members (69a, 69b) so as to cause them to pivot in predetermined directions. The biasing spring 70a is stopped in a manner that one end of the spring member, which is wound in a coil-like manner, is engaged with a projection provided on the guide plate 43 and wound around the pivoting shaft 73a, and thereafter, the other end of the spring member that is would in a coil-like manner is engaged with a projection provided on the engaging member 69a. The biasing spring 70a is thereby configured to bias the engaging member 69a so as to cause the engaging member 69a to pivot around the pivoting shaft 73a in the anticlockwise direction, as viewed from the inside in the vehicle width direction.

Also, the biasing spring 70b is stopped in a manner that one end of the spring member, which is wound in a coil-like manner, is engaged with a projection provided on the guide plate 43 and wound around the pivoting shaft 73b, and thereafter, the other end of the spring member that is wound in a coil-like manner is engaged with a projection provided on the engaging member 69b. The biasing spring 70b is thereby configured to bias the engaging member 69b so as to cause the engaging member 69b to pivot around the pivoting shaft 73b in the clockwise direction, as viewed from the inside in the vehicle width direction.

FIG. 23 is a diagram schematically showing a state where the link mechanism 64 is in a linear state and engaged with the second engaging portions (72a, 72b) of the engaging members (69a, 69b) in a state where the doors (108, 109) are at the closed positions. Note that FIG. 23 schematically shows a positional relationship between the link mechanism 64, the engaging members (69a, 69b), the elongated hole 43a, the guide grooves (43b, 43c), the output roller 22a, and the like, as viewed from the front side (i.e., from the inside in the vehicle width direction).

In the state shown in FIGS. 22 and 23, the link mechanism 64 is in a linear state and engaged with the engaging members (69a, 69b), and the engaging members (69a, 69b) are engaged with the locking pins (63a, 63b) at the first engaging portions (71a, 71b). When, in this state, a driving force that is output as a result of the carrier 20c in the planet gear mechanism 20 swinging is output to the output roller 22a in the lock output portion 22, the output roller 22a moves within the elongated hole 43a in the direction indicated by arrow K in the diagram.

As a result thereof, the output roller 22a comes into contact with the first face 46 of the recessed portion 68 of the link 64a, and the link 64a pivots around the connecting pin 67a. Then, the links (64b, 64c) pivot relatively to the link 64a, and the link mechanism 64 is in a bent state. Thus, the engagement of both ends of the link mechanism 64 with the second engaging portions (72a, 72b) of the engaging members (69a, 69b) is released. Then, when the rack-and-pinion mechanism 53b operates with a driving force output from the ring gear 20d in the planet gear mechanism 20 and the arm members (66a, 66b) move together with the drive racks (60a, 60b) or the connecting portions (59a, 59b), the locking pins (63a, 63b) also move in directions diverging from each other toward the opening directions of the doors (108, 109).

Since the engagement between the link mechanism 64 and the engaging members (69a, 69b) is released, upon the locking pins (63a, 63b) moving as described above, the engaging members (69a, 69b) pivot in the directions in which they are biased by the biasing springs (70a, 70b), and the engagement between the locking pins (63a, 63b) and the first engaging portions (71a, 71b) of the engaging members (69a, 69b) is released. Then, the state of the link mechanism 64 and the engaging members (69a, 69b) transitions to the state shown in FIG. 24.

Figure 24:
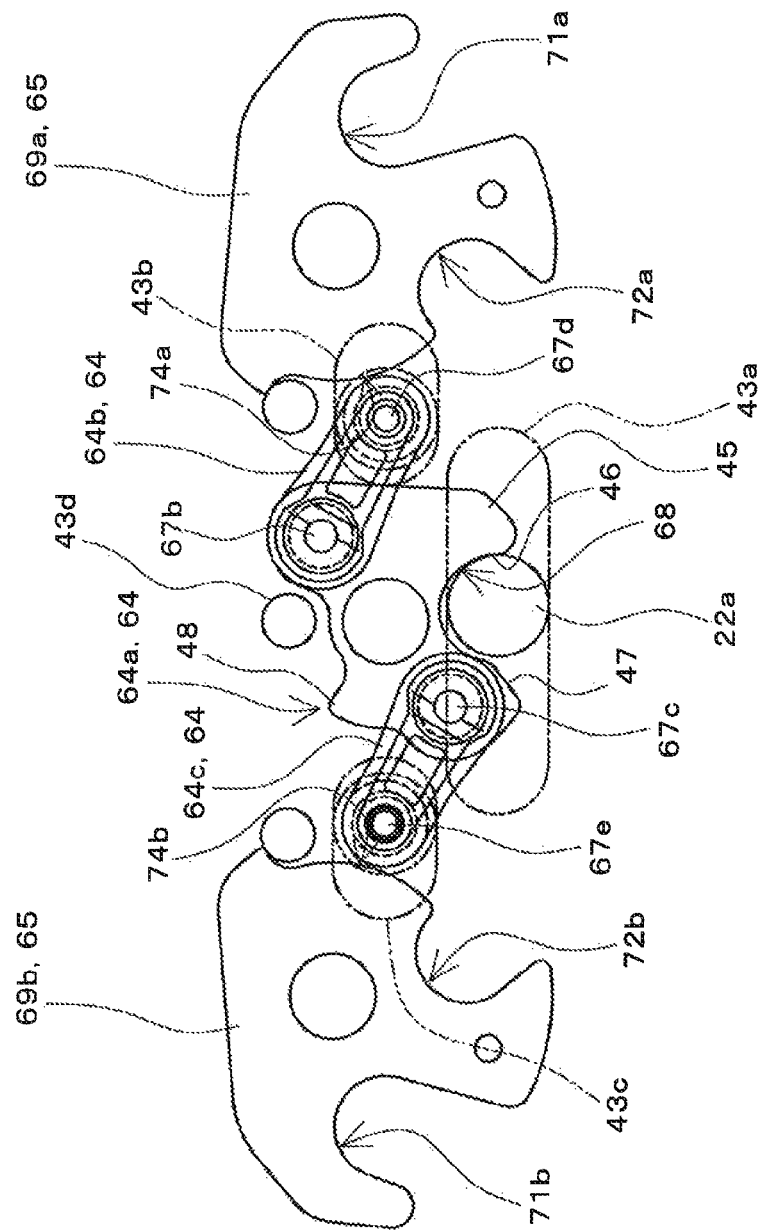
FIG. 24 is a diagram schematically showing a part of the locking mechanism shown in FIG. 18 in an operational state different from that in FIG. 23.

In the state shown in FIG. 24, no external force is applied to the link retaining mechanism 65, and the engaging members (69a, 69b) are retained in the state shown in FIG. 24 by the spring force given by the biasing springs (70a, 70b). Further, in this state, the engaging members (69a, 69b) constrain linearly extending movement of the link mechanism 64 with outer peripheral portions (74a, 74b). In other words, the outer peripheral portion 74a of the engaging member 69a constrains the movement of an end of the link mechanism 64 on the pin 67d side, and the outer peripheral portion 74b of the engaging member 69b constrains the movement of the link mechanism 64 on the pin 67e side. Thus, when the link mechanism 64 is held in a bent state by the link retaining mechanism 65, the output roller 22a is retained at the recessed portion 68 of the link 64a, and the state where an output to the carrier 20c in the planet gear mechanism 20 is fixed is maintained.

On the other hand, when the rack-and-pinion mechanism 53b moves in the direction opposite to the aforementioned direction, the locking pins (63a, 63b) move together with the arm members (66a, 66b) in directions in which they approach each other toward the closing directions of the doors (108, 109). Upon the locking pins (63a, 63b) thus moving, the locking pins (63a, 63b) engage with the first engaging portions (71a, 71b) of the engaging members (69a, 69b), and the engaging members (69a, 69b) pivot in the directions that are respectively opposite to the directions in which they are biased by the biasing springs (70*a*, 70*b*). Then, the state of the link mechanism 64 and the engaging members (69*a*, 69*b*) transitions to the state shown in FIG. 25.

Figure 25:
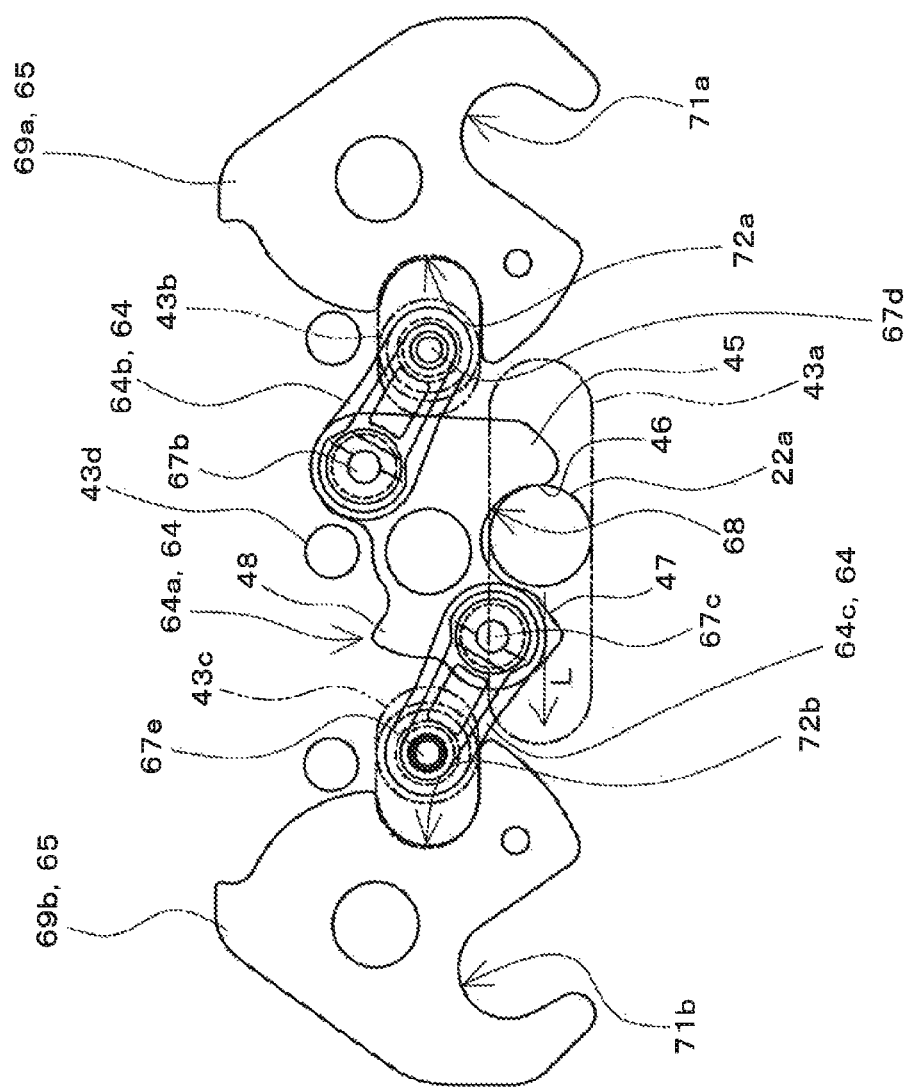
FIG. 25 is a diagram schematically showing a part of the locking mechanism shown in FIG. 18 in an operational state different from that in FIG. 23.

In the state shown in FIG. 25, the second engaging portions (72*a*, 72*b*) of the engaging members (69*a*, 69*b*) face both ends of the link mechanism 64, and the link mechanism 64 is in a state of being able to be engaged with the engaging members (69*a*, 69*b*). In this state, the carrier 20*c* in the planet gear mechanism 20 swings and the output roller 22*a* in the lock output portion 22 moves within the elongated hole 43*a* in the direction of arrow L shown in the drawing, and as a result, the second face 47*a* of the link 64*a* is biased by the output roller 22*a* in the vicinity of the connecting pin 67*c*. The link 64*a* thereby pivots around the connecting pin 67*a* until the rotation restricting member 43*d* comes into contact with the second protruding portion 48 of the link 64*a*, and the link mechanism 64 undergoes deformation from a bent state to a linear state. Here, the output roller 22*a* slightly moves in the direction of arrow L even after the second face 47 has become aligned with a direction parallel with the moving direction of the output roller 22*a*. Then, as shown in FIGS. 22 and 23, both ends of the link mechanism 64 are engaged with the second engaging portions (72*a*, 72*b*) of the engaging members (69*a*, 69*b*).

Figure 26:
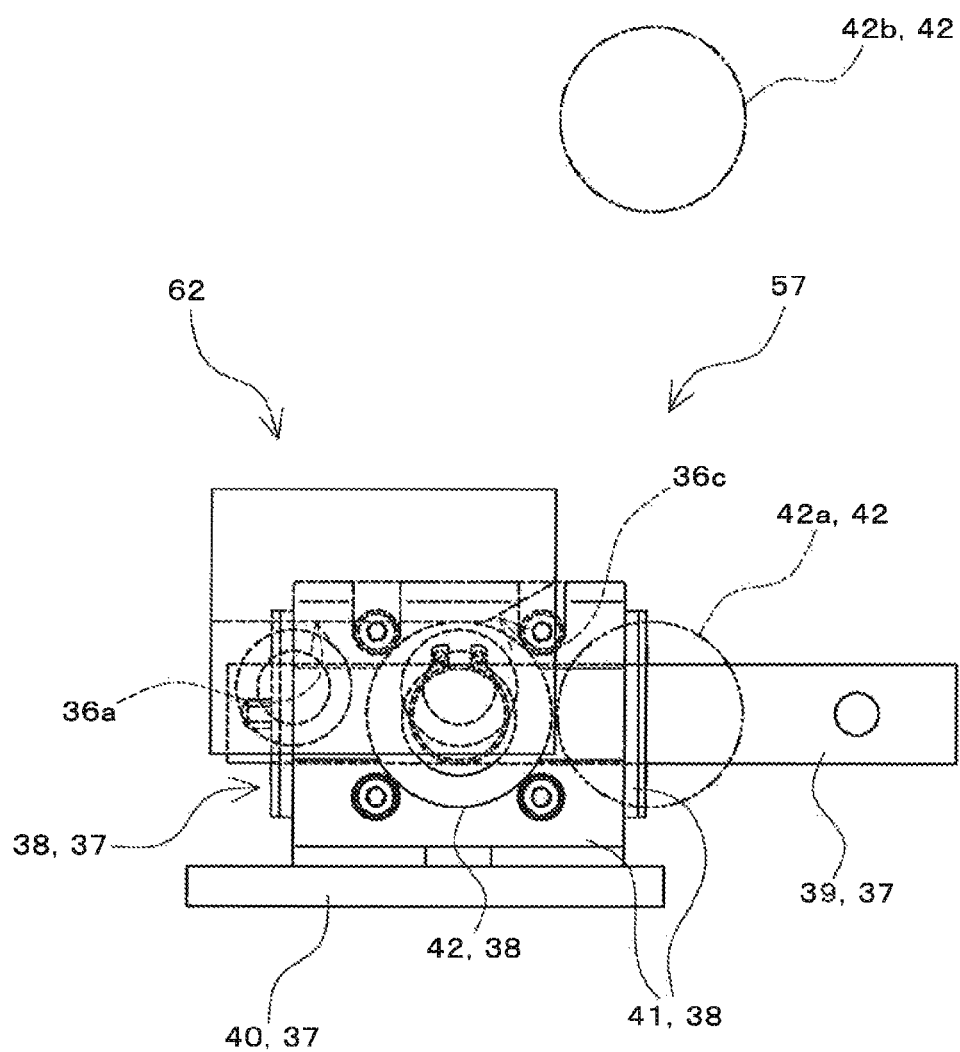
FIG. 26 is a plan view showing a part of the locking mechanism shown in FIG. 18.

FIG. 26 is a plan view showing the fixed lock portion 62 and the movable lock portion 37 in the locking mechanism 57. The fixed lock portion 62 is configured as a block-like member provided so as to be fixed to the fixed base 51. The fixed lock portion 62 is provided with a first face 36*a* and an angled face 36*c*, which are configured similarly to those of the fixed lock portion 36 in the first embodiment. However, the fixed lock portion 62 is different from the fixed lock portion 36 in the first embodiment in that it is not provided with a second face 36*b*.

Note that in the second embodiment, the engaging members (69*a*, 69*b*) in the link retaining mechanism 65 are provided with the outer peripheral portions (74*a*, 74*b*) for retaining the link mechanism 64 in a bent state. For this reason, these outer peripheral portions (74*a*, 74*b*) achieve a function of generating a reaction force balanced with a driving force that is input from the carrier 20*c* in the planet gear mechanism 20 to the locking mechanism 57 such that the drive pinion 61 is driven to rotate with a driving force that is input from the ring gear 20*d* in the planet gear mechanism 20 to the rack-and-pinion mechanism 53*b*. It is thereby unnecessary to provide the fixed lock portion 62 with a second face 36*b* similar to that in the first embodiment.

The movable lock portion 37 is provided so as to be movable with a driving force that is output from the carrier 20*c* in the planet gear mechanism 20 to the locking mechanism 57. The movable lock portion 37 is configured to come into contact with the fixed lock portion 62 on the inside in the vehicle width direction at the closed position of the doors (108, 109). Thus, the locking mechanism 57 is provided so as to restrict movement of the doors (108, 109) outward in the vehicle width direction when the doors (108, 109) are in a closed state, as a result of the movable lock portion 37 coming into contact with the fixed lock portion 62.

The movable lock portion 37 is configured similar to the movable lock portion 37 in the first embodiment, and is configured to include a sliding contact portion 38 capable of coming into contact with the fixed lock portion 62, a slide rail 39, and a transmission member 40. The sliding contact portion 38 is configured to include a slide block 41 and a roller 42, similarly to that in the first embodiment. The slide rail 39 and the transmission member 40 are also configured similarly to those in the first embodiment.

Note that in the second embodiment, the transmission member 40 is fixed to the output roller shaft 22*b* in the lock output portion 22 (see FIG. 21). Although the guide plate 43 is omitted in FIG. 21, the output roller shaft 22*b* penetrates the elongated hole 43*a* in the guide plate 43 and is fixed on the lower end side of the transmission member 40. Also, the output roller 22*a* is rotatably supported at a position corresponding to the elongated hole 43*a* with respect to the output roller shaft 22*b* that penetrates the elongated hole 43*a*.

Regarding Operation of Plug Door Device

Next, the operation of the plug door device 1 will be described. As shown in FIGS. 16 to 21, when the doors (108, 109) are at the closed positions, the shaft portions 54 (54*a*, 54*b*) are engaged with the first link 24 and the second link 25 in the respective guide portions 55 (55*a*, 55*b*).

Also, in the locking mechanism 57, the roller 42 is in contact with the first face 36*a* of the fixed lock portion 62 when the doors (108, 109) are at the closed positions, as shown in FIGS. 20, 21, and 26. For this reason, movement of the slide base 52 outward in the vehicle width direction is restricted via the locking mechanism 57 and the carrier 20*c* of the planet gear mechanism 20. This state restricts the plugging operation toward the outside in the vehicle width direction by the plugging mechanism, and the doors (108, 109) are locked such that their movement is restricted.

As a result of the direct-drive brushless electric motor 21 in the door drive mechanism 53 being driven in the above-described state at the closed position, the sun gear 20*a* in the planet gear mechanism 20 starts to rotate, and the planet gears 20*b* around the sun gear 20*a* start to revolve around the sun gear 20*a* while meshing with the ring gear 20*d*. Then, the carrier 20*c* swings with the revolution of the planet gears 20*b*, and the output roller 22*a* and the output roller shaft 22*b* thereby move within the elongated hole 43*a* in the direction indicated by arrow K in FIG. 23.

Thus, the transmission member 40 moves together with the output roller shaft 22*b* parallel to the opening direction of the door 108 in the vehicle front-rear direction, and the slide block 41 also moves on the slide rail 39 parallel to the opening direction of the door 108. Further, the link mechanism 64 transitions from a linear state where it is engaged, at its both ends, with the second engaging portions (72*a*, 72*b*) of the engaging members (69*a*, 69*b*) (see FIGS. 22 and 23) to a bent state where the engagement of both ends with the second engaging portions (72*a*, 72*b*) is released.

As a result thereof, the roller 42, which was in contact with the first face 36*a*, moves up to the position where the roller 42 is separated from the first face 36*a*. Then, the locking pins (63*a*, 63) that was engaged with the first engaging portions (71*a*, 71*b*) of the engaging members (69*a*, 69*b*) moves up to the position where they are separated from the first engaging portions (71*a*, 71*b*). Note that in FIG. 26, the position of the roller 42 that has moved up to the position where it is separated from the first face 36*a* is shown as the roller 42*a* indicated by a two-dot chain line. Thus, the state of the doors (108, 109) being locked by the locking mechanism 57 is released, and the plugging operation toward the outside in the vehicle width direction by the plugging mechanism is enabled.

As described above, after the plugging operation toward the outside in the vehicle width direction is enabled, drive of the brushless electric motor 21 in the door drive mechanism 53 is further continued. Thus, a driving force that is output to the drive pinion 61 in the rack-and-pinion mechanism 53*b* via the ring gear 20*d* is further transmitted to the shaft portions (54a, 54b) via the drive racks (60a, 60b) and the connecting portions (59a, 59b). For this reason, the shaft portions (54a, 54b), when moving the doors (108, 109) in the respective opening directions, bias the second links 25 in the respective guide portions (55a, 55b) in the same direction. Then, the guide portions (55a, 55b) move similarly to the guide portion 15 in the first embodiment. In other words, when the doors (108, 109) open, the guide portions (55a, 55b) pivot while coming into contact with the shaft portions (54a, 54b) and guide the shaft portions (54a, 54b) such that the shaft portions (54a, 54b) move toward one side in the vehicle width direction (i.e., in the opening direction of the door 108 and the opening direction of the door 109).

Also, when the guide portions (55a, 55b) operate as described above, a force toward the outside in the vehicle width direction acts on the shaft portions (54a, 54b). Therefore, a force toward the outside in the vehicle width direction also acts on the door drive mechanism 53 connected to the shaft portions (54a, 54b) via the connecting portions (59a, 59b), and a force toward the outside in the vehicle width direction also acts on the slide base 52 on which the door drive mechanism 53 is installed.

As a result thereof, the door drive mechanism 53 and the slide base 52 are guided by the slide support portion 51b of the fixed base 51 and move outward in the vehicle width direction. As a result, the plugging operation in which the doors (108, 109) move outward in the vehicle width direction is performed. Further, as a result of the plugging operation being performed, the movement of the doors (108, 109) in the opening directions is enabled.

Also, upon the plugging operation toward the outside in the vehicle width direction by the plugging mechanism being finished, the sliding contact portion 38 disposed on the slide rail 39 fixed to the slide base 52 also moves outward in the vehicle width direction together with the slide base 52. As a result, the roller 42 that was at the position of the roller 42a indicated by a two-dot chain line in FIG. 26 moves to the position of the roller 42b indicated by a dashed line. At this time, unlike in the first embodiment, the roller 42 is not in contact with the fixed lock portion 62. However, as shown in FIG. 24, the movement of both ends of the link mechanism 64 in a bent state is constrained by the outer peripheral portions (74a, 74b) of the engaging members (69a, 69b).

Note that the lock output portion 22 connected to the carrier 20c in the planet gear mechanism 20 is provided with a biasing means (not shown), such as a spring, for biasing the output roller 22a in the direction opposite to the direction indicated by arrow K in FIG. 23. In a state where both ends of the link mechanism 64 are in contact with and constrained by the outer peripheral portions (74a, 74b) of the engaging members (69a, 69b), the state where the link mechanism 64 is pressed against the outer peripheral portions (74a, 74b) of the engaging members (69a, 69b) is maintained as a result of a biasing force of the aforementioned biasing means acting on the output roller 22a and the link mechanism 64.

Also, in a state where both ends of the link mechanism 64 are pressed against and in contact with the outer peripheral portions (74a, 74b) of the engaging members (69a, 69b), a reaction force balanced with a driving force that is input from the carrier 20c in the planet gear mechanism 20 to the locking mechanism 57 is generated at the outer peripheral portions (74a, 74b). The drive pinion 61 is thereby driven to rotate with a driving force that is input from the ring gear 20d in the planet gear mechanism 20 to the drive pinion 61.

Further, the drive racks (60a, 60b) are driven in opposite directions with the rotation of the drive pinion 61, and the support rails 16d and the pinions 16c in the double-speed rails (56a, 56b) move together with the connecting portions (59a, 59b). For this reason, on the double-speed rails (56a, 56b), the upper racks 16a connected to the doors (108, 109) move at a speed that is double the speed of the pinion 16c, relative to the lower racks 16b fixed to the slide base 52. The doors (108, 109) thereby move in the respective opening directions, and the operation of opening the doors (108, 109) is performed. Note that while the doors (108, 109) are moving in the opening directions, the shaft portions (54a, 54b) linearly move in the opening directions of the doors (108, 109) together with the connecting portions (59a, 59b), without receiving a force in the vehicle width direction from the guide portions (55a, 55b).

On the other hand, when the doors (108, 109) close, a reverse operation of the above-described operation of opening the doors (108, 109) is performed. In other words, the direct-drive brushless electric motor 21 in the door drive mechanism 53 is driven, and the drive pinion 61 driven via the planet gear mechanism 20 rotates in the direction opposite to that in the above-described opening operation. Thus, the support rails 16d and the pinions 16c in the double-speed rails (56a, 56b) that are connected to the connecting portions (59a, 59b) move in the directions opposite to those in the above-described opening operation. Further, in the double-speed rails (56a, 56b), the upper racks 16a connected to the doors (108, 109) move at a speed that is double the speed of the pinions 16c, relative to the lower racks 16b fixed to the slide base 52. Thus, the doors (108, 109) move in the respective closing directions, and the operation of closing the doors (108, 109) is performed. Also, the shaft portions (54a, 54b) linearly move in the respective closing directions toward the guide portions (55a, 55b).

Accordingly, when the doors (108, 109) have moved in the closing directions by a predetermined amount from fully-opened positions, the shaft portions (54a, 54b) come into contact with the second links 25 in the respective guide portions (55a, 55b) and bias the second links 25. Then, the guide portions (55a, 55b) move similarly to the guide portion 15 in the first embodiment. In other words, when the doors (108, 109) close, the guide portions (55a, 55b) pivot while coming into contact with the shaft portions (54a, 54b) and guide the shaft portions (54a, 54b) such that the shaft portions (54a, 54b) move toward the other side in the vehicle width direction (i.e., in the closing direction of the door 108 and the closing direction of the door 109). Also, at this time, the doors (108, 109) move similarly to the shaft portions (54a, 54b). In other words, the doors (108, 109) linearly move in the closing directions from fully-opened positions, and are also drawn inward in the vehicle width direction in the vicinity of the closed positions and transition to the closed positions. Thus, the plugging operation toward the inside in the vehicle width direction by the plugging mechanism is finished.

Also, upon the plugging operation toward the inside in the vehicle width direction by the plugging mechanism being finished, the sliding contact portion 38 disposed on the slide rail 39 fixed to the slide base 52 also moves toward the inside in the vehicle width direction, together with the slide base 52. As a result, the roller 42 that was located at the position of the roller 42b indicated by a dashed line in FIG. 26 moves to the position of the roller 42a indicated by a two-dot chain line. Also, at this time, the locking pins (63a, 63b) are engaged respectively with the first engaging portions (71a, 71b) of the engaging members (69a, 69b) and cause the engaging members (69a, 69b) to pivot. Thus, the second engaging portions (72a, 72b) of the engaging members (69a, 69b) are in a state of facing both ends of the link mechanism 64 in a bent state.

Further, upon the engaging members (69a, 69b) pivoting as described above, constraint on the link mechanism 64 by the outer peripheral portions (74a, 74b) of the engaging members (69a, 69b) is released. For this reason, the link 64a pivots with a driving force that is input from the carrier 20c in the planet gear mechanism 20 via the output roller 22a, and the link mechanism 64 deforms from a bent state into a linear state. Then, both ends of the link mechanism 64 are engaged with the second engaging portions (72a, 72b) of the engaging members (69a, 69b).

Also, at this time, the transmission member 40 moves parallel to the closing direction of the door 108 in the vehicle front-rear direction with a driving force that is input from the carrier 20c via the output roller shaft 22b, and the slide block 41 also moves parallel to the closing direction of the door 108 on the slide rail 39. Then, the roller 42 moves from the position of the roller 42a indicated by a two-dot chain line in FIG. 26 up to the position where it comes into contact with the first face 36a of the fixed lock portion 62. Thus, the state of the doors (108, 109) being locked by the locking mechanism 57 is ensured, and the plugging operation toward the outside in the vehicle width direction by the plugging mechanism is disabled.

Note that when the aforementioned opening operation and closing operation of the doors (108, 109) are performed, the pivoting arms 58 (58a, 58b) provided in the upper part and the lower part of the entrance 106 on both sides thereof in the vehicle front-rear direction pivot. Thus, the movement of the doors (108, 109) in the vehicle width direction is also guided by the pivoting arms 58 (58a, 58b), and a smooth plugging operation of the doors (108, 109) is performed.

Regarding Effect of Plug Door Device

With the above-described plug door device 2, the guide portions 55 (55a, 55b) come into contact with the shaft portions 54 (54a, 54b) and pivot, thereby guiding the shaft portions 54 (54a, 54b) in the vehicle width direction. For this reason, the operation of the guide portions 55 (55a, 55b) is an operation of following the movement of the doors (108, 109) in the vehicle width direction. With this configuration, the space occupied by the guide portions 55 (55a, 55b) in the vehicle width direction can be further reduced in accordance with the state of movement of the doors (108, 109) in the vehicle width direction. As a result, a smaller plug door device 2 can be realized that can perform the opening/closing operation and the plugging operation using the door drive mechanism 53 for causing a force in the vehicle front-rear direction to act on the doors (108, 109). Also, since the door drive mechanism 53 moves the doors (108, 109) in the vehicle front-rear direction via the double-speed rails 56 (56a, 56b) each constituted by the two racks (16a, 16b) and the pinion 16c, the operating stroke of the door drive mechanism 53 can be doubled to efficiently move the doors (108, 109). As a result, an even smaller plug door device 2 that is even smaller also in the vehicle front-rear direction can be realized.

Further, with the plug door device 2, the movable lock portion 37 comes into contact with the fixed lock portion 62 fixed on the fixed base 51 side, on the inside in the vehicle width direction, and movement of the doors (108, 109) in a closed state outward in the vehicle width direction is restricted. For this reason, when the doors (108, 109) are in a closed state, the doors (108, 109) are more reliably constrained without rattling such that they do not move outward in the vehicle width direction. Accordingly, the doors (108, 109) in a closed state can be locked without rattling.

Accordingly, according to the present embodiment, a smaller plug door device 2 can be realized that can perform the opening/closing operation and the plugging operation using the door drive mechanism 53 for causing a force in the vehicle front-rear direction to act on the doors (108, 109), and furthermore, a plug door device 2 that can lock the doors (108, 109) in a closed state without rattling can be provided.

Also, with the plug door device 2, the door drive mechanism is constituted by the drive portion 53a having the direct-drive brushless electric motor 21 and the rack-and-pinion mechanism 53b for moving the doors (108, 109) via the connecting portions (59a, 59b) as a result of operating with a driving force from the drive portion 53a. For this reason, with the pair of drive racks (60a, 60b) in the rack-and-pinion mechanism 53b that move in opposite directions, two-panel sliding doors provided as the pair of doors (108, 109) installed at the entrance 106 can be simultaneously driven to open/close. Accordingly, one brushless electric motor 21 enables the operation of opening/closing the two-panel sliding doors (108, 109) to be performed. Also, with the plug door device 2, the drive portion 53a is constituted by the direct-drive brushless electric motor 21 and the planet gear mechanism 20. Further, a driving force of the brushless electric motor 21 is input to one of the sun gear 20a, the carrier 20c, and the ring gear 20d in the planet gear mechanism 20, a driving force from another one thereof is output to the rack-and-pinion mechanism 53b, and a driving force from the remaining one thereof is output to the locking mechanism 57. For this reason, one brushless electric motor 21 enables the operation of opening/closing the two-panel sliding doors (108, 109), the plugging operation, and the operation of locking the doors (108, 109) by the locking mechanism 57 to be performed, and a compact and efficient drive portion 53a can be realized.

Also, in the plug door device 2, biasing springs 70a and 70b are provided so as to correspond respectively to the plurality of engaging members 69a and 69b. For example, in the case where only one biasing spring is provided, if this return spring is broken or becomes detached, the engaging members 69a and 69b cannot be appropriately rotated in the unlocking directions. In contrast, with the plug door device 2, even in the case where one of the two biasing springs 70a and 70b is broken or is detached, the engaging members 69a and 69b can be appropriately rotated in the unlocking directions by using the other one of the biasing springs 70a and 70b. That is to say, with the plug door device 2, the lock mechanism 57 can be operated more appropriately.

Also, in the plug door device 2, the first face 46 and the second face 47 that are pressed by the output roller 22a of the lock output portion 22 are provided so as to have a positional relationship in which the first and second faces 46 and 47 intersect each other. With this configuration, the gap between the first face 46 and the second face 47 can be widened. Thereby, when the lock mechanism 57 is assembled, the lock output portion 22 can be disposed between the first face 46 and the second face 47 with relative ease. Accordingly, with the plug door device 2, it is possible to provide a plug door device including the lock mechanism 57 whose required assembly accuracy and position accuracy are not as high as those in the conventional technique.

Also, in the plug door device 2, the output roller 22a moves along the second face 47 in the link mechanism 64 when in a linear state, and accordingly the link mechanism 64 can be reliably changed from a bent state to a linear state even if the amount of movement of the lock output portion 22 varies. For this reason, the required assembly accuracy and position accuracy are not as high as those in the conventional technique, and therefore the workability in assembly can be further improved.

Also, in the plug door device 2, the position of the link 64a is reliably fixed by the output roller 22a and the rotation restricting member 43d, and accordingly the linear state or the bent state of the link mechanism 64 can be maintained even if the connection between the link 64a and the links 64b and 64c is more or less innacurate. With this configuration, the required assembly accuracy and position accuracy of the link mechanism 64 are not as high as those in the conventional technique, and therefore the workability in assembly can be still further improved.

Third Embodiment

Figure 27:
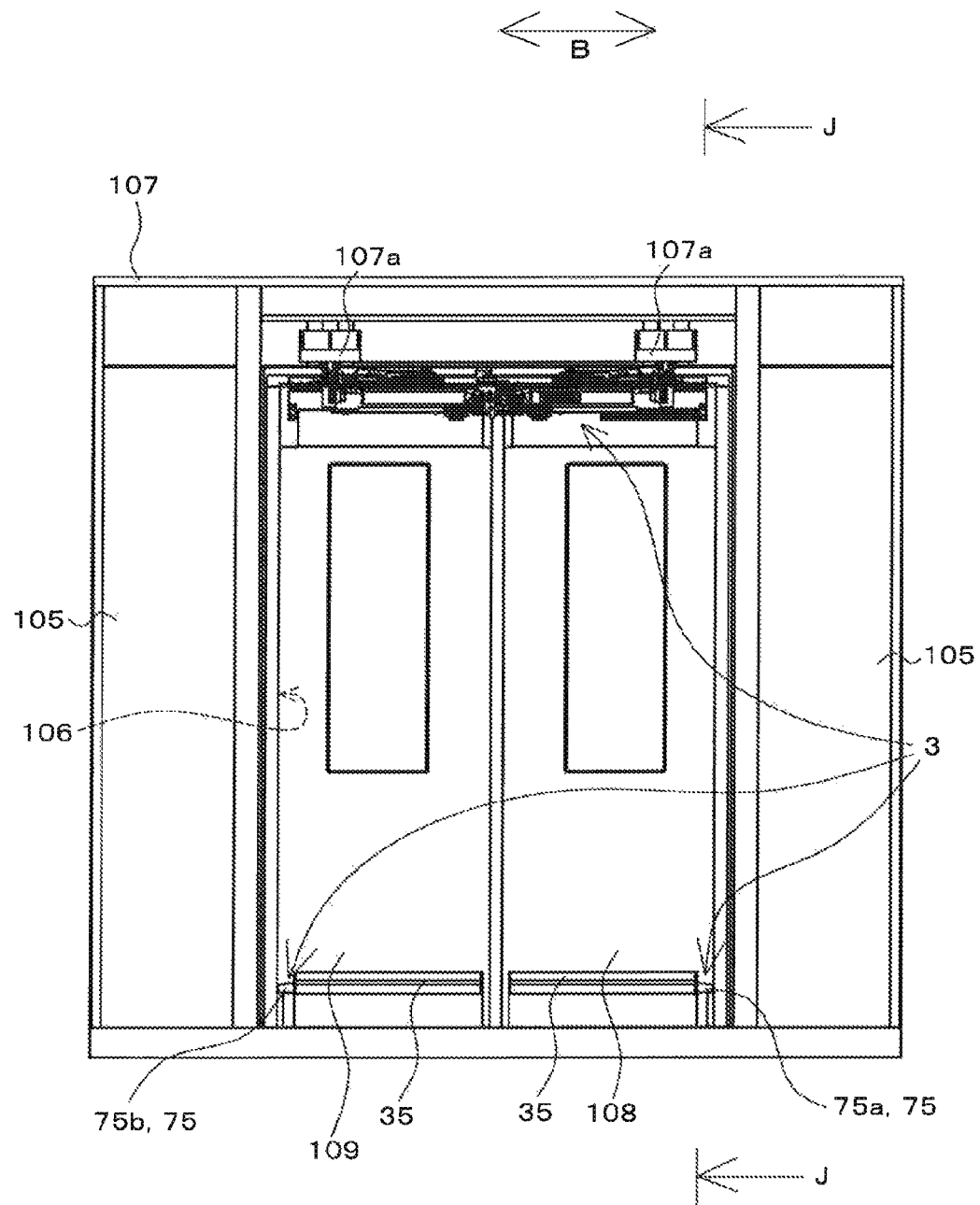
FIG. 27 is a schematic view showing an overall plug door device according to a third embodiment of the present invention.
Figure 28:
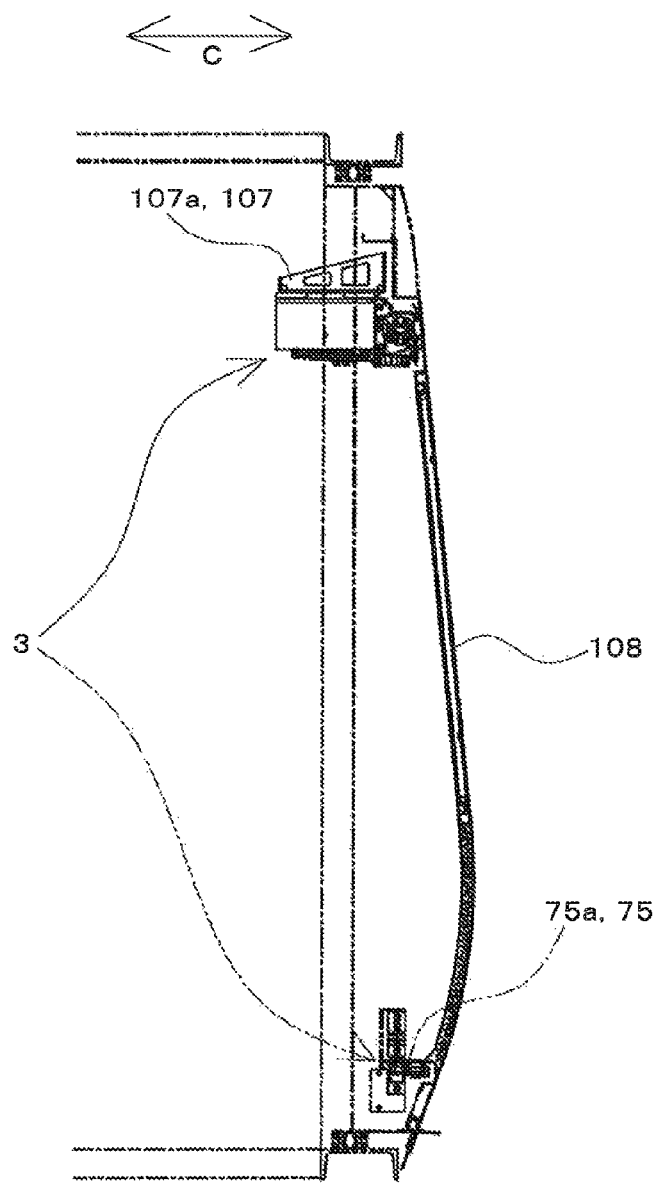
FIG. 28 is a schematic view showing a cross-section, as viewed from the position indicated by arrows of line J-J in FIG. 27.
Figure 29:
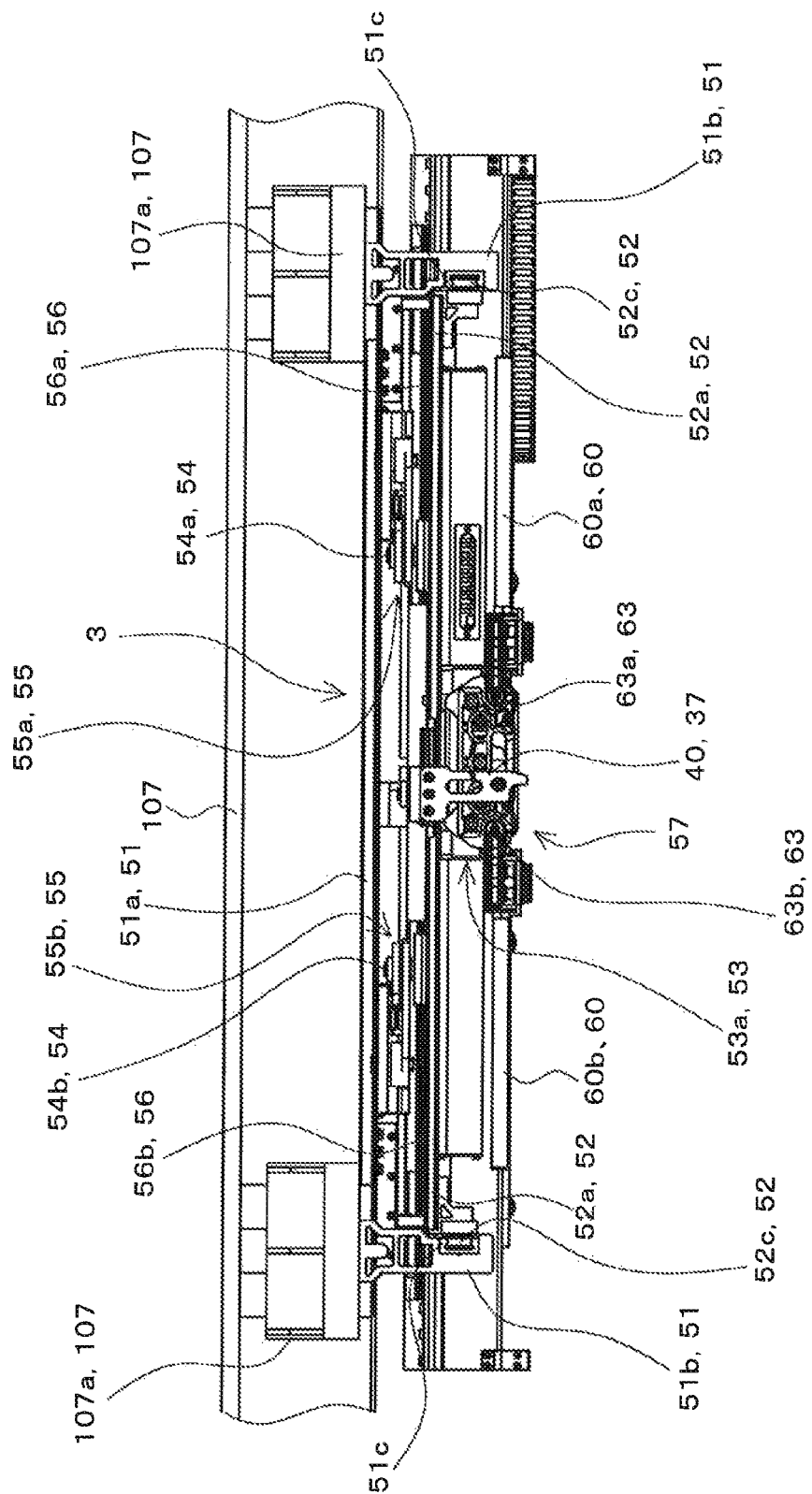
FIG. 29 is a schematic view serving as a front view of the plug door device shown in FIG. 27.
Figure 30:
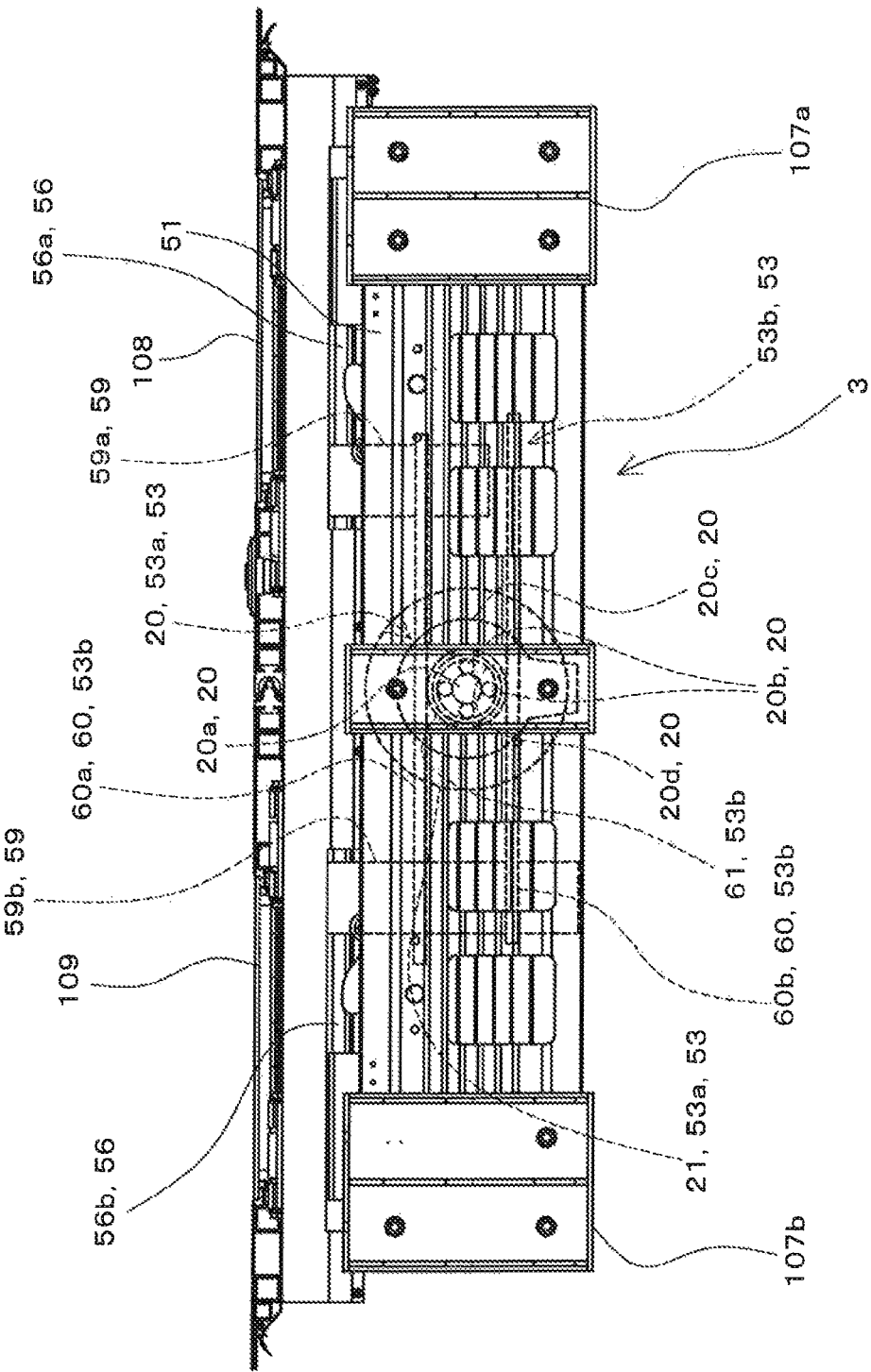
FIG. 30 is a schematic view serving as a plan view of the plug door device shown in FIG. 29.
Figure 31:
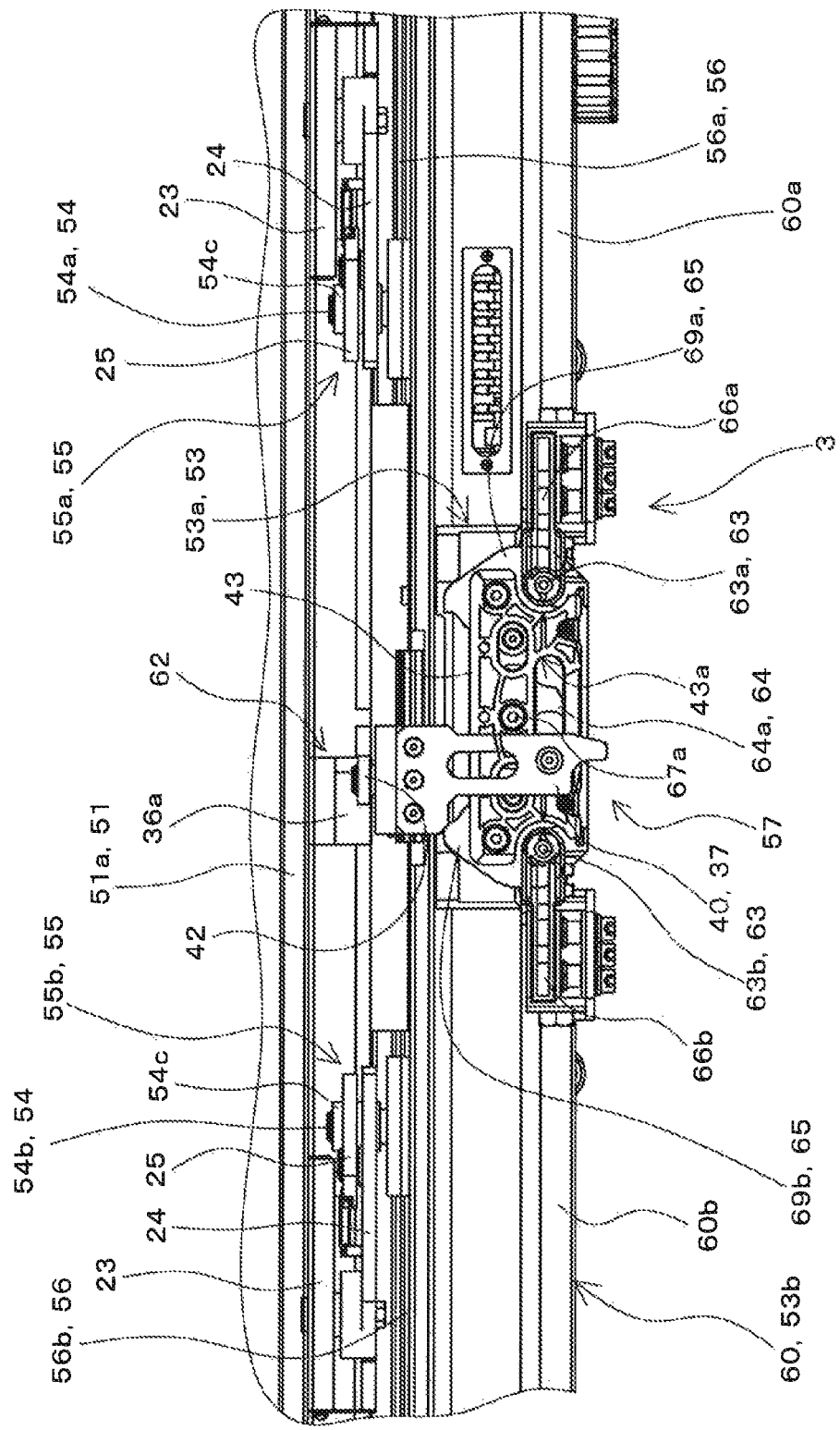
FIG. 31 is an enlarged diagram of a part of FIG. 29.
Figure 32:
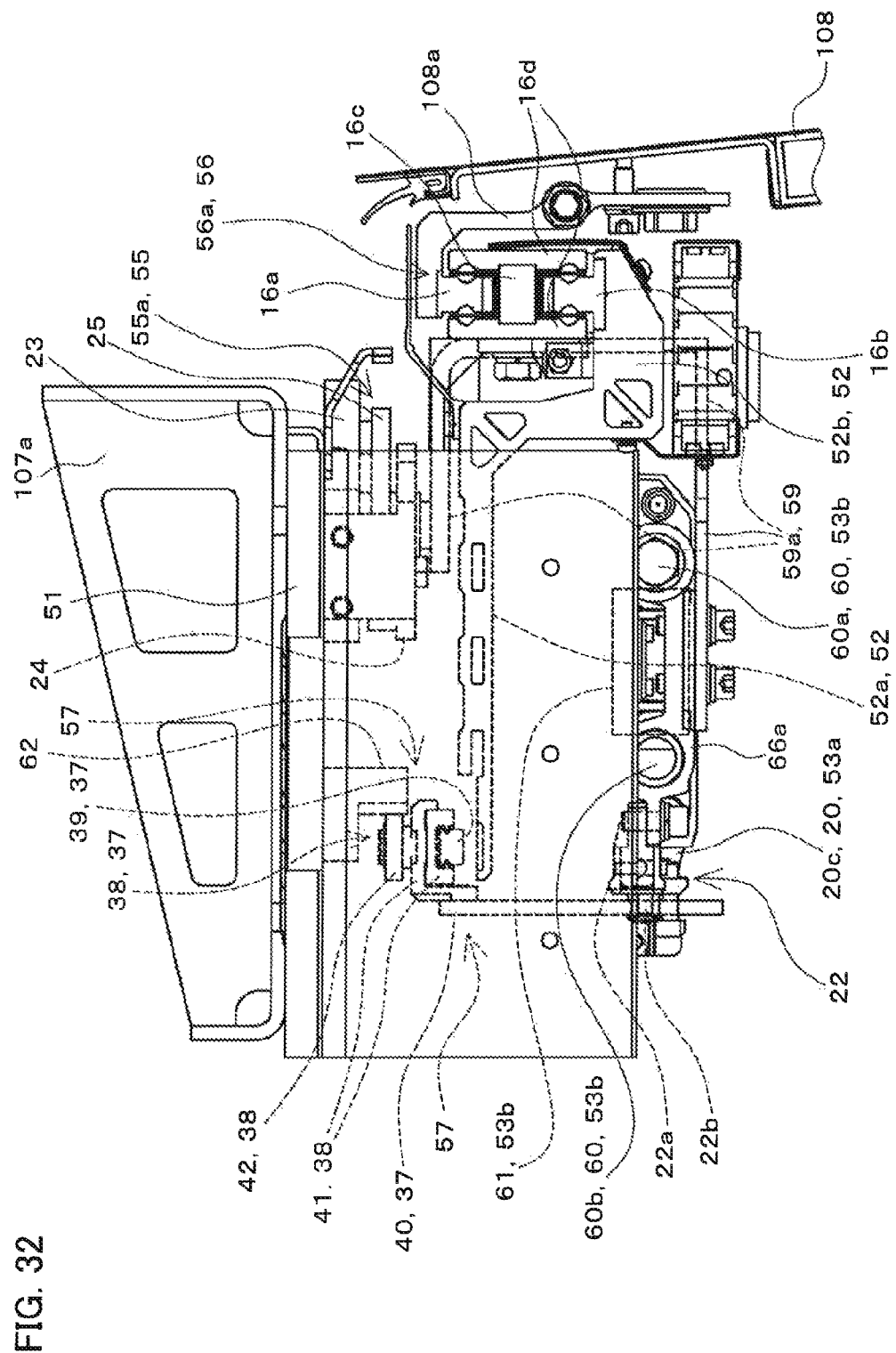
FIG. 32 is an enlarged schematic view of the upper part of a door in FIG. 28.

FIG. 27 is a schematic view showing an overall plug door device 3 (a door opening and closing apparatus) according to a third embodiment of the present invention. The plug door device 3 shown in FIG. 27 is applied to two-panel sliding doors, which are constituted by two doors. Note that FIG. 27 is a schematic view as viewed from the inside of a vehicle, and shows a state where the plug door device 3 is installed together with doors (108, 109) at an entrance 106 of the vehicle. FIG. 28 is a schematic view showing a cross-section, as viewed from the position indicated by arrows of line J-J in FIG. 27. FIG. 29 is a schematic view serving as a front view of the plug door device 3 and enlarges the upper part of the door 108 in FIG. 27. Note that FIGS. 27 and 29 omit the drawing of a cover disposed on the inside the vehicle when the plug door device 3 is housed in the vehicle in the upper part of the entrance 106. FIG. 30 is a schematic view serving as a plan view of the plug door device 3 shown in FIG. 29, which is shown together with the doors (108, 109). FIG. 31 is an enlarged diagram of a part of FIG. 29. FIG. 32 is a schematic view serving as a side view of the plug door device 3 and enlarges the upper part of the door (108, 109) in FIG. 28.

Note that although the third embodiment will describe an example of the plug door device applied to two-panel sliding doors constituted by two doors, this need not be the case, and the present invention may be applied to a one-panel sliding door constituted by one door. In the description of the third embodiment, the constituents that are configured similarly to those in the first embodiment and the second embodiment will be given the same reference numerals in the drawings.

Regarding Overall Configuration

As shown in FIG. 27, a vehicle side wall 105 is provided with the entrance 106. Note that FIG. 27 shows a state where the doors (108, 109) are in a closed state, and indicates the entrance 106 with broken lines. A frame 107 is fixed above of the entrance 106 so as to extend in a vehicle front-rear direction. Here, the "vehicle front-rear direction" is a direction parallel to a vehicle travelling direction, and is the direction indicated by double arrow B in FIG. 27. Note that the vehicle side wall 105 and the frame 107 constitute a part of the vehicle body.

Also, two doors (108, 109) are installed so as to cover the entrance 106. The two doors (108, 109) are two-panel sliding doors, and are opened/closed by the plug door device 3. The doors (108, 109) are formed so as to gradually curve and project at its lower side, outward in a width direction of the vehicle (see FIG. 28). Here, the "width direction of the vehicle" (hereinafter referred to also as the "vehicle width direction") is a direction vertical to the vehicle front-rear direction and up-down direction, and is a direction indicated by double arrow C in FIG. 28. Note that the doors (108, 109) are configured to substantially seal the entrance 106 at a closed position (position shown in FIGS. 27 and 28), which is the position where the doors (108, 109) are in a closed state.

The plug door device 3 shown in FIGS. 27 to 32 is installed at the entrance 106 of the vehicle, and is provided as a device for performing an operation of opening/closing the doors (108, 109) and a plugging operation of moving the doors (108, 109) in the vehicle width direction. This plug door device 3 is configured to include a fixed base 51, a slide base 52, a door drive mechanism 53 for driving two-panel sliding doors (108, 109) so as to move the doors (108, 109) in the vehicle front-rear direction, shaft portions 54 (54a, 54b) that are driven by the door drive mechanism 53 in the vehicle front-rear direction, guide portions 55 (55a, 55b) for guiding the shaft portions 54 (54a, 54b), double-speed rails 56 (56a, 56b), a locking mechanism 57, pivoting arm mechanisms 75 (75a, 75b), and the like.

The fixed base 51 is fixed to a bracket 107a, which is a part of the frame 107 that constitute the vehicle body. The fixed base 51 is thereby fixed so as not to move relatively to the vehicle body. Also, the fixed base 51 is provided with a flat plate-like portion 51a that is horizontally installed, and a pair of slide support portions (51b, 51b) that are provided on both sides in the vehicle front-rear direction of the plate-like portion 51a. The slide support portions 51b are provided as block-like members installed so as to extend in the vehicle width direction. A rail member 51c for supporting the slide base 52 slidably in the vehicle width direction is fixed to each slide support portion 51b.

The slide base 52 shown in FIGS. 29 and 32 is installed on the fixed base 51 under it, slidably in the vehicle width direction relative to the fixed base 51. The slide base 52 is provided with a main body 52a installed so as to horizontally extend in a flat manner, bracket portions 52b, and wheel portions 52c.

The bracket portions 52b are each provided as a portion that extends so as to bend downward relative to the main body 52a at an end on the outside (door 108, 109 side) in the vehicle width direction of the main body 52a, and thereafter, horizontally bend toward the outside in the vehicle width direction. A plurality of bracket portions 52b are provided so as to extend from a plurality of positions in the vehicle front-rear direction with respect to the main body 52a. The double-speed rails 56 (56a, 56b), which will be described later, are installed on the respective bracket portions 52b. The wheel portions 52c are installed on both sides in the vehicle front-rear direction of the main body 52a, and are each configured to include a wheel that rolls on the rail member 51c extending in the vehicle width direction. The slide base 52 is thereby configured to be slidable in the vehicle width direction relative to the fixed base 51.

Regarding Door Drive Mechanism and Double-Speed Rail

The door drive mechanism 53 shown in FIGS. 29 to 32 are installed on the main body 52a of the slide base 52 and is provided as a mechanism for moving the two doors (108, 109) in the vehicle front-rear direction via the connecting portion 59. Note that in the present embodiment, the door drive mechanism 53 is installed at the lower side of the main body 52a. Further, the door drive mechanism 53 is configured to include a drive portion 53a including a direct-drive brushless electric motor 21, a rack-and-pinion mechanism 53b, and the like.

The rack-and-pinion mechanism 53b is provided as a mechanism for moving the connecting portion 59 as a result of receiving an input of a driving force from the drive portion 53a. The rack-and-pinion mechanism 53b is configured to include two facing drive racks 60 (60a, 60b) and a drive pinion 61. The two facing drive racks 60 (60a, 60b) include an outer drive rack 60a disposed outside in the vehicle width direction and an inner drive rack 60b disposed on the inside in the vehicle width direction. The outer drive rack 60a and the inner drive rack 60b are disposed so as to extend parallel to each other in the vehicle front-rear direction.

The drive pinion 61 is disposed between the two drive racks (60a, 60b), and are disposed so as to mesh with teeth provided on the facing sides of the two drive racks (60a, 60b). Further, the drive pinion 61 is disposed such that its rotary axis extends in a vertical direction. Also, the drive pinion 61 is fixed concentrically with a ring gear 20d in a planet gear mechanism 20 in the drive portion 53a. For this reason, the drive pinion 61 is configured to rotate with the rotation of the ring gear 20d around the same rotary axis. As a result of the drive pinion 61 rotating together with the ring gear 20d, the two drive racks (60a, 60b) that mesh with the drive pinion 61 moves in opposite directions in the vehicle front-rear direction.

Also, the drive portion 53a and the drive pinion 61 in the rack-and-pinion mechanism 53b are disposed at the central part in the vehicle front-rear direction of the slide base 52. Further, the connecting portion 59 is attached to the drive racks 60 (60a, 60b) in the rack-and-pinion mechanism 53b.

The drive portion 53a is configured to include the brushless electric motor 21 that is provided as a driving source and constitutes an electric motor in the present embodiment, as well as a planet gear mechanism 20 to which a driving force from the brushless electric motor 21 is input. The planet gear mechanism 20 is configured, similarly to that in the first embodiment, to include a sun gear 20a, a plurality of planet gears 20b, a carrier 20c, a ring gear 20d, and the like.

A driving force from the brushless electric motor 21 is input to the sun gear 20a. The planet gears 20b are disposed around the sun gear 20a, and are provided so as to mesh with the sun gear 20a and revolve around the sun gear 20a while rotating. The carrier 20c is provided as a frame member for rotatably supporting each planet gear 20b and also revolvably supporting each planet gear 20b. The ring gear 20d is provided as a ring-like gear having an inner-circumferential internal gear that meshes with the planet gears 20b. As described above, the drive pinion 61 in the rack-and-pinion mechanism 53b is fixed to the ring gear 20d.

Also, a part of the outer-circumferential portion of the carrier 20c is connected to a lock output portion 22. The lock output portion 22 is provided as a mechanism for inputting a driving force that is output from the carrier 20c to the locking mechanism 57 as a result of the carrier 20c swinging around the axis of the sun gear 20a. The lock output portion 22 is configured to convert the direction in which a driving force output as a result of the swinging of the carrier 20c acts, and output the converted driving force as a driving force in a linear direction parallel to the vehicle front-rear direction. Also, an output roller 22a is provided at a tip portion of the lock output portion 22 from which the driving force is output. Also, the lock output portion 22 is provided with an output roller shaft 22b for rotatably supporting the output roller 22a, and a driving force of the carrier 20c is input to a transmission member 40 in the locking mechanism 57 via the output roller shaft 22b.

Note that although the present embodiment described an exemplary mode in which the driving force from the direct-drive brushless electric motor 21 is input to the sun gear 20a, the driving force output from the ring gear 20d is input to the rack-and-pinion mechanism 53b, and the driving force output from the carrier 20c is input to the locking mechanism 57, this need not be the case. The configuration need only be such that the driving force from the brushless electric motor 21 is input to one of the sun gear 20a, the carrier 20c, and the ring gear 20d, the driving force output from one of the sun gear 20a, the carrier 20c, and the ring gear 20d is input to the rack-and-pinion mechanism 53b, and the driving force output from the remaining one of the sun gear 20a, the carrier 20c, and the ring gear 20d is input to the locking mechanism 57.

The connecting portion 59 that is attached to the drive racks 60 (60a, 60b) and transmits a driving force from the door drive mechanism 53 include a connecting portion 59a attached to the outer drive rack 60a and a connecting portion 59b attached to the inner drive rack 60b. Both the connecting portion 59a and the connecting portion 59b are constituted by plate-like members that are formed in a bent manner. The connecting portion 59a is fixed to the outer drive rack 60a at its end on the door 108 side in the vehicle front-rear direction. The connecting portion 59b is fixed to the inner drive rack 60b at its end on the door 109 side in the vehicle front-rear direction.

The connecting portion 59a is configured to horizontally extend toward the door 108 side from the portion fixed to the outer drive rack 60a, and then bend and extend upward. Then, the connecting portion 59a is fixed, at an end of the upward-extending portion, to a support rail 16d of the double-speed rail 56a of the double-speed rails 56 that is disposed on the door 108 side in the vehicle front-rear direction. The connecting portion 59b is configured to horizontally extend toward the door 108 side from the portion fixed to the inner drive rack 60b, and then bend and extend upward. Then, the connecting portion 59b is fixed, at an end of the upward-extending portion, to a support rail 16d of the double-speed rail 56b of the double-speed rails 56 that is disposed on the door 109 side in the vehicle front-rear direction.

Also, the connecting portion 59a is provided with a protruding end portion that partially bends from the end of the upward-extending portion and horizontally protrudes and extends. This protruding end portion is provided with the shaft portion 54a that protrudes in a cantilevered manner so as to extend upward. Note that the shaft portion 54a is provided with a shaft portion roller 54c that is rotatably attached to the shaft body of the shaft portion 54a fixed to the protruding end portion.

Also, the connecting portion 59b is provided with a protruding end portion that partially bends from the end of the upward-extending portion and horizontally protrudes and extends. This protruding end portion is provided with the shaft portion 54b that protrudes in a cantilevered manner so as to extend upward. Note that the shaft portion 54b is provided with a shaft portion roller 54c that is rotatably attached to the shaft body of the shaft portion 54b fixed to the protruding end portion.

The double-speed rails 56 (56a, 56b) shown in FIGS. 29 to 32 include a double-speed rail 56a disposed on the door 108 side in the vehicle front-rear direction and a double-speed rail 56b disposed on the door 109 side in the vehicle front-rear direction. The double-speed rail 56a and the double-speed rail 56b are provided so as to extend in the vehicle front-rear direction. Each double-speed rail (56a, 56b) is configured to include two facing racks (16a, 16b), a pinion 16c, and a support rail 16d. The two facing racks (16a, 16b) in each double-speed rail (56a, 56b) include an upper rack 16a disposed at the upper side and a lower rack 16b disposed at the lower side. The upper rack 16a and the lower rack 16b are disposed so as to extend parallel to each other in the vehicle front-rear direction.

The pinion 16c in each double-speed rail (56a, 56b) is disposed between the two racks (16a, 16b), and is disposed so as to mesh with teeth provided on the racks (16a, 16b). Further, in each double-speed rail (56a, 56b), the pinion 16c is supported rotatably relative to the support rail 16d.

The pinion 16c in the double-speed rail 56a is connected to the connecting portion 59a side. In other words, the pinion 16c in the double-speed rail 56a is connected to the connecting portion 59a via the support rail 16d in the double-speed rail 56a. For this reason, the connecting portion 59a fixed to the drive rack 60a and the support rail 16d and the pinion 16c in the double-speed rail 56a are connected to each other such that relative positions thereof do not change.

On the other hand, the pinion 16c in the double-speed rail 56b is connected to the connecting portion 59b side. In other words, the pinion 16c in the double-speed rail 56b is connected to the connecting portion 59b via the support rail 16d in the double-speed rail 56b. For this reason, the connecting portion 59b fixed to the drive rack 60b and the support rail 16d and the pinion 16c in the double-speed rail 56b are connected to each other such that relative positions thereof do not change.

Also, in each double-speed rail (56a, 56b), the support rail 16d for rotatably supporting the pinion 16c is configured to support the upper rack 16a and the lower rack 16b in a state of sandwiching them from both sides in the vehicle width direction. Note that the support rail 16d supports the upper rack 16a and the lower rack 16b slidably in the vehicle front-rear direction.

Also, in the double-speed rail 56a, the lower rack 16b, which is one of the two racks (16a, 16b), is fixed and connected to the bracket portion 52b of the slide base 52, and the other rack, namely the upper rack 16a is connected to the door 108 side. Note that the upper rack 16a is connected to the door 108 via a door support member 108a. The door support member 108a supports the door 108 in a suspending manner.

Also, in the double-speed rail 56b, the lower rack 16b, which is one of the two racks (16a, 16b), is fixed and connected to the bracket portion 52b of the slide base 52, and the other rack, namely the upper rack 16a is connected to the door 109 side. Note that the upper rack 16a is connected to the door 109 via a door support member, which is configured similarly to the door support member 108a. This door support member supports the door 109 in a suspending manner.

Upon the drive pinion 61 in the door drive mechanism 53 being driven, the support rail 16d and the pinion 16c in the double-speed rail 56a move together with the connecting portion 59a fixed to the drive rack 60a in the vehicle front-rear direction. The pinion 16c thereby moves toward one side in the vehicle front-rear direction while meshing with the lower rack 16b fixed to the slide base 52. Then, relative to this moving pinion 16c, the upper rack 16a that meshes with the pinion 16c moves toward the same side in the vehicle front-rear direction. For this reason, the upper rack 16a moves relative to the lower rack 16b at a speed that is double the moving speed of the pinion 16c. The amount of movement of the upper rack 16a relative to the lower rack 16b is double the amount of movement of the pinion 16c relative to the lower rack 16b, and the direction of the movement is the same. The door 108 connected to the upper rack 16a via the door support member 108a will also move at the same speed as that of the upper rack 16a. Then, the door 108 moves toward one side in the vehicle front-rear direction relative to the slide base 52 to which the lower rack 16b is connected.

Also, upon the drive pinion 61 being driven, the support rail 16d and the pinion 16c in the double-speed rail 56b also move together with the connecting portion 59b fixed to the drive rack 60b in the vehicle front-rear direction at the same timing as the aforementioned operation timing of the double-speed rail 56a. At this time, the drive rack 60b moves in an opposite direction that of to the drive rack 60a, and the pinion 16c of the double-speed rail 56b moves in an opposite direction to that of the pinion 16c in the double-speed rail 56a. Further, the upper rack 16a in the double-speed rail 56b also moves relative to the lower rack 16b at a speed that is double the moving speed of the pinion 16c by a distance that is double the moving distance of the pinion 16c. As a result, the door 109 connected to the upper rack 16a via the door support member moves toward the other side in the vehicle front-rear direction, relative to the slide base 52 to which the lower rack 16b of the double-speed rail 56b is connected. In other words, the door 109 moves in the direction opposite to the moving direction of the door 108 in the vehicle front-rear direction. For this reason, the plug door device 3 is configured such that the two-panel sliding doors (108, 109) are drive to symmetrically open/close.

Regarding Plugging Mechanism

In the plug door device 3, the plugging mechanism for performing the plugging operation of moving the doors (108, 109) in the vehicle width direction is configured to include the shaft portions 54 (54a, 54b), the guide portions 55 (55a, 55b), and roller guides (23, 23). Note that the plugging mechanism for performing the plugging operation on the door 108 side is constituted by the shaft portion 54a, the guide portion 55a, and the roller guide 23, and the plugging mechanism for performing the plugging operation of the door 109 side is constituted by the shaft portion 54b, the guide portion 55b, and the roller guide 23.

The plugging mechanism for performing the plugging operation on the door 108 side and the plugging mechanism for performing the plugging operation on the door 109 side are configured in a similar manner. The guide portion 55a in the plugging mechanism on the door 108 side is provided so as to guide the shaft portion 54a provided at the protruding end portion of the connecting portion 59a. Also, the guide portion 55b in the plugging mechanism on the door 109 side is provided so as to guide the shaft portion 54b provided in the protruding end portion of the connecting portion 59b.

Since the plugging mechanism on the door 108 side and the plugging mechanism on the door 109 side are configured in a similar manner, the configuration of the plugging mechanism on the door 108 side will be described below, and the description of the configuration of the plugging mechanism on the door 109 side will be omitted. Note that the disposition and configuration in the vehicle front-rear direction of the constituent elements of the plugging mechanism on the door 108 side are set so as to be opposite to those of the plugging mechanism on the door 109 side. In other words, the plugging mechanism on the door 109 side is set such that the disposition and configuration of the constituent elements in the vehicle front-rear direction and in the vehicle width direction are in a state of disposition in line symmetry with respect to the plugging mechanism on the door 108 side about a virtual line that passes through the central position in the vehicle front-rear direction of the entrance 106 and horizontally extends in the vehicle width direction.

Figure 33:
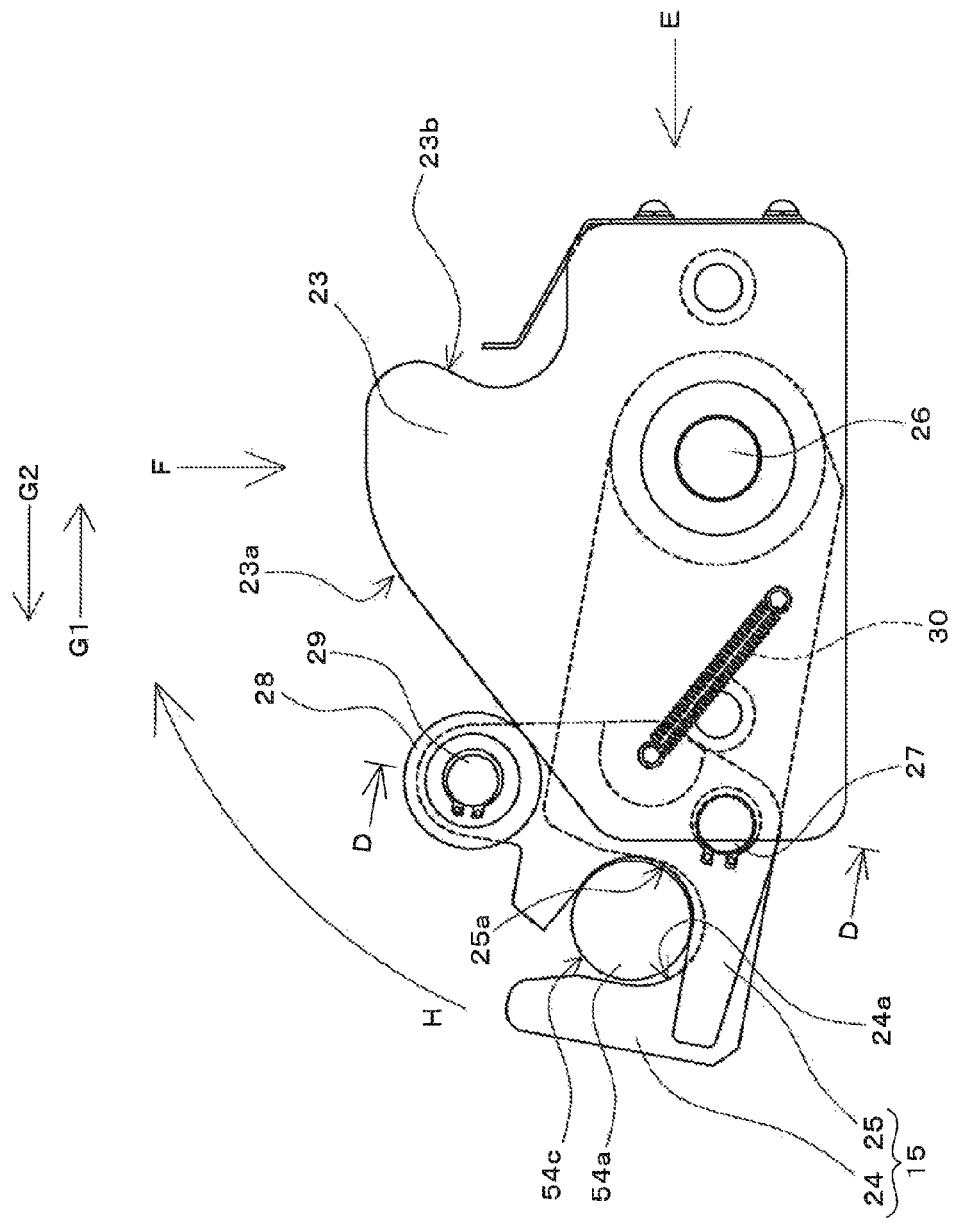
FIG. 33 is a plan view of a plugging mechanism in the plug door device shown in FIG. 29.
Figure 34:
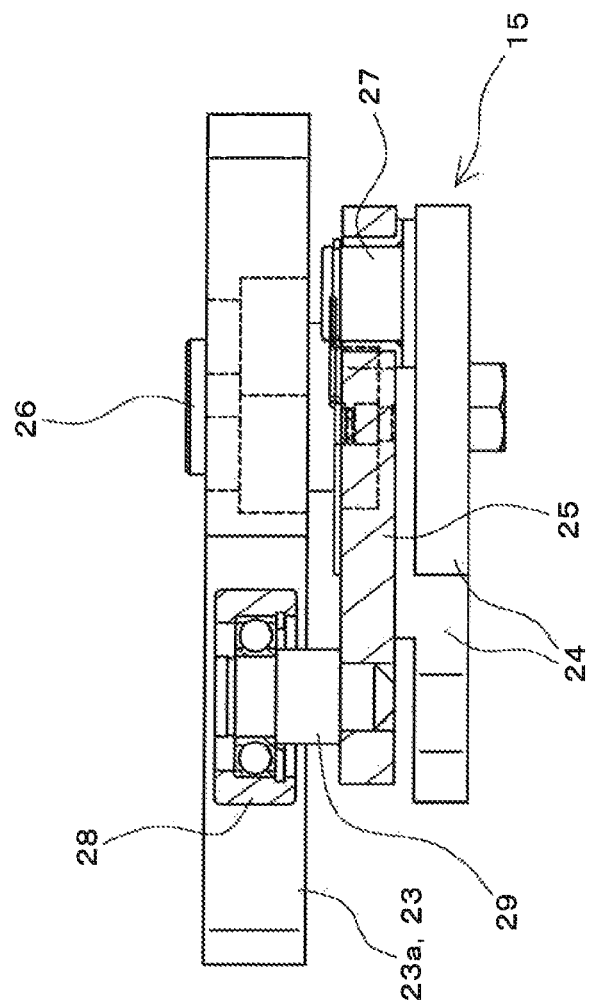
FIG. 34 is a diagram including a partial cross-section of the plugging mechanism shown in FIG. 33, as viewed from the position indicated by an arrow of line D-D.
Figure 35:
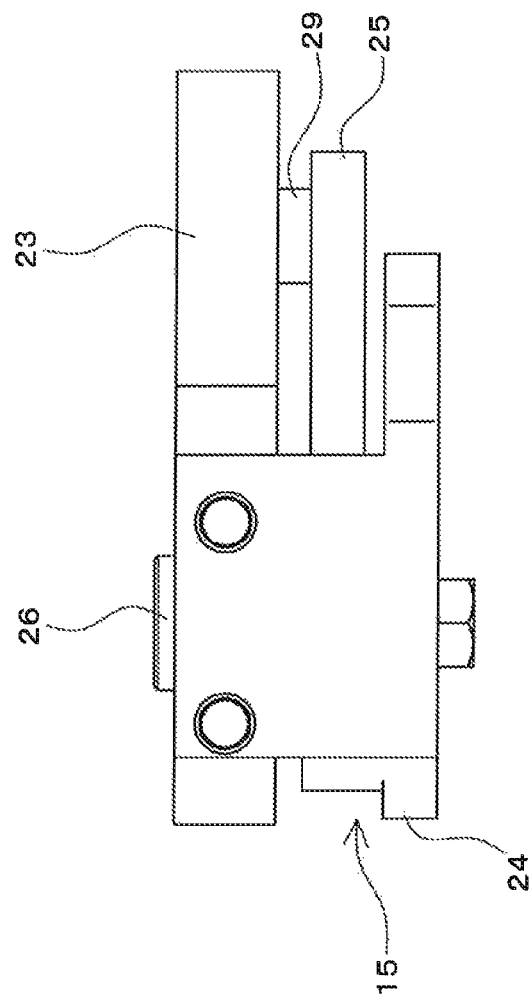
FIG. 35 is a side view of the plugging mechanism shown in FIG. 33, as viewed in the direction indicated by an arrow of line E.
Figure 36:
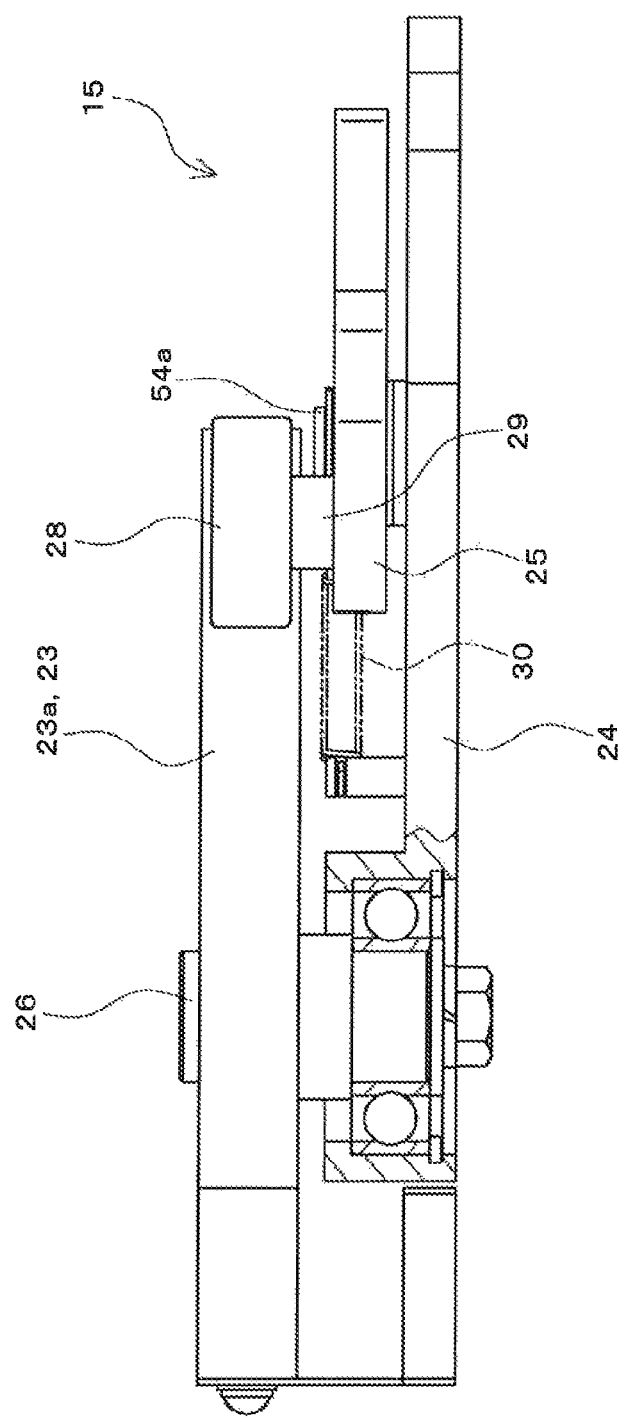
FIG. 36 is a back view of the plugging mechanism shown in FIG. 33 including a partial cross-section as viewed in the direction indicated by an arrow of line F.
Figure 37:
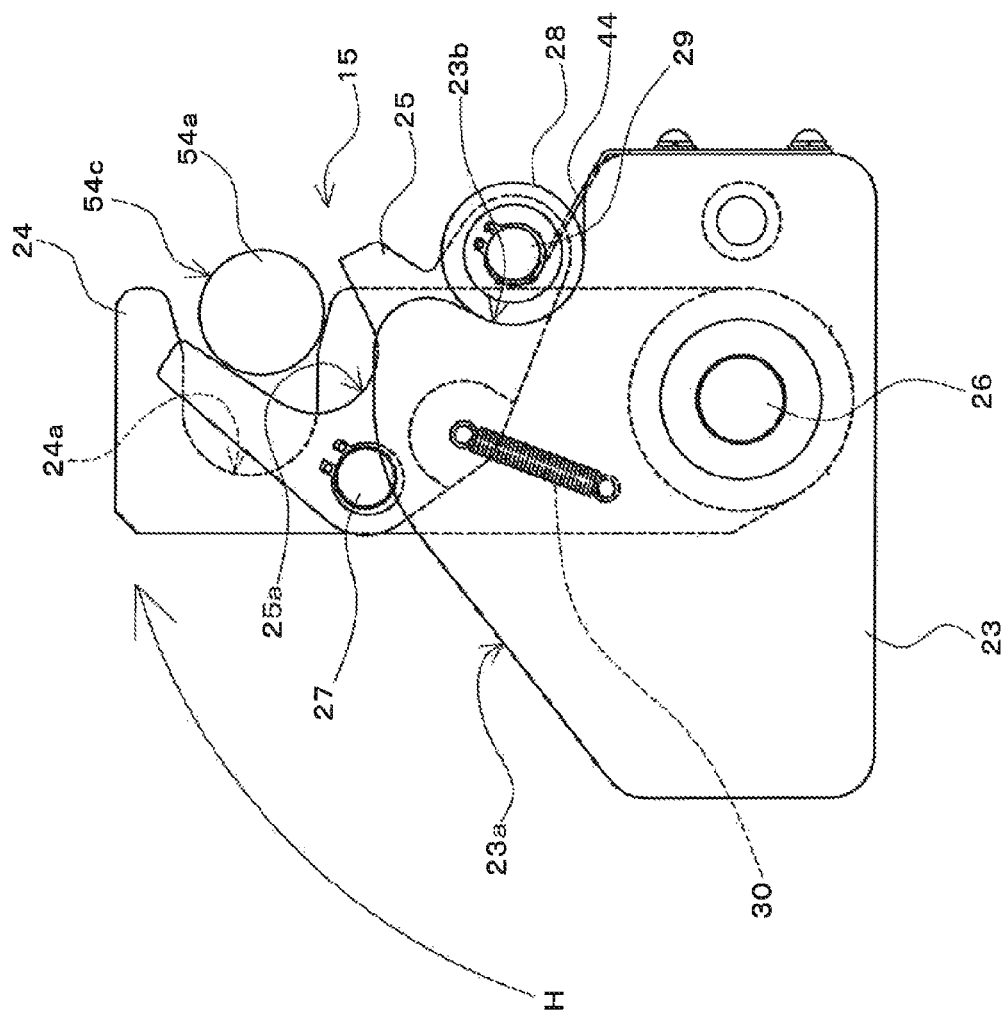
FIG. 37 is a plan view for illustrating an operation of the plugging mechanism shown in FIG. 33.

FIG. 33 is a plan view showing the plugging mechanism on the door 108 side. FIG. 34 is a diagram including a partial cross-section of the plugging mechanism on the door 108 side, as viewed from the position indicated by an arrow of line D-D in FIG. 33. FIG. 35 is a side view of the plugging mechanism on the door 108 side, as viewed in the direction indicated by an arrow of line E in FIG. 33. FIG. 36 is a back view of the plugging mechanism on the door 108 side including a partial cross-section as viewed in the direction indicated by an arrow of line F in FIG. 33. FIG. 37 is a plan view for illustrating an operation of the plugging mechanism on the door 108 side. Note that FIGS. 34 to 36 show enlarged parts, with respect to FIGS. 33 to 37. Also, FIGS. 33 to 36 show a state of the plugging mechanism where the door 108 is at the closed position. On the other hand, FIG. 37 shows a state immediately after the plugging operation is finished when the door 108 opens from the closed position.

The plugging mechanism (shaft portion 54a, guide portion 55a, roller guide 23) shown in FIGS. 29 and 31 to 37 are disposed between the fixed base 51 and the slide base 52. The shaft portion 54a is provided at the protruding end portion of the connecting portion 59a, as mentioned above. The roller guide 23 is fixed at the side of the lower face of the plate-like portion 51a of the fixed base 51. The guide portion 55a is configured to include a first link 24 and a second link 25, and is installed on the lower side of the fixed base 51. The guide portion 55a is rotatably installed, at the first link 24 thereof, on the fixed base 51.

The first link 24 is a substantially rectangular plate-like member, and one end side thereof is provided pivotably relative to the fixed base 51. Specifically, the first link 24 is provided pivotably around a first pivoting shaft 26 that is disposed in a substantially vertical direction. Also, a first dent portion 24a capable of housing the shaft portion roller 54c of the shaft portion 54a is formed in the periphery on the other end side of the first link 24.

The second link 25 is a plate-like member and is pivotably provided on the first link 24. Specifically, the second link 25 is provided pivotably around a second pivoting shaft 27 that is provided in the vicinity of the first dent portion 24a of the first link 24 and is disposed in a substantially vertical direction. Also, a second dent portion 25a capable of housing the shaft portion roller 54c of the shaft portion 54a is formed in the periphery of the second link 25. Also, the second link 25 is provided with a guide portion roller 28 that is attached rotatably around a vertical axis. The guide portion roller 28 is attached rotatably relative to a rotary shaft 29 that protrudes upward from the second link 25, and is disposed at substantially the same height as that of the roller guide 23 fixed to the fixed base 11.

When the door 108 is at the closed position, as shown in FIG. 33, the periphery of the shaft portion 54a is surrounded by the first dent portion 24a of the first link 24 and the second dent portion 25a of the second link 25, as viewed from above. Specifically, the first link 24 is retained such that the opening side of the first dent portion 24a faces outward in the vehicle width direction, and the second link 25 is retained such that the opening side of the second dent portion 25a faces toward the direction opposite to the direction toward the first pivoting shaft 26. Thus, the outward movement of the shaft portion 54a at the first link 24 from the inside of the first dent portion 24a is constrained by the second link 25.

Also, when the door 108 is at the closed position, the guide portion roller 28 of the second link 25 is located outward in the vehicle width direction of the second dent portion 25a. The second pivoting shaft 27 of the second link 25 is located inward in the vehicle width direction of the second dent portion 25a.

Also, a helical spring 30 serving as a biasing means is provided between the first link 24 and the second link 25. One end of the helical spring 30 is provided substantially halfway between the second pivoting shaft 27 of the second link 25 and the guide portion roller 28, and the other end is provided at a position near the first pivoting shaft 26 in the first link 24. Thus, the second link 25 is biased by the helical spring 30 so as to pivot in the direction in which the constraint on the shaft portion 54a is released (i.e., in the clockwise direction around the second pivoting shaft 27, as viewed from above). That is to say, the second link 25 is biased by the helical spring 30 in the direction in which the guide portion roller 28 approaches the roller guide 23.

The roller guide 23 is provided as a plate-like member. The roller guide 23 has, on its side faces, an angled face 23a for guiding the guide portion roller 28, and a curved face 23b for guiding the guide portion roller 28 continuously from the angled face 23a.

The angled face 23a is provided as a part of the side face of the roller guide 23, and is configured as a flat face formed so as to extends more outward in the vehicle width direction toward the direction in which the door 108 opens (opening direction of the door 108; denoted by arrow G1 in FIG. 33).

The curved face 23b is provided as a part of the side face of the roller guide 23, and is configured as a curved face that continues from the angled face 23a, curves so as to protrude in a substantially semicircular shape, then further curves so as to be dent in a substantially semicircular shape, and then extends toward the inside in the vehicle width direction. Note that the curved face 23b protrudes in the opening direction at a position close to the outside in the vehicle width direction, and is recessed toward the direction in which the door 108 closes (i.e., the closing direction of the door 108, which is opposite to the opening direction of the door 108; denoted by arrow G2 in FIG. 33) at a position close to the inside in the vehicle width direction.

Regarding Pivoting Arm Mechanism

Figure 38:
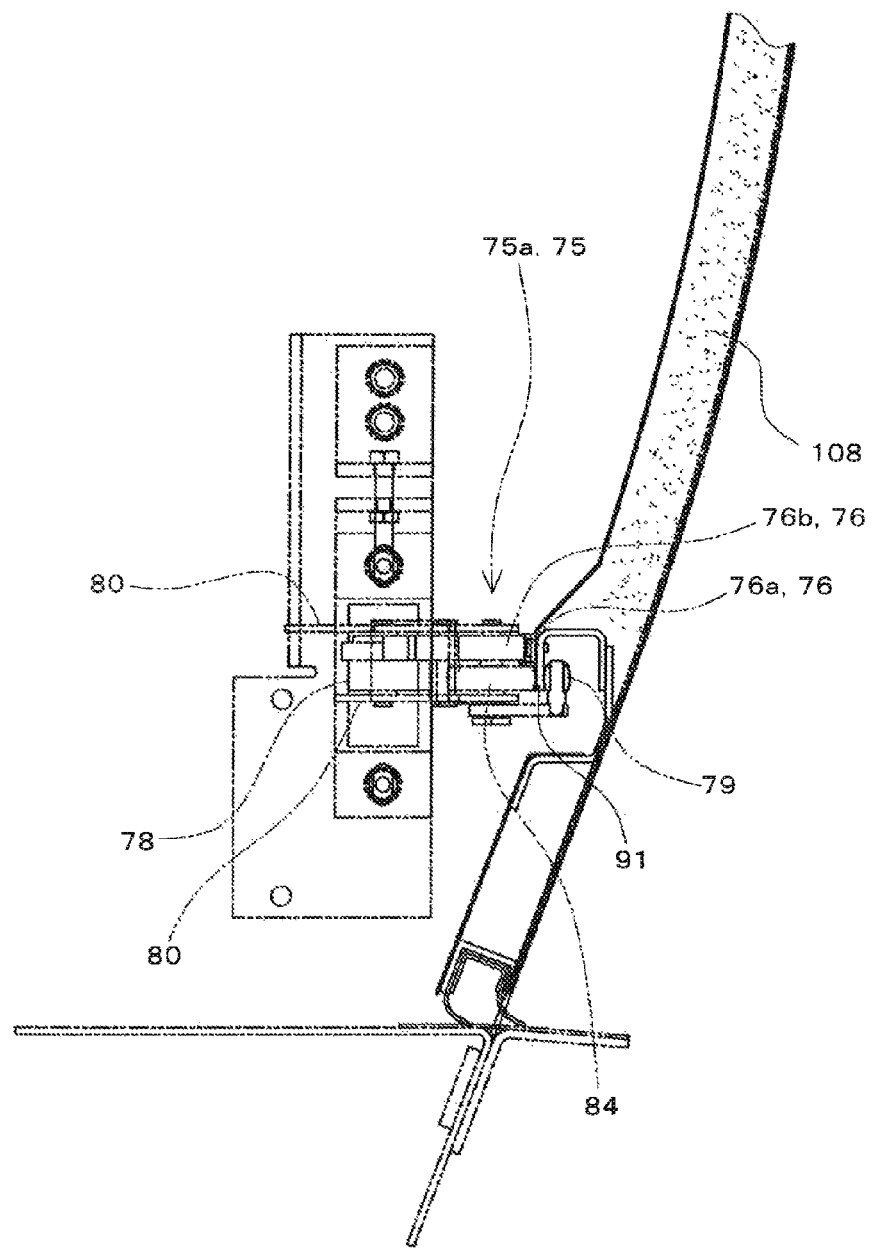
FIG. 38 is an enlarged schematic view of the lower part of a door in FIG. 28.

FIG. 38 is an enlarged schematic view of the lower part of the door 108 in FIG. 28. The pivoting arm mechanism 75 (75a, 75b) shown in FIGS. 27, 28, and 38 is disposed on the lower side of the door (108, 109), and is provided as a mechanism for guiding the door (108, 109) in the vehicle width direction so as to assist the plugging operation of the door (108, 109) by the plugging mechanism. The pivoting arm mechanism 75 (75a, 75b) is configured to include a pivoting arm 80 that pivots based on a door opening/closing force, which is a force in the direction of the door (108, 109) moving in the opening/closing direction with the operation of opening/closing the door (108, 109).

The pivoting arm mechanism 75a is provided as a mechanism for guiding the door 108 in the vehicle width direction so as to assist the plugging operation of the door 108. The pivoting arm mechanism 75b is provided as a mechanism for guiding the door 109 in the vehicle width direction so as to assist the plugging operation of the door 109. The pivoting arm mechanisms (75a, 75b) are disposed at the lower side of the entrance 106 on both sides thereof in the vehicle front-rear direction. Note that FIGS. 28 and 38 show the pivoting arm mechanism 75a, which does not appear when viewed from the position indicated by the arrow of line J-J in FIG. 27, at the corresponding position in the vehicle front-rear direction with two-dot chain lines.

The pivoting arm mechanism 75a on the door 108 side and the pivoting arm mechanism 75b on the door 109 side are configured in the same manner. Therefore, in the following description, the configuration of the pivoting arm mechanism 75a will be described, and the description of the configuration of the pivoting arm mechanism 75b will be omitted. Note that the disposition and configuration in the vehicle front-rear direction of the constituent elements of the pivoting arm mechanism 75a on the door 108 side are set so as to be opposite to those of the pivoting arm mechanism 75b on the door 109 side. In other words, the pivoting arm mechanism 75b is set such that the disposition and configuration of the constituent elements in the vehicle front-rear direction and in the vehicle width direction are in a state of disposition in line symmetry with respect to the pivoting arm mechanism 75a side about a virtual line that passes through the central position in the vehicle front-rear direction of the entrance 106 and horizontally extends in the vehicle width direction.

Figure 39:
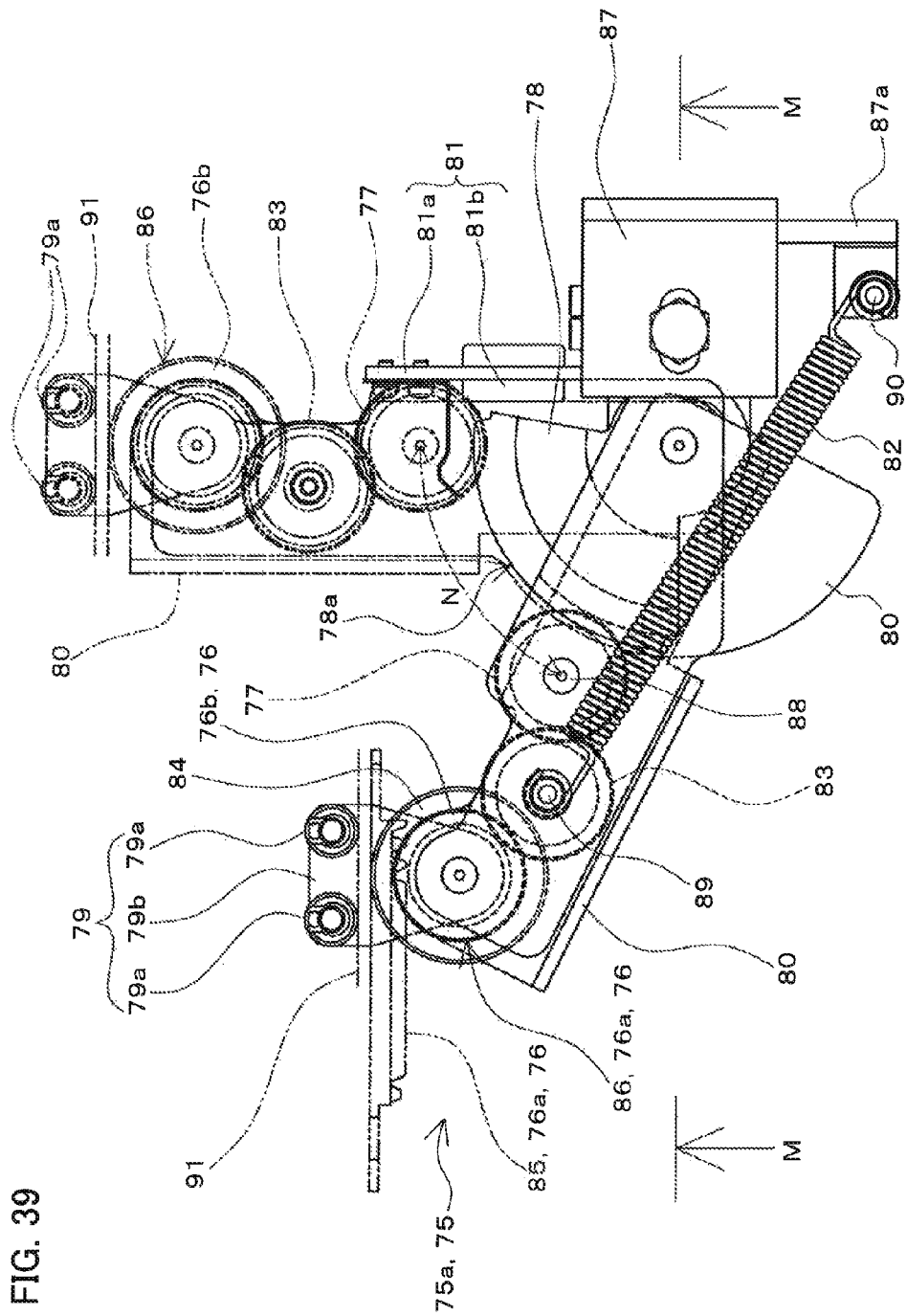
FIG. 39 is a plan view of a pivoting arm mechanism in the plug door device shown in FIG. 28.
Figure 40:
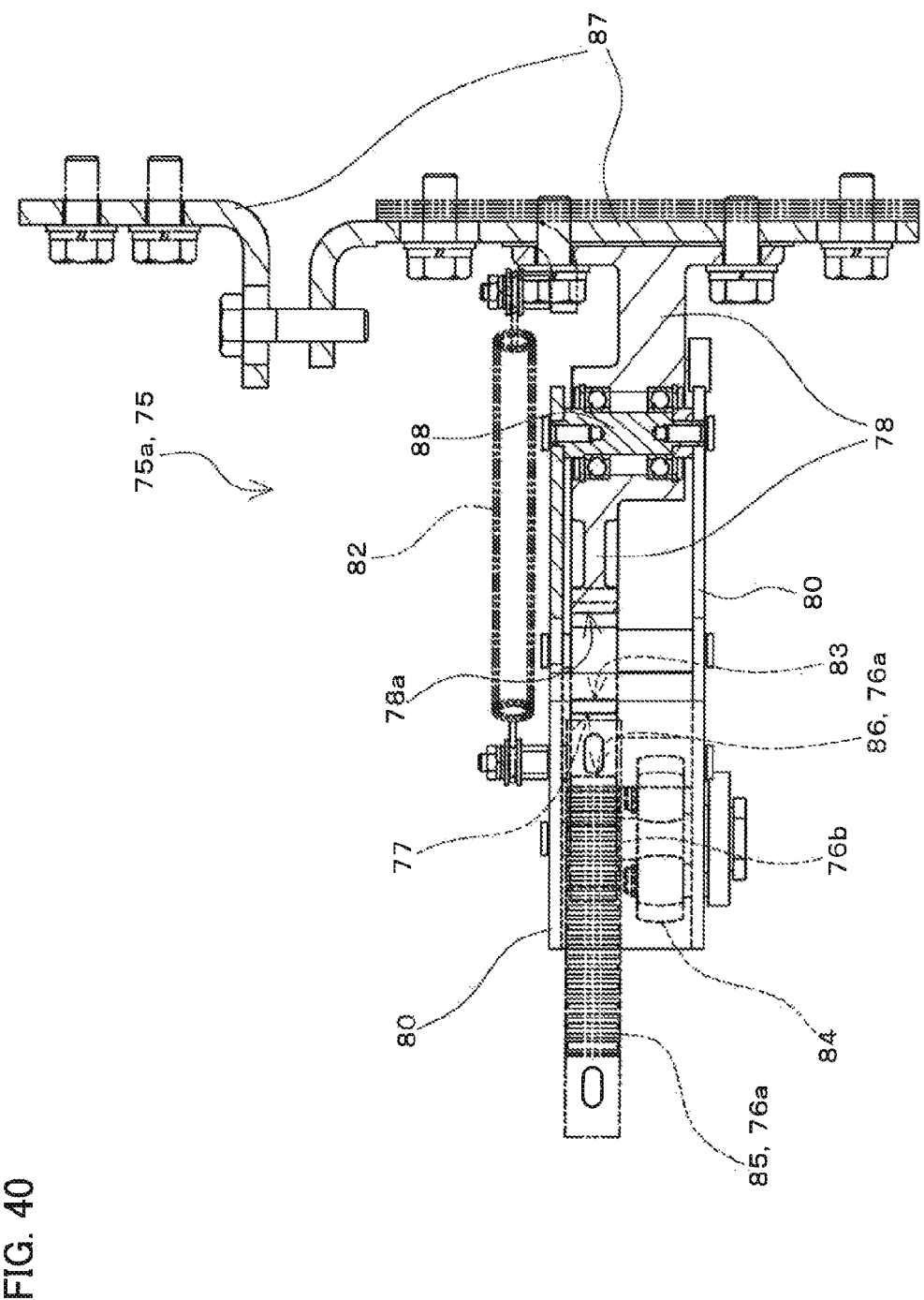
FIG. 40 is a front view including a partial cross-section of the pivoting arm mechanism shown in FIG. 39 as viewed from the position indicated by arrows of line M-M.
Figure 41:
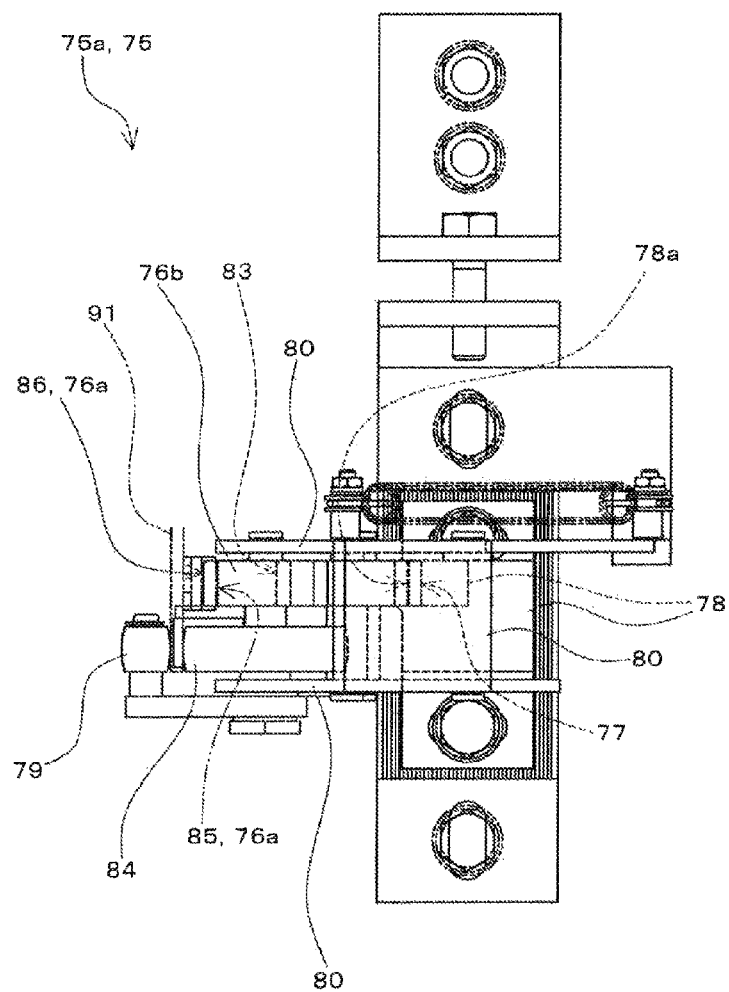
FIG. 41 is a side view of the pivoting arm mechanism shown in FIG. 39.

FIG. 39 is a plan view showing the pivoting arm mechanism 75a. FIG. 40 is a front view of the pivoting arm mechanism 75a shown in FIG. 39 including a partial cross-section, as viewed from the position indicated by the arrow of line M-M. FIG. 41 is a side view of the pivoting arm mechanism 75a. As shown in FIGS. 38 to 41, the pivoting arm mechanism 75a is configured to include a rotational force generating portion 76, a follower rotational member 77, a guiding curved face member 78, a door-side support portion 79, a pivoting arm 80, a restricting member 81, an arm biasing spring 82, an intermediate gear 83, an assist roller 84, and the like.

The rotational force generating portion 76 is provided as a mechanism for generating a rotational force by acquiring, the aforementioned door opening/closing force (a force in the moving direction of the door 108 that moves in the opening/closing direction) from the door 108. Further, the rotational force generating portion 76 is configured to include a driving force acquiring portion 76a and a drive rotational member 76b.

The driving force acquiring portion 76a is provided as a mechanism for acquiring the door opening/closing force as a driving force from the door 108. Meanwhile, the drive rotational member 76b is provided as a member for generating a rotational force with the driving force acquired by the driving force acquiring portion 76a. In the present embodiment, the driving force acquiring portion 76a is configured to include a door-side fixed rack 85 fixed to the inside in the vehicle width direction of the door 108, and an external gear 86 that is provided on the outer circumference of the drive rotational member 76b and meshes with the teeth of the door-side fixed rack 85. Note that the drive rotational member 76b having the external gear 86 provided on its outer circumference is constituted as a spur gear. Also, the door-side fixed rack 85 is provided in the vehicle front-rear direction, not across the full length of the door 108 but along a part of the door 108. The length of the door-side fixed rack 85 in the vehicle front-rear direction is set such that the door-side fixed rack 85 meshes with the external gear 86 during the plugging operation of the door 108 when the door 108 moves in the opening direction from the closed position, and the meshing with the external gear 86 is released when the plugging operation ends.

The follower rotational member 77 is provided as a spur gear that rotates as a result of the rotational force generated by the drive rotational member 76b in the rotational force generating portion 76 being transmitted the follower rotational member 77 via the intermediate gear 83. Note that the intermediate gear 83 is provided as a spur gear and disposed so as to mesh with the drive rotational member 76b and the follower rotational member 77. For this reason, the door-side fixed rack 85 moves with the movement of the door 108 in the opening/closing direction, the drive rotational member 76b that meshes with the door-side fixed rack 85 rotates with the movement of the door-side fixed rack 85, and further, the intermediate gear 83 that meshes with the drive rotational member 76b rotates. Then, the follower rotational member 77 that meshes with the intermediate gear 83 rotates with the rotation of the intermediate gear 83.

The guiding curved face member 78 is configured as a member provided with a guiding curved face portion 78a that comes into contact with the follower rotational member 77 and moves the follower rotational member 77 along an arc-like curved face with the rotation of the follower rotational member 77. Further, the guiding curved face member 78 is fixed to a vehicle-side bracket 87 attached on the side of the vehicle side wall 105, which is the vehicle body, with bolts. Also, the guiding curved face member 78 is provided with a portion in which the guiding curved face portion 78a is formed on the side opposite to an end side that is fixed to the vehicle-side bracket 87. Note that the portion in which the guiding curved face portion 78a is formed is provided as a fan-like portion having a peripheral portion extending in an arc and a pair of peripheral portions radially extending on both sides of the peripheral portion extending in an arc. Further, the guiding curved face portion 78a has an external gear that is formed to be disposed along the arc-like curved face and mesh with the outer-circumferential teeth of the follower rotational member 77. As a result of the follower rotational member 77 thereby rotating while meshing with the external gear of the guiding curved face portion 78a, the follower rotational member 77 moves along the arc-like curved face as shown by dashed-line double arrow N in FIG. 39.

The pivoting arm 80 is disposed on the inside in the vehicle width direction of the door 108 in the vicinity of the door-side fixed rack 85, and is provided pivotably relative to the guiding curved face member 78 via the rotary shaft 88. This pivoting arm 80 is configured to include a pair of flat-plate portions that horizontally extend parallel to each other, and a side-wall portion for fixing and connecting the pair of flat-plate portions. Further, the pivoting arm 80 is configured to rotatably retain the drive rotational member 76b in the rotational force generating portion 76 and also rotatably retain the intermediate gear 83 and the follower rotational member 77, on the pair of flat-plate portions disposed above and below.

The restricting member 81 is provided farther in the opening direction, which is the direction in which the door 108 opens, than the pivoting arm 80 is, and is provided as a stopper for restricting the pivoting range of the pivoting arm 80 as a result of coming into contact with the pivoting arm 80 when the door 108 opens. Further, the restricting member 81 is configured to include a stopper bracket 81a and a stopper rubber 81b.

The stopper bracket 81a is provided as a member fixed to the guiding curved face member 78 in a cantilevered manner, and is disposed so as to protrude outward in the vehicle width direction from the guiding curved face member 78. The stopper rubber 81b is provided as a rubber member fixed to the stopper bracket 81a. This stopper rubber 81b is provided as a portion that is fixed to the stopper bracket 81a at a middle portion in the protruding direction of the stopper bracket 81a, and comes into contact with the pivoting arm 80. Note that FIG. 39 indicates, with two-dot chain lines, a state where the pivoting arm 80 that rotatably retains the drive rotational member 76b, the intermediate gear 83, and the follower rotational member 77 pivots with the movement of the door 108 in the opening direction and comes into contact with the stopper rubber 81b, and its pivoting range is restricted.

The arm biasing spring 82 is provided as a spring member capable of biasing the pivoting arm 80 so as to retain the position of the pivoting arm 80 at the position where the pivoting arm 80 comes into contact with the restricting member 81 (i.e., the position indicated by two-dot chain lines in FIG. 39). The arm biasing spring 82 is provided as a coil spring.

Also, an end of the arm biasing spring 82 at one end side thereof is rotatably attached to a pin 89 that is installed so as to extend vertically and concentrically with the rotary axis of the intermediate gear 83. On the other hand, an end of the arm biasing spring 82 at the other end side thereof is rotatably attached to a pin 90 that is installed so as to vertically extend on a spring-support bracket 87a provided so as to protrude from the vehicle-side bracket 87. Thus, the arm biasing spring 82 is provided so as to be able to bias the pin 89 side, which is the end side on the one end side, in a tensile direction relative to the pin 90 side, which is the end on the other end side.

Also, the pin 90 for rotatably supporting the end on the other end side of the arm biasing spring 82 is disposed on the inside in the vehicle width direction with respect to the rotary shaft 88 of the pivoting arm 80 and the restricting member 81, and is disposed on the side opposite to the pivoting arm 80 in the vehicle front-rear direction. Further, the arm biasing spring 82 is disposed so as to pass above the rotary shaft 88 when the door 108 moves from a state at the closed position to a state where the plugging operation is finished and the pivoting arm 80 pivots. For this reason, in the state where the plugging operation of the door 108 is finished and the pivoting arm 80 is in contact with the restricting member 81, the arm biasing spring 82 is configured to bias the pivoting arm 80 in the direction in which the pivoting arm 80 is brought into contact with the restricting member 81.

The door-side support portion 79 is provided close to the door 108 side than the rotational force generating portion 76 is, and is configured to include a pair of support rollers (79a, 79a) and a support frame 79b for rotatably supporting the pair of support rollers (79a, 79a). Further, the door-side support portion 79 is disposed such that the pair of rollers (79a, 79a) abut a door rail 91, which is a part of the door 108, on the side opposite to the side in the vehicle width direction where the rotational force generating portion 76 is disposed (i.e., on the inside in the vehicle width direction relative to the door rail 91). The door-side support portion 79 is thereby configured to support the door rail 91 serving as a part of the door 108.

Note that the door rail 91 is configured as a rail portion that is provided on the lower side of the door 108 on the inside in the vehicle width direction and extends in the vehicle front-rear direction. Also, the door rail 91 is provided so as to also demarcate, on the door 108, a groove that is open downward and extends in the vehicle front-rear direction. Further, the pair of support rollers (79a, 79a) that are rotatably supported via the respective vertical rotary axes relative to the support frame 79b are disposed within the aforementioned groove. Also, the support rollers 79a are in contact with the door rail 91 toward the inside in the vehicle width direction, and are disposed rollably relative to the door rail 91.

Also, the assist roller 84 that is supported rotatably relative to the pivoting arm 80 and installed at a height position corresponding to the pair of support rollers (79a, 79a) is disposed inward of the door rail 91 in the vehicle width direction. The assist roller 84 is disposed with its rotary axis being concentric with the rotary axis of the drive rotational member 76b, and is disposed below the drive rotational member 76b. Further, the assist roller 84 is disposed rollably relative to the door rail 91, and is provided so as to sandwich the door rail 91 between the assist roller 84 and the pair of support rollers (79a, 79a) from both sides in the vehicle width direction to support the door rail 91.

Note that the support frame 79b for rotatably supporting the pair of support rollers (79a, 79a) is disposed so as to extend below the door rail 91 in the vehicle width direction. Further, the support frame 79b is rotatably supports the pair of support rollers (79a, 79a) at an end on the outside in the vehicle width direction. Meanwhile, an inner end in the vehicle width direction of the support frame 79b is attached rotatably relative to the rotary axis of the assist roller 84. For this reason, when the pivoting arm 80 pivots with the movement of the door 108, the support frame 79b pivots relative to the pivoting arm 80, and the door rail 91 is supported by the pair of support rollers (79a, 79a) and the assist roller 84 that roll relative to the door rail 91.

Regarding Locking Mechanism

The locking mechanism 57 shown in FIGS. 29, 31, and 32 are provided as a mechanism capable of locking the doors (108, 109) so as to limit their movement at the closed positions of the doors (108, 109). The locking mechanism 57 is configured to include locking pins 63 (63a, 63b) (lock members), a link mechanism 64, a link retaining mechanism 65, a fixed lock portion 62, and a movable lock portion 37.

The locking pins 63 (63a, 63b) are provided as pin-like portions installed on arm members (66a, 66b) that are fixed to the drive racks 60 (60a, 60b) or the connecting portions 59 (59a, 59b). The arm member 66a is fixed to the drive rack 60a or the connecting portion 59a. The arm member 66b is fixed to the drive rack 60b or the connecting portion 59b. The arm members (66a, 66b) are provided so as to extend inward in the vehicle width direction from the drive racks 60 (60a, 60b) or the connecting portions 59 (59a, 59b). Further, the arm members (66a, 66b) are each provided with a portion that protrudes along the vehicle front-rear direction on its inner end side in the vehicle width direction. The portions of the arm members (66a, 66b) protruding in the vehicle front-rear direction are disposed so as to protrude in a cantilevered manner from the front side and the rear side of the vehicle, respectively, toward the center in the vehicle front-rear direction of the entrance 106. Further, the locking pins (63a, 63b) are fixed respectively to the ends on the tip side of the arm members (66a, 66b) that protrude in a cantilevered manner in the vehicle front-rear direction. Note that the locking pin 63a is provided so as to protrude outward in the vehicle width direction from the end on the tip side of the arm member 66a. On the other hand, the locking pin 63b is provided so as to protrude outward in the vehicle width direction from the end on the tip side of the arm member 66b.

The link mechanism 64 is configured by three links (three link members) being connected in tandem, and is provided as a mechanism capable of deforming in a linear state and a bent state on a vertical plane. The central link 64a (a central link member, a second link member) in the link mechanism 64 is pivotably supported by a connecting pin 67a at the center, relative to the guide plate 43. Note that the guide plate 43 is provided as a plate-like member that is fixed to a housing or the like of the drive portion 53a installed on the slide base 52. Further, the guide plate 43 has an elongated hole 43a that is formed below the position where the aforementioned connecting pin 67a is attached and in which the output roller 22a is disposed. The output roller 22a moves in the vehicle front-rear direction by moving along the elongated hole 43a. Further, the output roller 22a is installed so as to be engageable with the central link 64a in the link mechanism 64, and the link mechanism is configured to deform between a linear state and a bent state with the movement of the output roller 22a along the elongated hole 43a.

The link retaining mechanism 65 is configured to include a pair of engaging members (69a, 69b). The pair of engaging members (69a, 69b) are disposed pivotably on a vertical plane symmetrically to the link mechanism 64 (i.e., to the connecting pin 67a) in the vicinity of both ends of the link mechanism 64. Further, in a state where the doors (108, 109) are at the closed positions, the pair of engaging members (69a, 69b) are configured to be engaged with both ends of the link mechanism 64 in a linear state and also engaged with the locking pins (63a, 63b).

Meanwhile, when, in the above-described state, a driving force that is output as a result of the carrier 20c in the planet gear mechanism 20 swinging is output to the output roller 22a in the lock output portion 22, the link mechanism 64 in a linear state deforms into a bent state with the movement of the output roller 22a. Thus, the engagement between the pair of engaging members (69a, 69b) and the link mechanism 64 is released. Then, when the rack-and-pinion mechanism 53b operates with a driving force output from the ring gear 20d in the planet gear mechanism 20 and the arm members (66a, 66b) move together with the drive racks (60a, 60b) or the connecting portions (59a, 59b), the locking pins (63a, 63b) also move in directions diverging from each other toward the opening directions of the doors (108, 109).

Since the engagement between the link mechanism 64 and the engaging members (69a, 69b) is released, upon the locking pins (63a, 63b) moving as described above, the engaging members (69a, 69b) pivot with a biasing force of the biasing spring (biasing portion, not shown), and its engagement with the locking pins (63a, 63b) is released. Note that, in this state, the engaging members (69a, 69b) are configured to constrain linearly extending movement of the link mechanism 64 with their outer peripheral portions. When the link mechanism 64 is retained in a bent state by the link retaining mechanism 65, the output roller 22a is retained at the link 64a, and the state where an output to the carrier 20c in the planet gear mechanism 20 is fixed is maintained.

On the other hand, when the rack-and-pinion mechanism 53b moves in the direction opposite to the aforementioned direction, the locking pins (63a, 63b) move together with the arm members (66a, 66b) in directions in which they approach each other toward the closing directions of the doors (108, 109). Upon the locking pins (63a, 63b) thus moving, the locking pins (63a, 63b) are engaged with the engaging members (69a, 69b), and the engaging members (69a, 69b) pivot in the direction opposite to the biasing direction of the biasing spring (not shown). Then, the engaging members (69a, 69b) are engageable with the link mechanism 64. In this state, the carrier 20c in the planet gear mechanism 20 swings, the output roller 22a in the lock output portion 22 moves in the elongated hole 43a, and thereby, the link mechanism 64 deforms from a bent state into a linear state. Then, both ends of the link mechanism 64 are engaged with the engaging members (69a, 69b).

Figure 42:
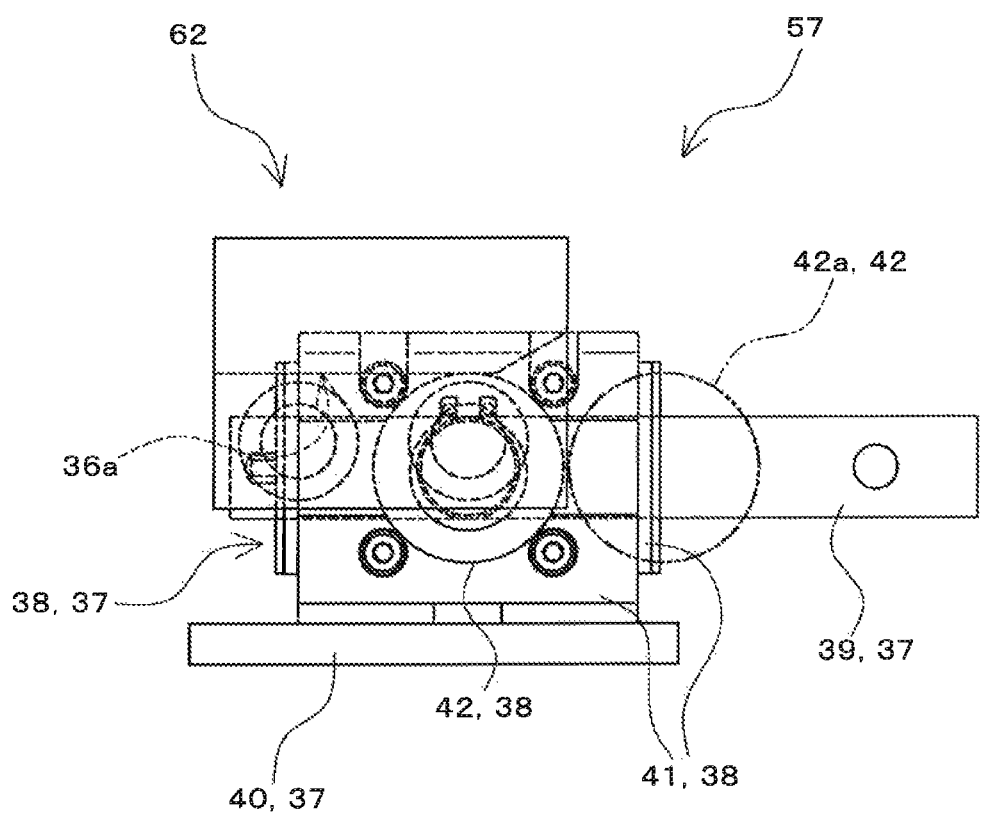
FIG. 42 is a front view showing a part of a locking mechanism in the plug door device shown in FIG. 29.

FIG. 42 is a plan view showing the fixed lock portion 62 and the movable lock portion 37 in the locking mechanism 57. The fixed lock portion 62 is configured as a block-like member provided so as to be fixed to the fixed base 51.

The movable lock portion 37 is provided so as to be movable with a driving force that is output from the carrier 20c in the planet gear mechanism 20 to the locking mechanism 57. The movable lock portion 37 is configured to come into contact with the fixed lock portion 62 in a face 36a on the inside in the vehicle width direction at the closed position of the doors (108, 109). Thus, the locking mechanism 57 is provided so as to restrict movement of the doors (108, 109) outward in the vehicle width direction when the doors (108, 109) are in a closed state, as a result of the movable lock portion 37 coming into contact with the fixed lock portion 62.

Also, the movable lock portion 37 is configured to include a sliding contact portion 38 capable of coming into contact with the fixed lock portion 36, a slide rail 39, and a transmission member 40. The slide rail 39 is provided as a rail member that is fixed to the slide base 52 and extends in the vehicle front-rear direction. Thus, the slide rail 39 is configured to restrict the direction of sliding movement of the sliding contact portion 38 to a direction parallel to the vehicle front-rear direction.

The transmission member 40 is provided as a plate-like member and is disposed so as to extend in the up-down direction. The transmission member 40 is provided as a member for transmitting a driving force that is output from the carrier 20c in the planet gear mechanism 20 to the locking mechanism 57, to the sliding contact portion 38. Note that the transmission member 40 is fixed to the output roller shaft 22b in the lock output portion 22 (see FIG. 32). Although the guide plate 43 is omitted in FIG. 32, the output roller shaft 22b penetrates the elongated hole 43a in the guide plate 43 and is fixed on the lower end side of the transmission member 40. Also, the output roller 22a is rotatably supported at a position corresponding to the elongated hole 43a with respect to the output roller shaft 22b that penetrates the elongated hole 43a.

As a result thereof, the locking mechanism 57 is configured such that a driving force output from the carrier 20c via the lock output portion 22 is input to the transmission member 40. Further, the transmission member 40 moves in the vehicle front-rear direction with movement of the output roller 22b with a driving force from the planet gear mechanism 20. Furthermore, with the movement of the transmission member 40, the sliding contact portion 38 whose sliding movement direction is restricted by the slide rail 39 moves in the vehicle front-rear direction.

Also, the sliding contact portion 38 is configured to include a slide block 41 and a roller 42. The slide block 41 is provided in a block shape, and is provided as a member whose sliding movement direction is restricted to the vehicle front-rear direction by the slide rail 39. Note that the upper end side of the transmission member 40 is fixed to the slide block 41, and the slide block 41 has a groove that is formed so as to be fitted onto a rail face of the slide rail 39 such that the slide block 41 can slide thereon.

The roller 42 is supported rotatably around a vertical axis relative to the slide block 41. The outer-circumferential side face of the roller 42 is disposed so as to be able to come into contact with the side face of the fixed lock portion 36. Note that the side face of the fixed lock portion 62 is provided with a face 36a with which the roller 42 can come into contact. The face 36a is provided as a side face of the fixed lock portion 62 that faces inward in the vehicle width direction. The face 36a is formed as a face orthogonal to the vehicle width direction, and is configured to come into contact with the outer circumference of the roller 42 in the sliding contact portion 38 of the movable lock portion 37 when the doors (108, 109) are in a closed state, and thereby restrict movement of the doors (108, 109) to the outside in the vehicle width direction.

Regarding Operation of Plug Door Device

Next, the operation of the plug door device 3 will be described. As shown in FIGS. 27 to 32, when the doors (108, 109) are at the closed positions, the shaft portions 54 (54a, 54b) are engaged with the first link 24 and the second link 25 in the respective guide portions 55 (55a, 55b).

Also, in the locking mechanism 57, the roller 42 is in contact with the face 36a of the fixed lock portion 62 when the doors (108, 109) are at the closed positions, as shown in FIGS. 31, 32, and 42. For this reason, movement of the slide base 52 outward in the vehicle width direction is restricted via the locking mechanism 57 and the carrier 20c of the planet gear mechanism 20. This state restricts the plugging operation toward the outside in the vehicle width direction by the plugging mechanism, and the doors (108, 109) are locked such that their movement is restricted.

As a result of the direct-drive brushless electric motor 21 in the door drive mechanism 53 being driven in the above-described state at the closed position, the sun gear 20a in the planet gear mechanism 20 starts to rotate, and the planet gears 20b around the sun gear 20a start to revolve around the sun gear 20a while meshing with the ring gear 20d. Then, the carrier 20c swings with the revolution of the planet gears 20b, and the output roller 22*a* and the output roller shaft 22*b* thereby move within the elongated hole 43*a* toward one side.

Thus, the transmission member 40 moves together with the output roller shaft 22*b* parallel to the opening direction of the door 108 in the vehicle front-rear direction, and the slide block 41 also moves on the slide rail 39 parallel to the opening direction of the door 108. Further, the link mechanism 64 transitions from a linear state where it is engaged at its both ends with the engaging members (69*a*, 69*b*) to a bent state where the engagement at both ends are released.

As a result thereof, the roller 42, which was in contact with the face 36*a* of the fixed lock portion 62, moves up to the position where the roller 42 is separated from the face 36*a*. Then, the locking pins (63*a*, 63) that were engaged with the engaging members (69*a*, 69*b*) moves up to the position where they are separated from the engaging members (69*a*, 69*b*). Note that in FIG. 42, the position of the roller 42 that has moved up to the position where it is separated from the face 36*a* is shown as the roller 42*a* indicated by a two-dot chain line. Thus, the state of the doors (108, 109) being locked by the locking mechanism 57 is released, and the plugging operation toward the outside in the vehicle width direction by the plugging mechanism is enabled.

As described above, after the plugging operation toward the outside in the vehicle width direction is enabled, drive of the brushless electric motor 21 in the door drive mechanism 53 is further continued. Thus, a driving force that is output to the drive pinion 61 in the rack-and-pinion mechanism 53*b* via the ring gear 20*d* is further transmitted to the shaft portions (54*a*, 54*b*) via the drive racks (60*a*, 60*b*) and the connecting portions (59*a*, 59*b*). For this reason, the shaft portions (54*a*, 54*b*), when moving the doors (108, 109) in the respective opening directions, bias the second links 25 in the respective guide portions (55*a*, 55*b*) in the same direction.

Note that the operation of the plugging mechanism will be described below using an example of the plugging mechanism on the door 108 side shown in FIGS. 33 to 37, and the description of the operation of the plugging mechanism on the door 109 side, which is similar to that on the door 108 side, will be omitted as appropriate. As shown in FIG. 33, the pivoting of the second link 25 relative to the first link 24 (pivoting in the clockwise direction around the second pivoting shaft 27, as viewed from above) is restricted at the position where the guide portion roller 28 comes into contact with the angled face 23*a* of the roller guide 23. Therefore, the second link 25 hardly pivots relative to the first link 24, and gives a pivoting force around the first pivoting shaft 26 (a pivoting force in the clockwise direction, as viewed from above) to the first link 24 via the second pivoting shaft 27. As a result, the guide portion roller 28 moves along the angled face 23*a*, and the first link 24 pivots around the first pivoting shaft 26 toward the direction indicated by arrow H in the diagram.

While the first link 24 is pivoting in the clockwise direction as viewed from above, the guide portion roller 28 of the second link 25 moves along the angled face 23*a* of the roller guide 23. At this time, since the second link 25 is attracted toward the angled face 23*a* side by the helical spring 30, the guide portion roller 28 is not detached from the angled face 23*a*. Also, while the guide portion roller 28 is moving along the angled face 23*a*, a state where the first dent portion 24*a* of the first link 24 and the second dent portion 25*a* of the second link 25 surround the shaft portion 54*a* is maintained.

Upon the shaft portion 54*a* further moving in the opening direction in the above-described state, the position where the guide portion roller 28 and the roller guide 23 come into contact moves from the angled face 23*a* to the curved face 23*b*. The guide portion roller 28 is thereby drawn inward in the vehicle width direction along the curved face 23*b*, and the second link 25 rotates around the second pivoting shaft 27 in the clockwise direction relative to the first link 24, as viewed from above. In other words, as shown in FIG. 37, constraint on the shaft portion 54*a* by the second link 25 is released. Also, at this time, the pivoting of the first link 24 in the arrow H direction is restricted due to the first link 24 coming into contact with a stopper 44 that is fixed to the roller guide 23.

As described above, the guide portions 55 (55*a*, 55*b*) are configured as mechanisms that pivot while coming into contact with the shaft portions (54*a*, 54*b*) and guide the shaft portions (54*a*, 54*b*) such that the shaft portions (54*a*, 54*b*) move toward one side in the vehicle width direction (i.e., in the opening direction of the door 108 and the opening direction of the door 109), when the doors (108, 109) open.

Also, when the guide portions (55*a*, 55*b*) operate as described above, a force toward the outside in the vehicle width direction acts on the shaft portions (54*a*, 54*b*). Therefore, a force toward the outside in the vehicle width direction also acts on the door drive mechanism 53 connected to the shaft portions (54*a*, 54*b*) via the connecting portions (59*a*, 59*b*), and a force toward the outside in the vehicle width direction also acts on the slide base 52 on which the door drive mechanism 53 is installed.

As a result thereof, the door drive mechanism 53 and the slide base 52 are guided by the slide support portion 51*b* of the fixed base 51 and move outward in the vehicle width direction. As a result, the plugging operation in which the doors (108, 109) move outward in the vehicle width direction is performed. Further, as a result of the plugging operation being performed, the movement of the doors (108, 109) in the opening directions is enabled.

When the above-described plugging operation to the outside in the vehicle width direction is performed, the pivoting arm mechanisms 75 (75*a*, 75*b*) guide the doors (108, 109) outward in the vehicle width direction so as to assist the plugging operation of the doors (108, 109). Note that the operation of the pivoting arm mechanism 75 will be described below using an example of the pivoting arm mechanism 75*a* on the door 108 side shown in FIGS. 38 to 41, and the description of the operation of the pivoting arm mechanism 75*b* on the door 109 side, which is similar to that on the door 108 side, will be omitted as appropriate.

First, when the door 108 is at the closed position, in the pivoting arm mechanism 75*a*, the external gear 86 on the outer circumference of the drive rotational member 76*b* meshes with the door-side fixed rack 85, and the pivoting arm 80 is located at the position indicated by solid lines in FIG. 39. Upon the plugging operation of the door 108 being started in this state, the drive rotational member 76*b* rotates while meshing, at its external gear 86, with the door-side fixed rack 85 with the movement of the door 108, and a driving force serving as a door opening/closing force is acquired by the driving force acquiring portion 76*a*. Also, at this time, the pair of support rollers (79*a*, 79*a*) and the assist roller 84 roll relative to the door rail 91 while rotating in opposite directions in a state of sandwiching the door rail 91 from both sides in the vehicle width direction.

Then, the drive rotational member 76*b* rotates with the movement of the door 108, the intermediate gear 83 that meshes with the drive rotational member 76*b* rotates, and further, the follower rotational member 77 that meshes with the intermediate gear 83 rotates. Also, at this time, the follower rotational member 77 rotates while meshing with the external gear of the guiding curved face portion 78*a* of the guiding curved face member 78, and moves along the guiding curved face portion 78a. Thus, the pivoting arm 80 that rotatably supports the drive rotational member 76b and the follower rotational member 77 and is pivotably supported by the guiding curved face member 78 pivots outward in the vehicle width direction with the movement of the door 108.

After the door 108 moves up to the position where the plugging operation is finished, the pivoting arm 80 moves up to the position indicated by a two-dot chain line in FIG. 39 and comes into contact with the stopper rubber 81b of the restricting member 81. The pivoting range of the pivoting arm 80 is thereby restricted, and the pivoting arm 80 is stopped. Also, after the door 108 moves up to the position where the plugging operation is finished, the meshing between the external gear 86 and the door-side fixed rack 85 provided along a part of the door 108 in the vehicle front-rear direction is released. Thus, the acquisition of the door opening/closing force of the door 108 by the driving force acquiring portion 76a when the door 108 is opened is finished.

Also, when the door 108 moves in the opening direction after the above-described plugging operation of the door 108, the pair of support rollers (79a, 79a) and the assist roller 84 roll relative to the door rail 91 with the movement of the door 108 on the door rail 91. Also, in this state, the position of the pivoting arm 80 is retained at the position where it comes into contact with the restricting member 81, by the arm biasing spring 82.

Also, when the plugging operation to the outside in the vehicle width direction by the plugging mechanism and the pivoting arm mechanism 75 is finished, the movement of both ends of the link mechanism 64 in a bent state is constrained by the outer peripheral portions of the engaging members (69a, 69b). Further, in this state, a reaction force balanced with a driving force that is input from the carrier 20c in the planet gear mechanism 20 to the locking mechanism 57 is generated at the outer peripheral portions of the engaging members (69a, 69b). The drive pinion 61 is thereby driven to rotate with a driving force that is input from the ring gear 20d in the planet gear mechanism 20 to the drive pinion 61.

Further, the drive racks (60a, 60b) are driven in opposite directions with the rotation of the drive pinion 61, and the support rails 16d and the pinions 16c in the double-speed rails (56a, 56b) move together with the connecting portions (59a, 59b). For this reason, on the double-speed rails (56a, 56b), the upper racks 16a connected to the doors (108, 109) move at a speed that is double the speed of the pinion 16c, relative to the lower racks 16b fixed to the slide base 52. The doors (108, 109) thereby move in the respective opening directions, and the operation of opening the doors (108, 109) is performed. Note that while the doors (108, 109) are moving in the opening directions, the shaft portions (54a, 54b) linearly move in the opening directions of the doors (108, 109) together with the connecting portions (59a, 59b), without receiving a force in the vehicle width direction from the guide portions (55a, 55b).

On the other hand, when the doors (108, 109) close, a reverse operation of the above-described operation of opening the doors (108, 109) is performed. In other words, the direct-drive brushless electric motor 21 in the door drive mechanism 53 is driven, and the drive pinion 61 driven via the planet gear mechanism 20 rotates in the direction opposite to that in the above-described opening operation. Thus, the support rails 16d and the pinions 16c in the double-speed rails (56a, 56b) that are connected to the connecting portions (59a, 59b) move in the directions opposite to those in the above-described opening operation. Further, in the double-speed rails (56a, 56b), the upper racks 16a connected to the doors (108, 109) move at a speed that is double the speed of the pinions 16c, relative to the lower racks 16b fixed to the slide base 52. Thus, the doors (108, 109) move in the respective closing directions, and the operation of closing the doors (108, 109) is performed. Also, the shaft portions (54a, 54b) linearly move in the respective closing directions toward the guide portions (55a, 55b).

Note that in the guide portion 55a, a pivoting force in the clockwise direction, as viewed from above, acts on the second link 25 due to the helical spring 30 when the door 108 is in an open state. That is to say, a tension force from the helical spring 30 acts on the second link 25 such that the guide portion roller 28 is located at a position where it comes into contact with the curved face 23b of the roller guide 23. In the present embodiment, the guide portion roller 28 is fitted into a recess having substantially the same semicircular shape as the outer-circumferential shape of the guide portion roller 28 in its curved face 23b. Accordingly, the first link 24 and the second link 25 are stably retained at predetermined positions. Specifically, the second link 25 is retained at a position where the shaft portion 54a that has linearly moved in the closing direction can come into contact with the inner periphery of the second dent portion 25a. Also, the first link 24 is retained at a position where the shaft portion 54a that has linearly moved in the closing direction can be housed within the first dent portion 24a (see FIG. 37).

Accordingly, when the door 108 has moved in the closing direction by a predetermined amount from the fully-opened position, the shaft portion 54a comes into contact with the inner periphery of the second dent portion 25a of the second link 25 (see FIG. 37) and biases the second link 25. At this time, since the second link 25 pivots around the second pivoting shaft 27 in the anticlockwise direction, as viewed from above, against the force of the helical spring 30, linear movement of the shaft portion 54a in the closing direction is not hindered. During the above pivoting of the second link 25, the guide portion roller 28 moves along the curved face 23b of the roller guide 23. Note that at the time of the pivoting of the second link 25, the first link 24 hardly pivots and is retained at a predetermined position or in the vicinity thereof.

Then, the shaft portion 54a moves in the closing direction up to the position where it comes into contact with the inner periphery of the first dent portion 24a of the first link 24, and biases the first link 24 in the closing direction. The first link 24 thereby pivots around the first pivoting shaft 26 in the anticlockwise direction, as viewed from above, and the shaft portion 54a is guided toward the inside in the vehicle width direction.

At this time, the door 108 moves similarly to the shaft portion 54a. In other words, the door 108 linearly moves in the closing direction from the fully-opened position, and is also drawn inward in the vehicle width direction in the vicinity of the closed position and transitions to the closed position. Thus, the plugging operation toward the inside in the vehicle width direction by the plugging mechanism is finished.

As described above, the guide portions (55a, 55b) are configured as mechanisms that pivot while coming into contact with the shaft portions (54a, 54b) and guide the shaft portions (54a, 54b) such that the shaft portions (54a, 54b) move toward the other side in the vehicle width direction (i.e., in the closing direction of the door 108 and the closing direction of the door 109), when the doors (108, 109) close.

Also, when the above-described plugging operation to the inside in the vehicle width direction is performed, the pivoting arm mechanisms 75 (75a, 75b) guide the doors (108, 109) outward in the vehicle width direction so as to assist the plugging operation of the doors (108, 109).

When the door 108 is moving in the closing direction, the pair of support rollers (79a, 79a) and the assist roller 84 is rolling relative to the door rail 91. After the door 108 moves in the closing direction by a predetermined amount and reaches the position where the plugging operation to the inside in the vehicle width direction is started, the door-side fixed rack 85 reaches the position where it meshes with the external gear 86 on the outer circumference of the drive rotational member 76b. Furthermore, upon the plugging operation of the door 108 toward the inside in the vehicle width direction being started in this state, the drive rotational member 76b rotates while meshing, at its external gear 86, with the door-side fixed rack 85 with the movement of the door 108, and a driving force serving as a door opening/closing force is acquired by the driving force acquiring portion 76a. At this time, the drive rotational member 76b rotates in the direction opposite to the rotational direction thereof during the opening operation of the door 108.

Then, the drive rotational member 76b rotates with the movement of the door 108, the intermediate gear 83 that meshes with the drive rotational member 76b rotates, and further, the follower rotational member 77 that meshes with the intermediate gear 83 rotates. Also, at this time, the follower rotational member 77 rotates while meshing with the external gear of the guiding curved face portion 78a of the guiding curved face member 78, and moves along the guiding curved face portion 78a in the direction opposite to that during the opening operation of the door 108. Thus, the pivoting arm 80 that rotatably supports the drive rotational member 76b and the follower rotational member 77 and is pivotably supported by the guiding curved face member 78 pivots inward in the vehicle width direction with the movement of the door 108. When the door 108 reaches the closed position, the acquisition of the door opening/closing force of the door 108 by the driving force acquiring portion 76a when the door 108 is closed ends, and the pivoting of the pivoting arm 80 also stops.

Also, when the plugging operation to the inside in the vehicle width direction by the plugging mechanism and the pivoting arm mechanism 75 is finished, the locking pins (63a, 63b) are engaged respectively with the engaging members (69a, 69b) and pivot the engaging members (69a, 69b). Thus, the engaging members (69a, 69b) are in a state of facing to both ends of the link mechanism 64 in a bent state. Further, upon the engaging members (69a, 69b) pivoting as described above, constraint on the link mechanism 64 by the outer peripheral portions of the engaging members (69a, 69b) is released. For this reason, the link 64a pivots with a driving force that is input from the carrier 20c in the planet gear mechanism 20 via the output roller 22a, and the link mechanism 64 deforms from a bent state into a linear state. Then, both ends of the link mechanism 64 are engaged with the engaging members (69a, 69b).

Also, at this time, the transmission member 40 moves parallel to the closing direction of the door 108 in the vehicle front-rear direction with a driving force that is input from the carrier 20c via the output roller shaft 22b, and the slide block 41 also moves parallel to the closing direction of the door 108 on the slide rail 39. Then, the roller 42 moves from the position of the roller 42a indicated by a two-dot chain line in FIG. 42 up to the position where it comes into contact with the face 36a of the fixed lock portion 62. Thus, the state of the doors (108, 109) being locked by the locking mechanism 57 is ensured, and the plugging operation toward the outside in the vehicle width direction by the plugging mechanism is disabled.

Regarding Effect of Plug Door Device

With the above-described plug door device 3, the guide portions 55 (55a, 55b) come into contact with the shaft portions 54 (54a, 54b) and pivot, thereby guiding the shaft portions 54 (54a, 54b) in the vehicle width direction. For this reason, the operation of the guide portions 55 (55a, 55b) is an operation of following the movement of the doors (108, 109) in the vehicle width direction. With this configuration, the space occupied by the guide portions 55 (55a, 55b) in the vehicle width direction can be further reduced in accordance with the state of movement of the doors (108, 109) in the vehicle width direction. As a result, a smaller plug door device 3 can be realized that can perform the opening/closing operation and the plugging operation using the door drive mechanism 53 for causing a force in the vehicle front-rear direction to act on the doors (108, 109).

Furthermore, the plug door device 3 is provided with the pivoting arm mechanisms 75 (75a, 75b) each having the pivoting arm 80 that pivots based on a door opening/closing force with the opening/closing operation of the door (108, 109). In each pivoting arm mechanism 75 (75a, 75b), the follower rotational member 77 pivots to which a rotational force generated due to the door opening/closing force acquired from the door (108, 109) was transmitted, the follower rotational member 77 is guided along the guiding curved face portion 78a, and the pivoting arm 80 retaining the follower rotational member 77 thereby pivots. For this reason, even if the shaft portions 54 (54a, 54b), the guide portions 55 (55a, 55b), and the slide base 52 are installed on the upper side of the doors (108, 109), the pivoting arm mechanisms 75 (75a, 75b) are installed on the lower side of the doors (108, 109), and the rigidity of the doors (108, 109) is small, a state where the movement of the doors (108, 109) at their lower side does not sufficiently follow the movement of the door (108, 109) at their upper side during the plugging operation is prevented. In other words, even if the connecting shaft disclosed in JP2008-121242 A is not provided, it is ensured that the movement of the doors (108, 109) at their lower side follows the movement of the doors (108, 109) at their upper side where the mechanism for performing the plugging operation is disposed. Accordingly, it is possible to reduce the installation space for the mechanisms each of which has the pivoting arm 80 and guides the door (108, 109) in the vehicle width direction so as to assist the plugging operation of the door (108, 109). Note that with the pivoting arm mechanisms 75 (75a, 75b), the doors (108, 109) are supported not only on the side of the rotational force generating portion 76 for acquiring a door opening/closing force and generating a rotational force but also by the door-side support portion 79 disposed on the opposite side in the vehicle width direction via a part of the doors (108, 109). For this reason, a part of each door (108, 109) is supported so as to be sandwiched from both sides in the vehicle width direction, and a state where the rotational force generating portion 76 operates to follow the door (108, 109) is constantly ensured. Furthermore, in each pivoting arm mechanism 75 (75a, 75b), the pivoting range on the door opening direction side of the pivoting arm 80 is restricted by the restricting member 81, and therefore, the pivoting arm 80 is prevented from excessively pivoting after the plugging operation and hindering the movement of the door (108, 109) when the door (108, 109) opens.

Accordingly, according to the present embodiment, it is possible to realize a smaller plug door device 3 capable of performing the opening/closing operation and the plugging operation using the door drive mechanism 53 for causing a force in the vehicle front-rear direction to act on the door (108, 109), and further to provide the plug door device 3 in which the installation space for the mechanisms each of which has the pivoting arm 80 and guides the door (108, 109) in the vehicle width direction so as to assist the plugging operation of the door (108, 109) can be reduced.

Also, with the plug door device 3, each rotational force generating portion 76 is configured as a mechanism in which a mechanism for acquiring a door opening/closing force as a driving force and a mechanism for generating a rotational force from the acquired driving force are separate mechanisms. For this reason, it is possible to efficiently acquire the door opening/closing force and efficiently convert it into a rotational force, compared with a rotational force generating portion configured to rotate with a frictional force while abutting the door (108, 109).

Also, with the plug door device 3, the driving force acquiring portion 76a capable of efficiently acquiring a door opening/closing force can be realized with a simple configuration with the door-side fixed rack 85 fixed to the door and the external gear 86 on the outer circumference of the drive rotational member 76b. Note that since the door-side fixed rack 85 is provided along a part of the door in the vehicle front-rear direction, the external gear 86 on the outer circumference of the drive rotational member 76b is prevented from excessively operating while meshing the door-side fixed rack 85 and hindering the movement of the door (108, 109) after the plugging operation. Furthermore, since the arm biasing spring 82 is provided, the position of the pivoting arm 80 is retained at the position where it comes into contact with the restricting member 81 even after the meshing between the door-side fixed rack 85 provided along a part of the door (108, 109) in the vehicle front-rear direction and the external gear 86 on the outer circumference of the drive rotational member 76b is released, when the door (108, 109) opens.

Regarding Modifications

Although the embodiments of the present invention were described thus far, the present invention is not limited to the above-described embodiments, and may be modified in various manners for implementation within the scope recited in Claims. For example, the present invention may be modified as below for implementation.

(1) Although the first embodiment described an exemplary mode in which two follower pulleys are provided in the door drive mechanism, this need not be the case. A mode in which one follower pulley or three or more follower pulleys are provided may alternatively be employed.

(2) Although the first embodiment described an example in which the drive pulley and the follower pulleys are used as the drive wheel member and the follower wheel members, respectively, this need not be the case. The drive wheel member and the follower wheel member may alternatively be configured as sprockets or the like. Further, although the drive belt with teeth was described as an example of the endless member, this need not be the case. A mode in which a V-belt, a chain, a wire, or the like is used as the endless member may alternatively be employed.

(3) Although the first to third embodiments described an exemplary mode in which the shaft portion is provided in the connecting portion, this need not be the case. A mode in which the shaft portion is directly provided on the door may alternatively be employed.

(4) The shape of the guide portion need not be the exemplary shape described in the above embodiments. In other words, the guide portion need only have the shape with which the guide portion can be rotatably installed on the fixed base, pivot while coming into contact with the shaft portion and guide the shaft portion such that the shaft portion moves toward one side in the vehicle width direction when the door opens, and pivot while coming into contact with the shaft portion and guide the shaft portion such that the shaft portion moves toward the other side in the vehicle width direction when the door closes.

(5) Although the third embodiment described an example of the plug door device applied to two-panel sliding doors constituted by two doors, this need not be the case, and the present invention may alternatively be applied to a one-panel sliding door constituted by one door.

(6) Although the third embodiment described an exemplary mode in which the door drive mechanism is configured to include the rack-and-pinion mechanism, this need not be the case. A door drive mechanism configured to include a drive wheel member and a follower wheel member that are each configured as a pulley, a sprocket, or the like, and an endless member configured as a belt, a chain, a wire, or the like that is looped around the drive wheel member and the follower wheel member may alternatively be implemented.

(7) The rotational force generating portion is not limited to the exemplary mode described in the above embodiments, and may be modified for implementation. For example, the rotational force generating portion may be provided as a mechanism having a belt member that circles, which abuts the door while circling and rotating with a frictional force. The rotational force generating portion that generates a rotational force by thus abutting the door and acquiring a door opening/closing force may be implemented.

Note that in the above-described case, the guiding curved face portion of the guiding curved face member is configured to abut the belt member of the rotational force generating portion. The follower rotational member is supported rotatably relative to the pivoting arm within the belt member, and is disposed so as to sandwich the belt member between the follower rotational member and the guiding curved face member. Thus, the rotational force of the belt member serving as the rotational force generating portion is transmitted to the follower rotational member, and the follower rotational member moves along the guiding curved face portion with the rotation of the follower rotational member and the rotation of the belt member that abuts the guiding curved face portion and circles while generating a frictional force.

Figure 43:
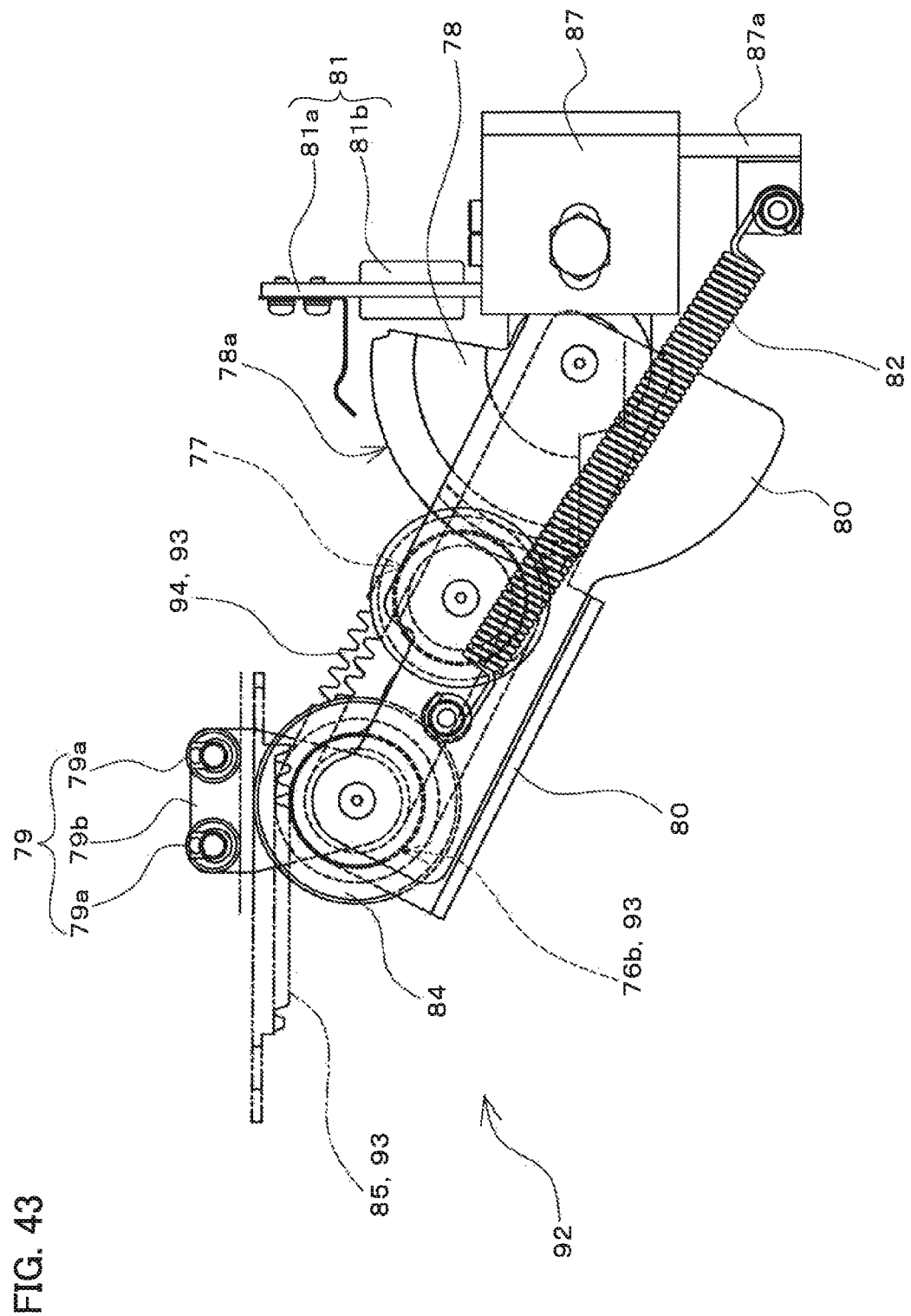
FIG. 43 is a plan view showing a pivoting arm mechanism according to a modification.

(8) A pivoting arm mechanism provided with a door-side fixed rack and a rotational force generating portion configured to include a toothed belt that meshes with the door-side fixed rack may be implemented. FIG. 43 is a plan view showing a pivoting arm mechanism 92 according to a modification. The pivoting arm mechanism 92 shown in FIG. 43 is provided with a rotational force generating portion 93 configured to include a door-side fixed rack 85, a double-side toothed belt 94, and a drive rotational member 76b. Note that in FIG. 43, the constituents configured similarly to those in the above-described embodiments are given the same reference numerals, and the description thereof will be omitted.

The double-side toothed belt 94 is provided as an endless belt member, and is provided with teeth on its inner-circumferential face and outer-circumferential face. The drive rotational member 76b and a follower rotational member 77 that are supported rotatably relative to the pivoting arm 80 are disposed inward of the double-side toothed belt 94. Further, the double-side toothed belt 94 is looped around the drive rotational member 76b and the follower rotational member 77 so as to circle therearound in a state where the teeth on the inner-circumferential face of the double-side toothed belt 94 mesh with the teeth on the outer-circumferential face of the drive rotational member 76b and the teeth on the outer-circumferential face of the follower rotational member 77.

Also, the double-side toothed belt 94 is installed such that the teeth provided on its outer-circumferential face mesh with the door-side fixed rack 85 and also mesh with an external gear formed on the guiding curved face portion 78a. Thus, with movement of the door, the double-side toothed belt 94 rotates so as to circle while meshing with the door-side fixed rack 85, and the drive rotational member 76b and the follower rotational member 77 that mesh with the double-side toothed belt 94 on the inside also rotate. Then, the follower rotational member 77 moves along the guiding curved face portion 78a with the rotation of the follower rotational member 77 and the rotation of the double-side toothed belt 94 that circles while meshing with the external gear of the guiding curved face portion 78a. The pivoting arm 80 thereby pivots. Note that in this modification, as described above, the object with which the drive rotational member 76b and the follower rotational member 77 mesh is different from that in the above-described embodiments, and the drive rotational member 76b and the follower rotational member 77 in this modification mesh with the inner-circumferential face of the double-side toothed belt 94. Also, the double-side toothed belt 94 in the rotational force generating portion 93 is in contact with the guiding curved face portion 78a of the guiding curved face member 78.

(9) A mode in which a mechanism that extends and contracts at the time of a pivoting operation is provided as a pivoting arm may be implemented. Also, a mode may be implemented that includes a guiding curved face member provided with a guiding curved face portion for causing the follower rotational member to move along a curved face formed such that its curvature radius changes. In the case of these modes, a structure capable of further reducing the installation space for the pivoting arm mechanism when the door is at the closed position can be realized.

INDUSTRIAL APPLICABILITY

(10) Although the above embodiments described an example in which the door opening and closing apparatus in the present invention is applied to a plug door, this need not be the case, and the door opening and closing apparatus in the present invention is also applicable to a door other than a plug door (e.g., a sliding door).

The present invention is widely applicable to a door opening and closing apparatus to be installed at an entrance of a vehicle for performing a door opening/closing operation.

The invention claimed is:

1. A door opening and closing apparatus for opening and closing a door, comprising:
an actuator that moves the door in an opening direction and a closing direction; and
a lock mechanism that holds the door in a fully closed state, and has an engaging member which engages with a lock member provided in the door when in the fully closed state, and a link mechanism which has three link members including a central link member provided between two link members of the three link members, is configured to be able to undergo deformation into a linear state and a bent state, and restricts rotation of the engaging member by being brought into the linear state,
wherein the central link member has a first face that is pressed by a projecting shaft moved by the actuator in order that the link mechanism changes from the linear state to the bent state, and a second face that is pressed by the projecting shaft in order that the link mechanism changes from the bent state to the linear state, and
the first face and the second face are provided so as to have a positional relationship in which the first face and the second face intersect each other.

2. The door opening and closing apparatus according to claim 1,
wherein the second face is a face that is aligned with a moving direction of the projecting shaft when the link mechanism is in the linear state.

3. The door opening and closing apparatus according to claim 2,
wherein the engaging member has an engaging portion provided as an opening portion, an end portion of the link mechanism being inserted into the opening portion when the engaging member is rotated in a predetermined direction by the lock member moving in the closing direction,
the two link members include a first link member having an end portion that serves as the end portion of the link mechanism and is inserted into the opening portion,
wherein the central link member is connected to the first link member and is provided rotatably, and
a rotation restricting member that restricts rotation of the central link member is further provided.

4. The door opening and closing apparatus according to claim 1,
wherein the lock mechanism includes:
a plurality of the engaging members each being rotated in a predetermined direction by the lock member moving in the closing direction; and
a plurality of biasing portions that are provided in association with the engaging members in one-to-one correspondence and bias the respective engaging members in a direction opposite to the predetermined direction.

* * * * *